March 8, 1932.　　F. S. IRVINE ET AL　　1,848,174
TROUBLE RECORDING SYSTEM
Filed Feb. 28, 1931　　25 Sheets-Sheet 1

FIG.1

Figure 17:
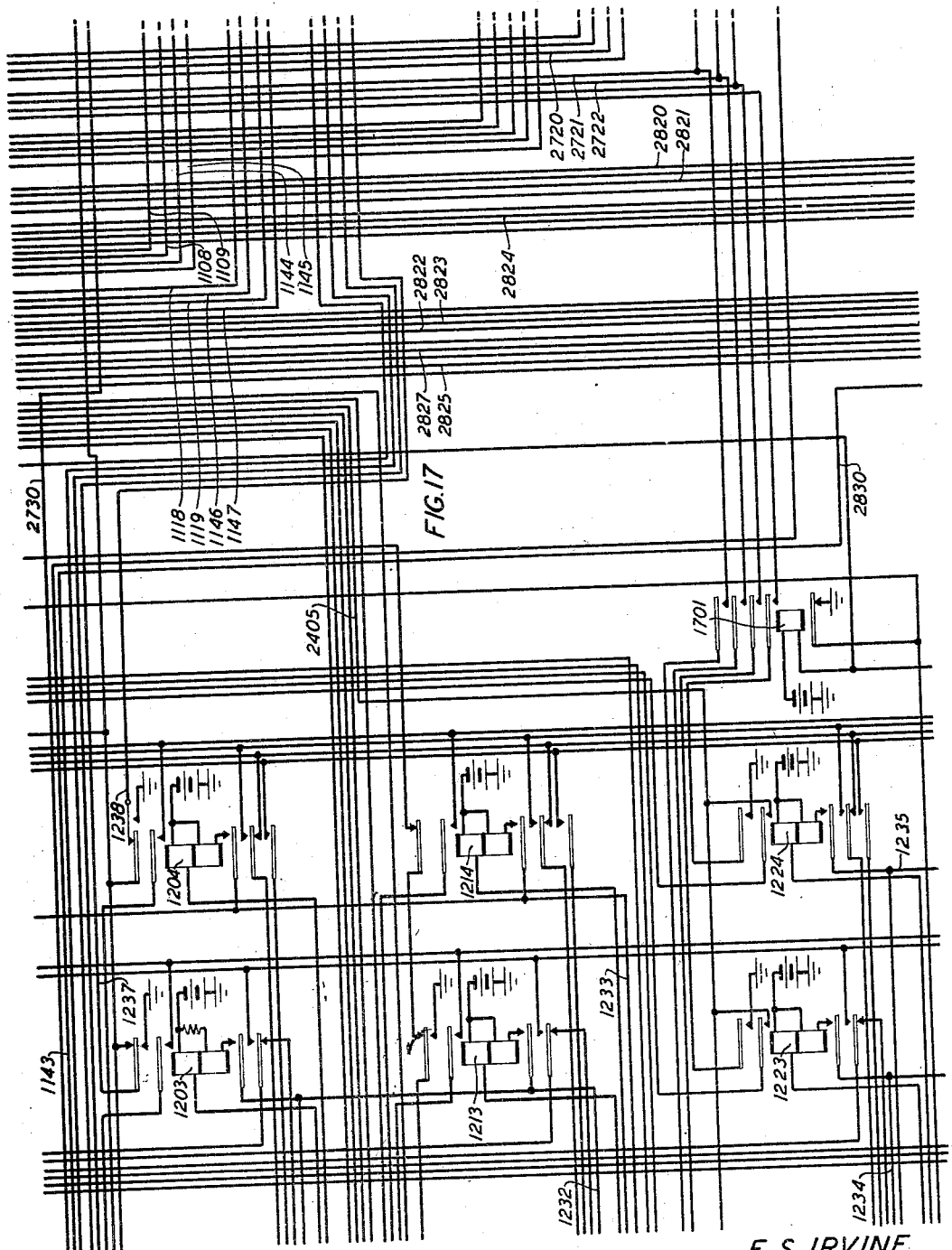
Figure 18:
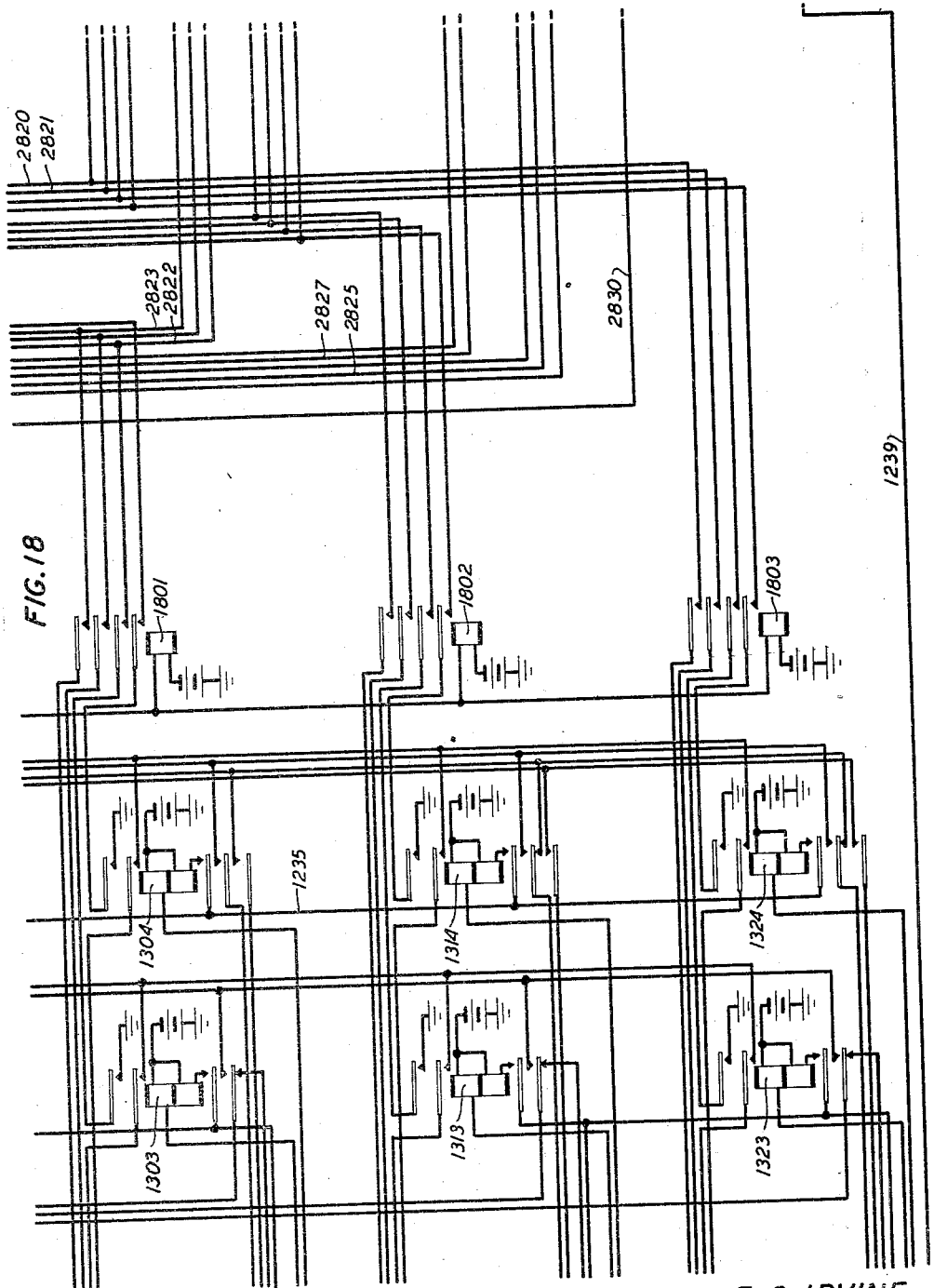
Figure 19:
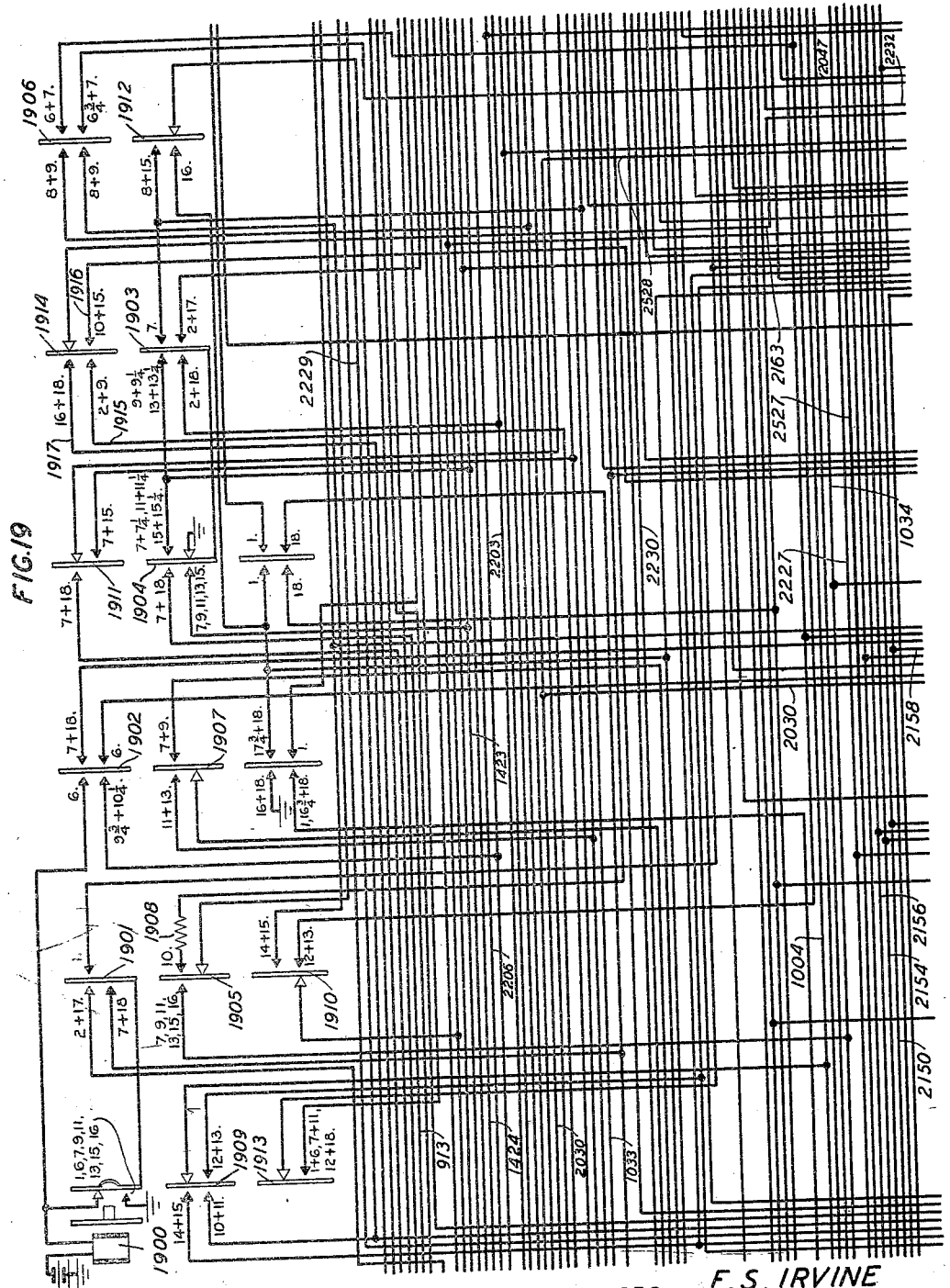
Figure 20:
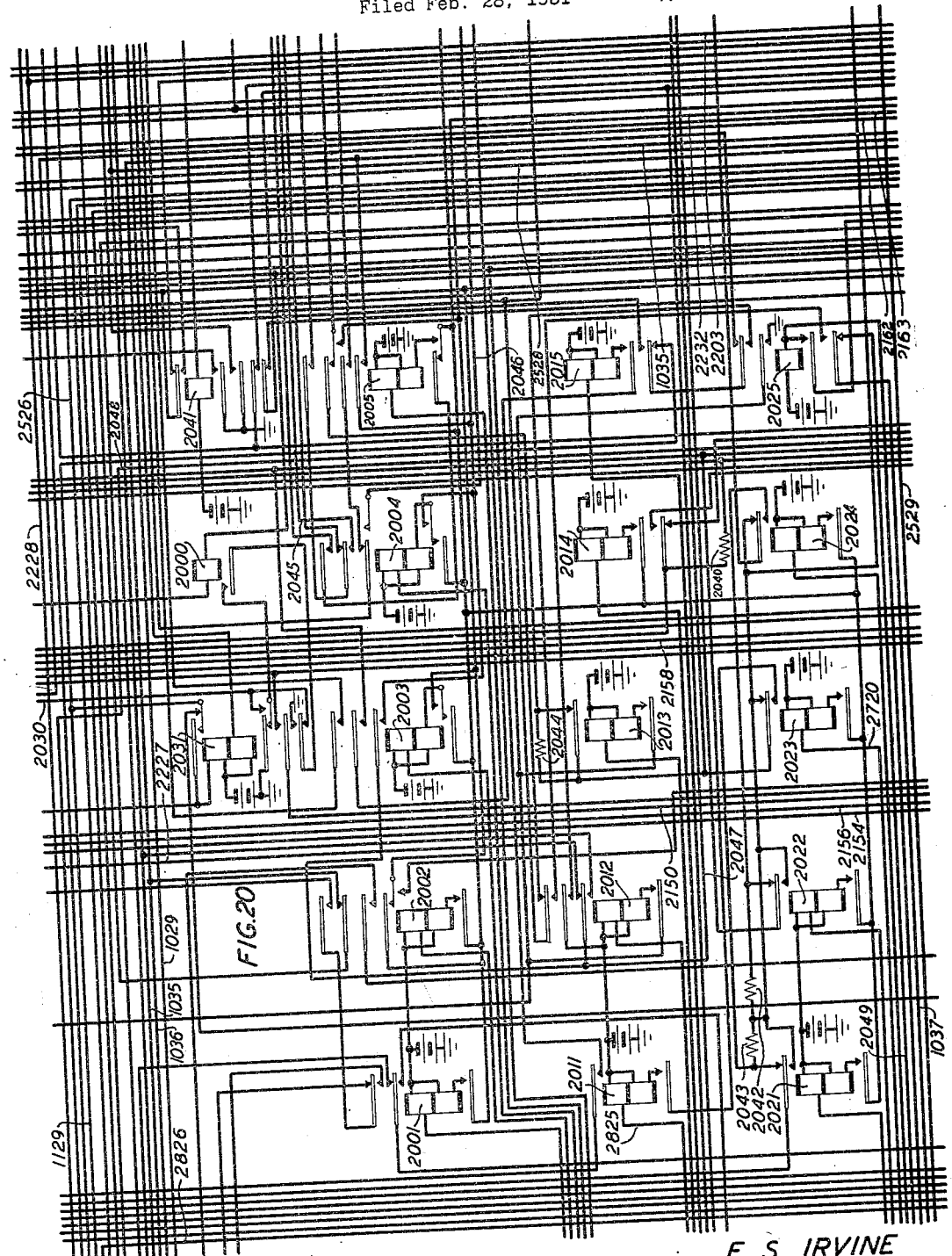
Figure 21:
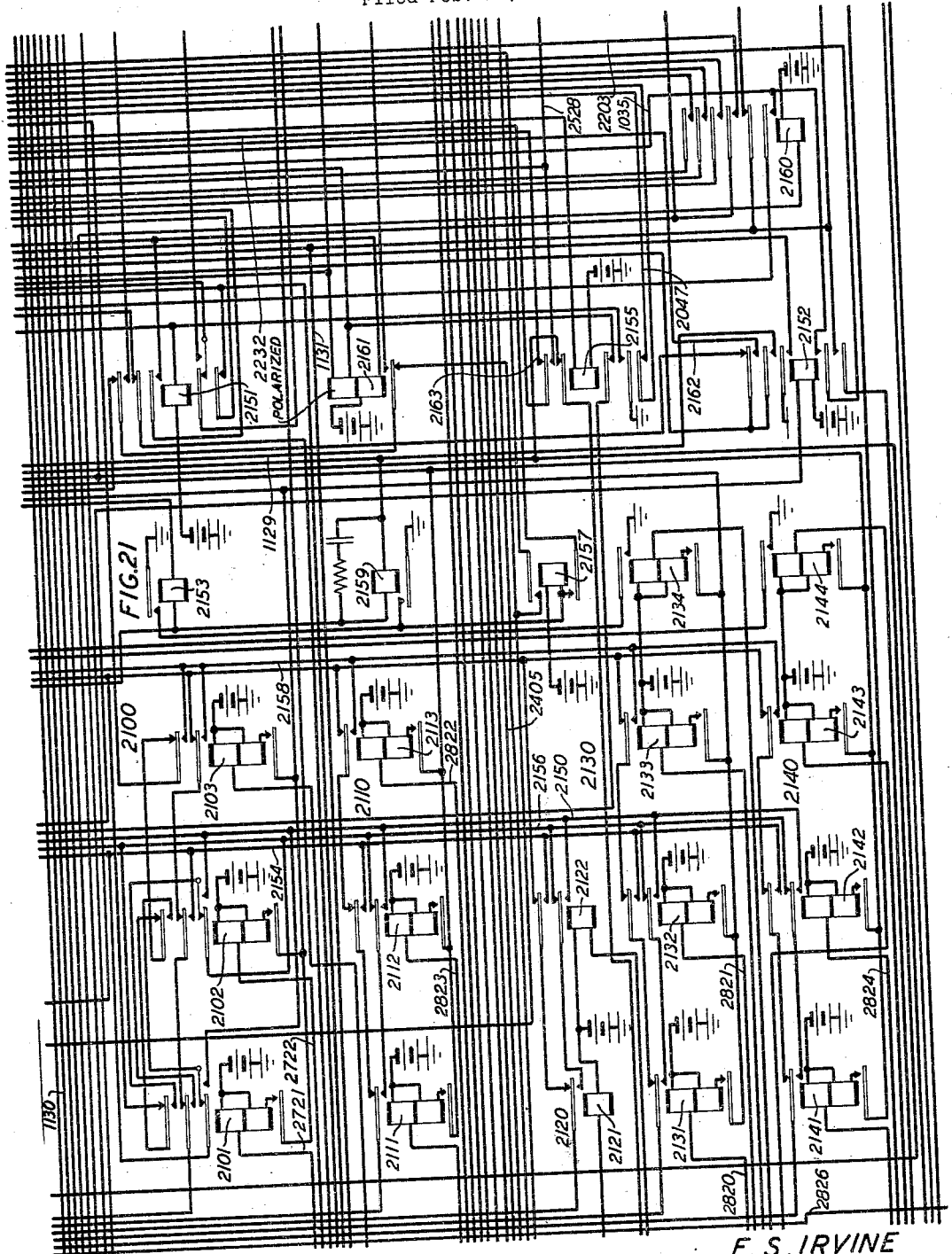
Figure 22:
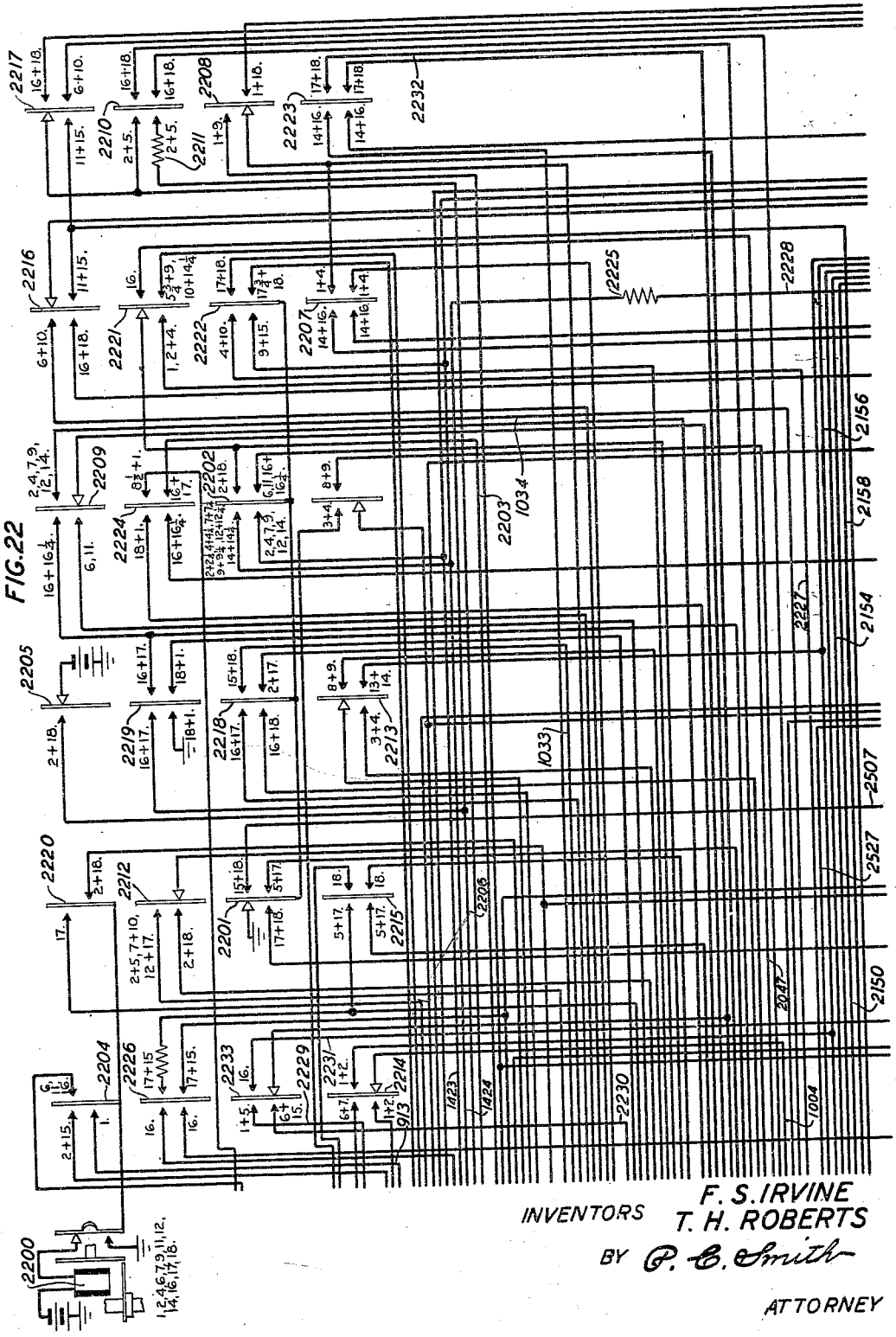
Figure 23:
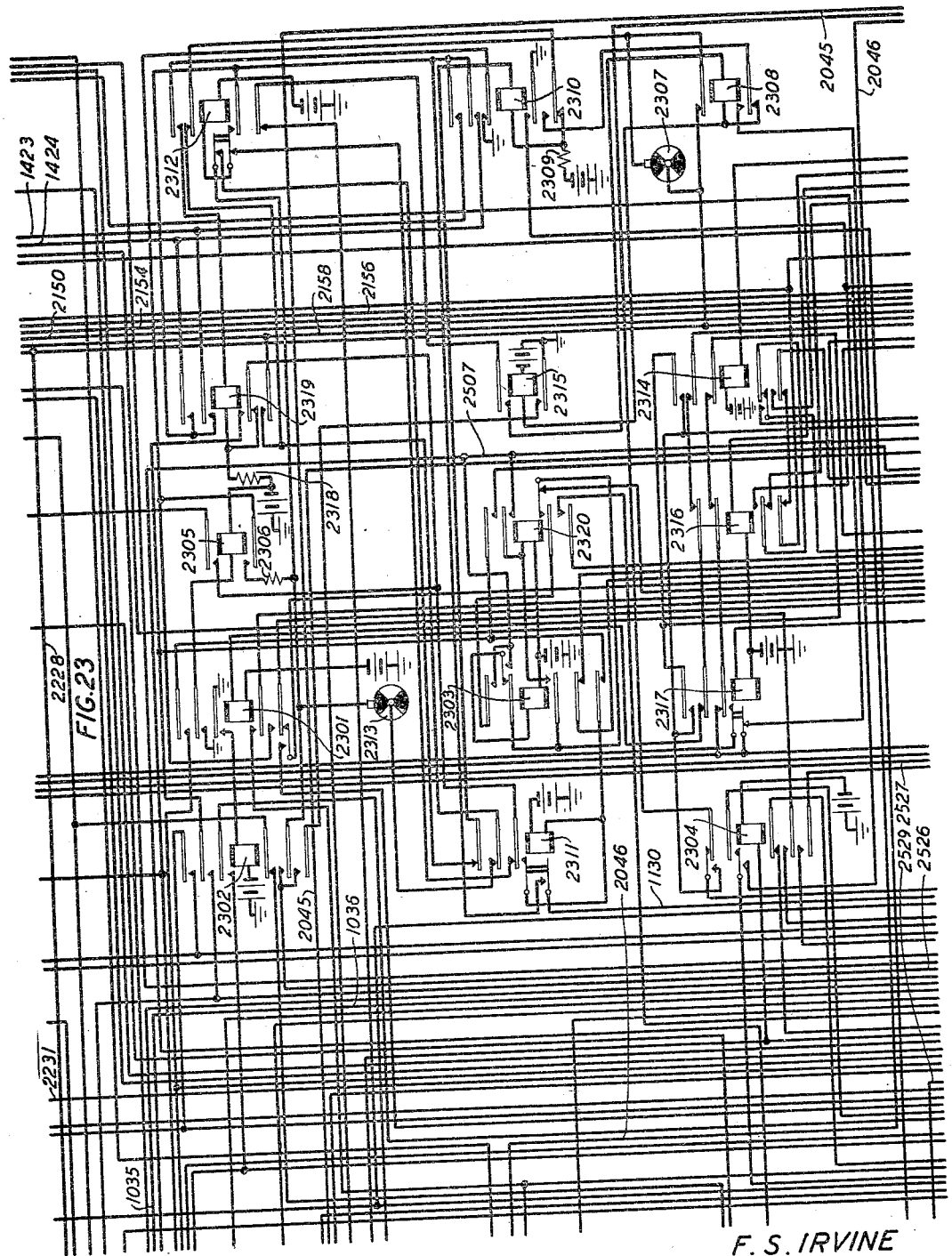
Figure 24:
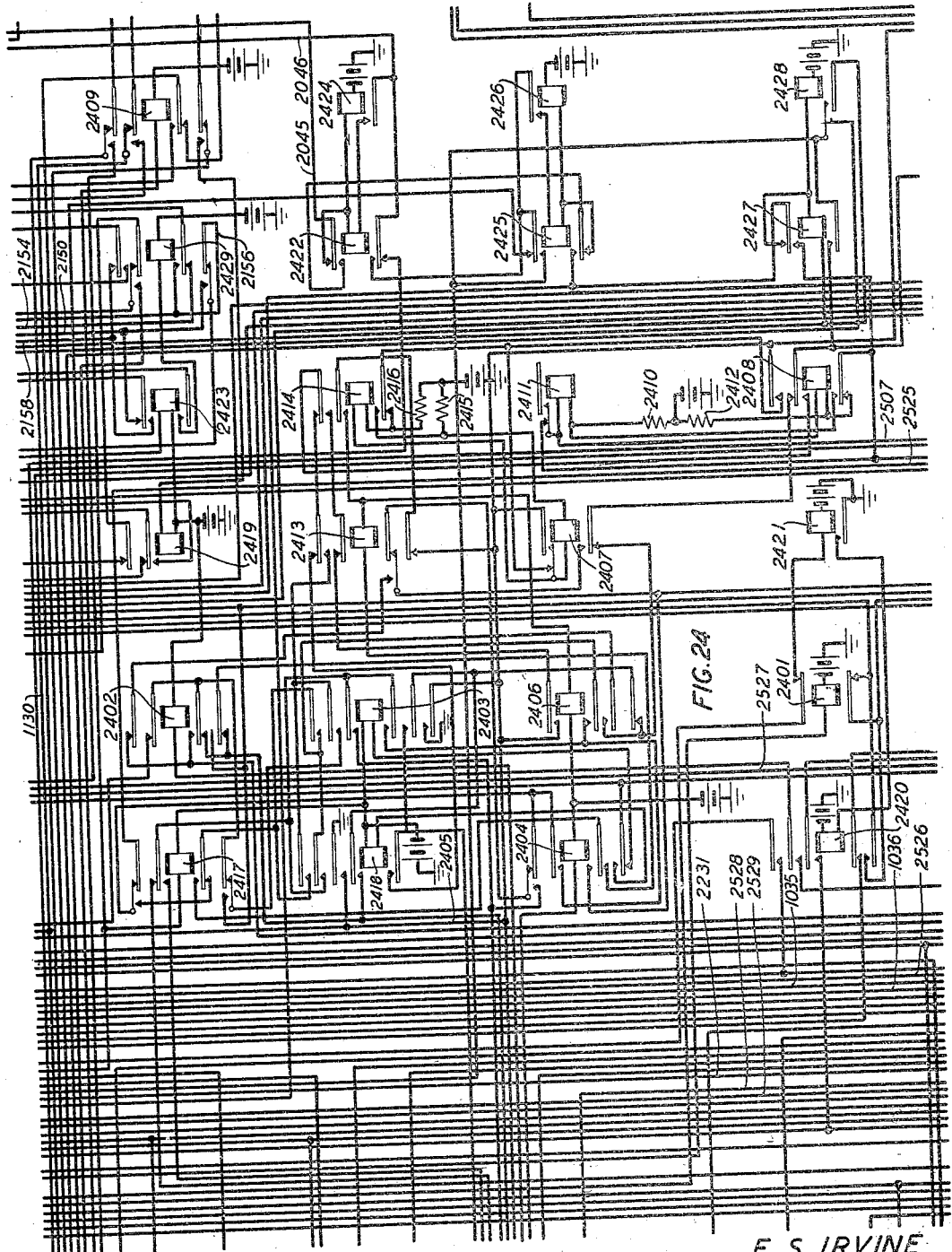

| | | FIG.8 | |
| FIG.22 | FIG.23 | FIG.24 | FIG.25 |
| FIG.19 | FIG.20 | FIG.21 | |
| FIG.14 | FIG.15 | FIG.16 | FIG.17 | FIG.18 |
| FIG.9 | FIG.10 | FIG.11 | FIG.12 | FIG.13 |
| FIG.2 | FIG.3 | FIG.4 | FIG.5 | FIG.6 | FIG.7 |

INVENTORS F.S. IRVINE
T.H. ROBERTS
BY P.C. Smith
ATTORNEY

March 8, 1932.  F. S. IRVINE ET AL  1,848,174

TROUBLE RECORDING SYSTEM

Filed Feb. 28, 1931  25 Sheets-Sheet 2

FIG. 2

INVENTORS F. S. IRVINE
T. H. ROBERTS
BY P. C. Smith
ATTORNEY

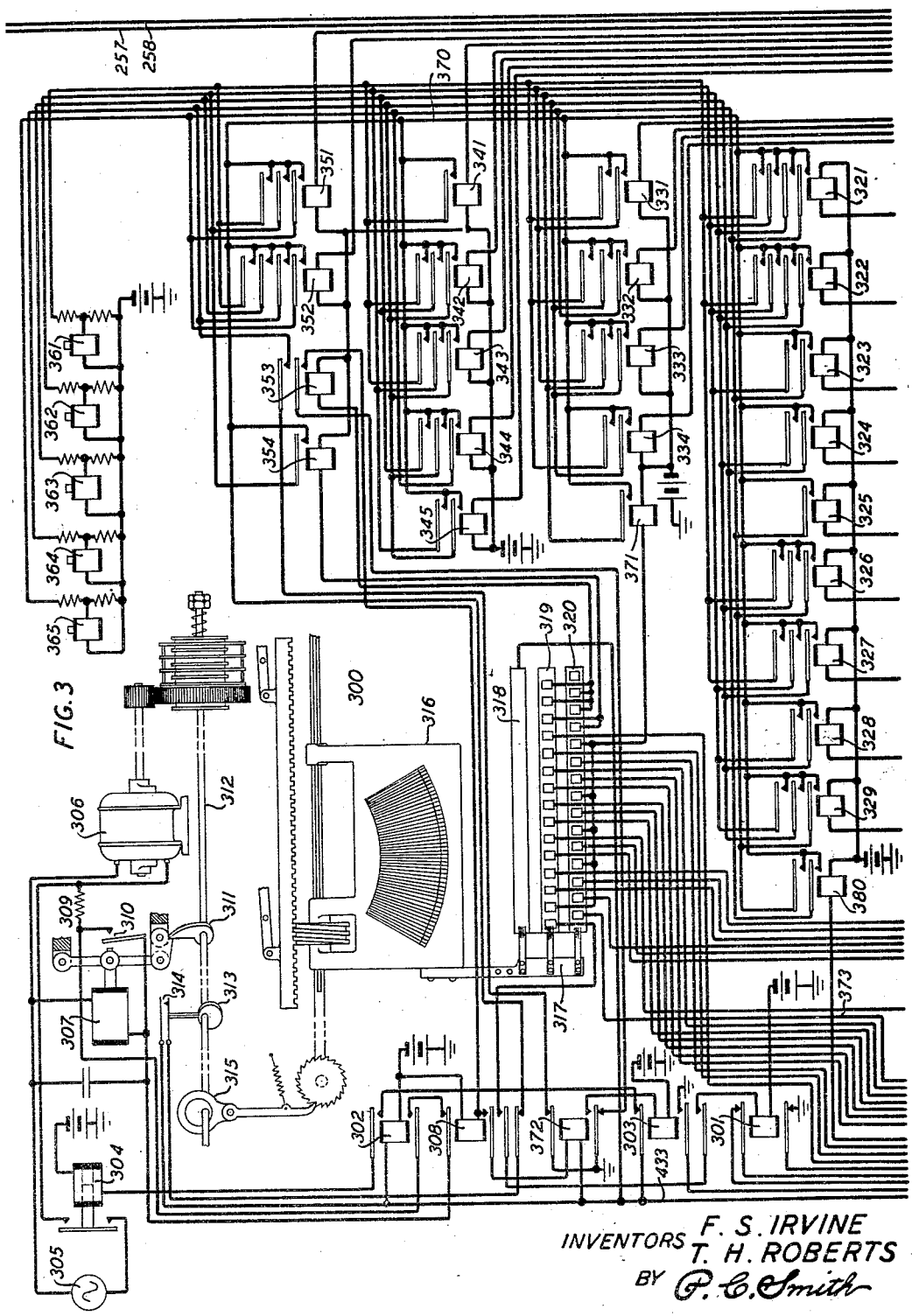

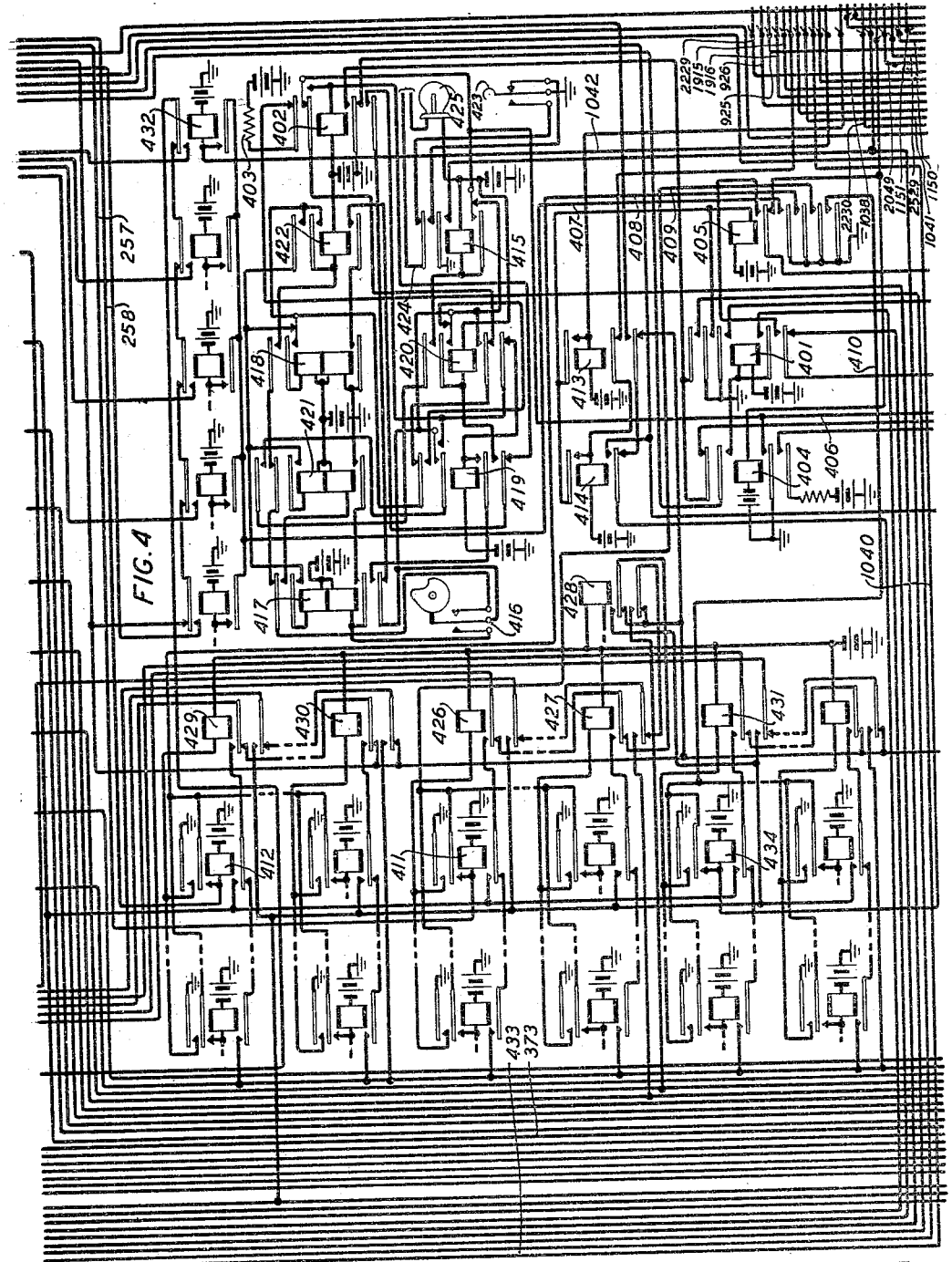

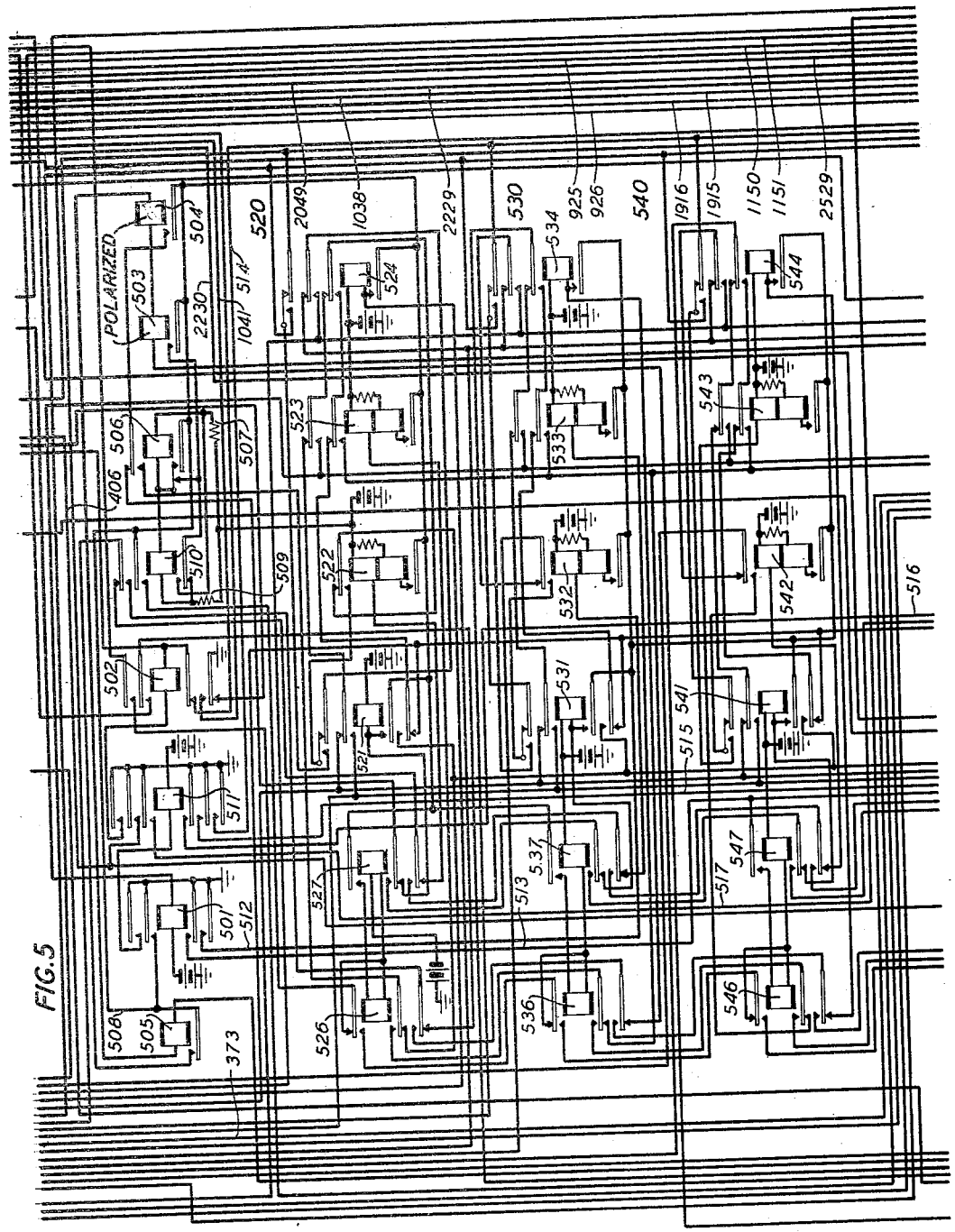

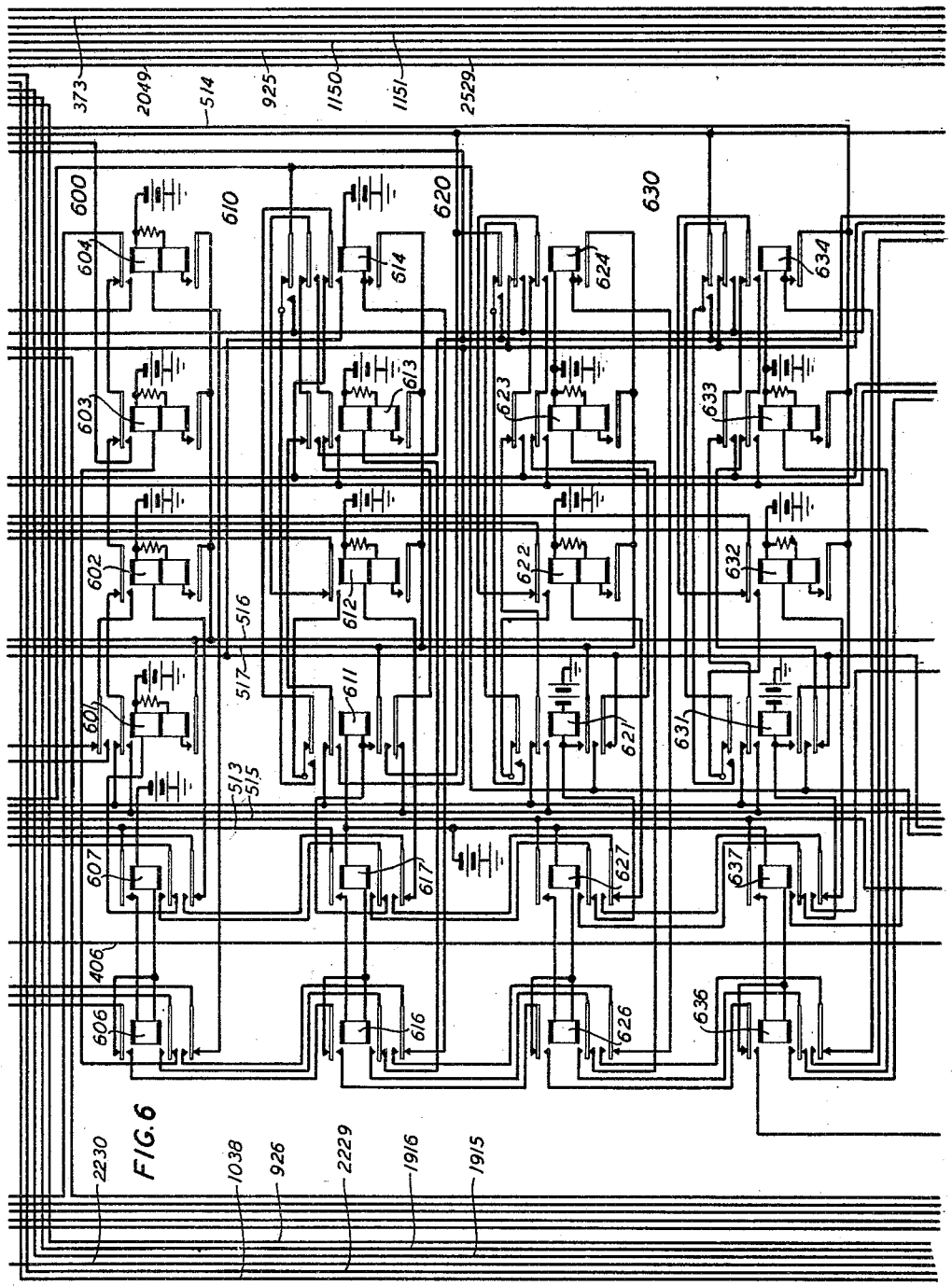

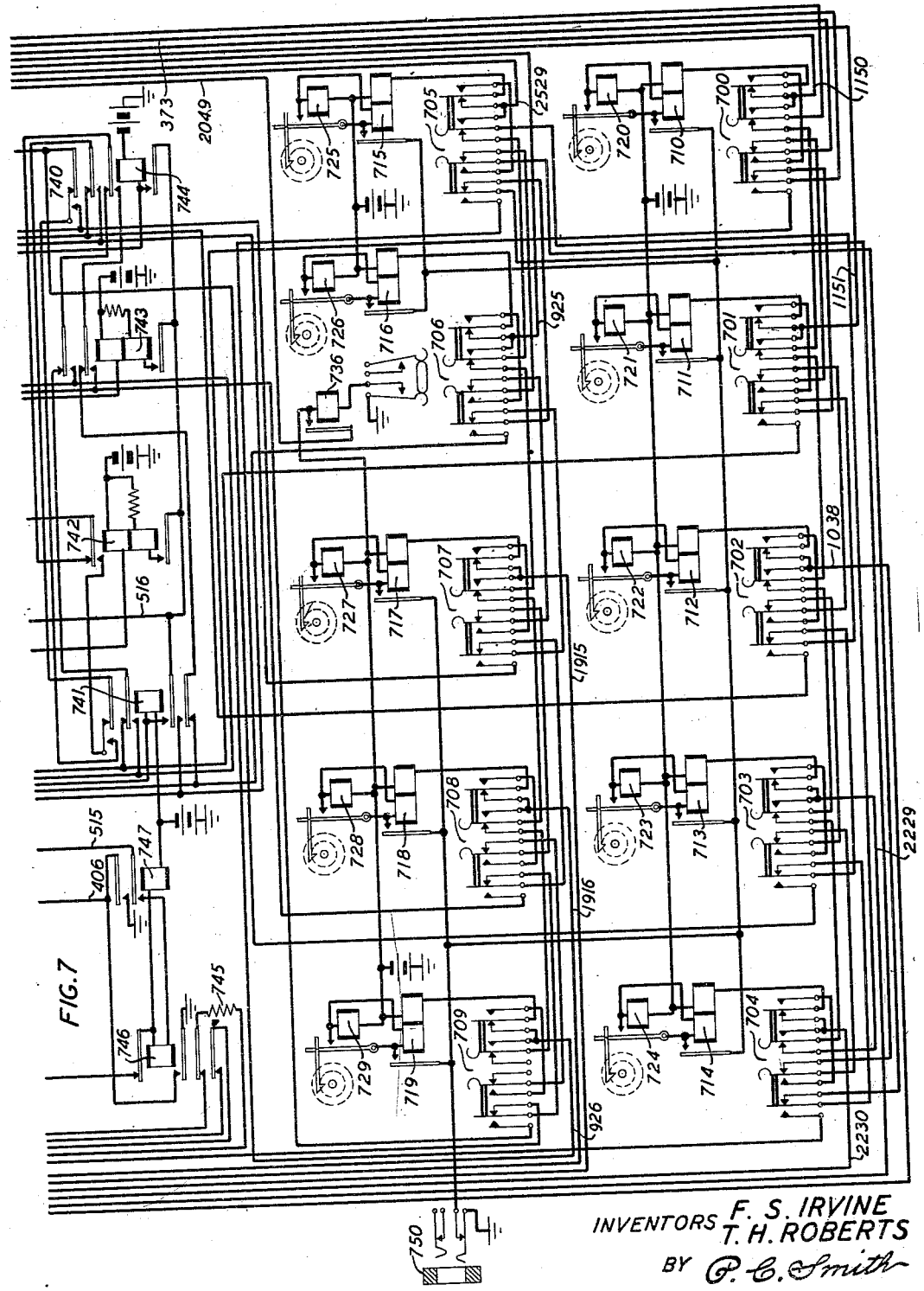

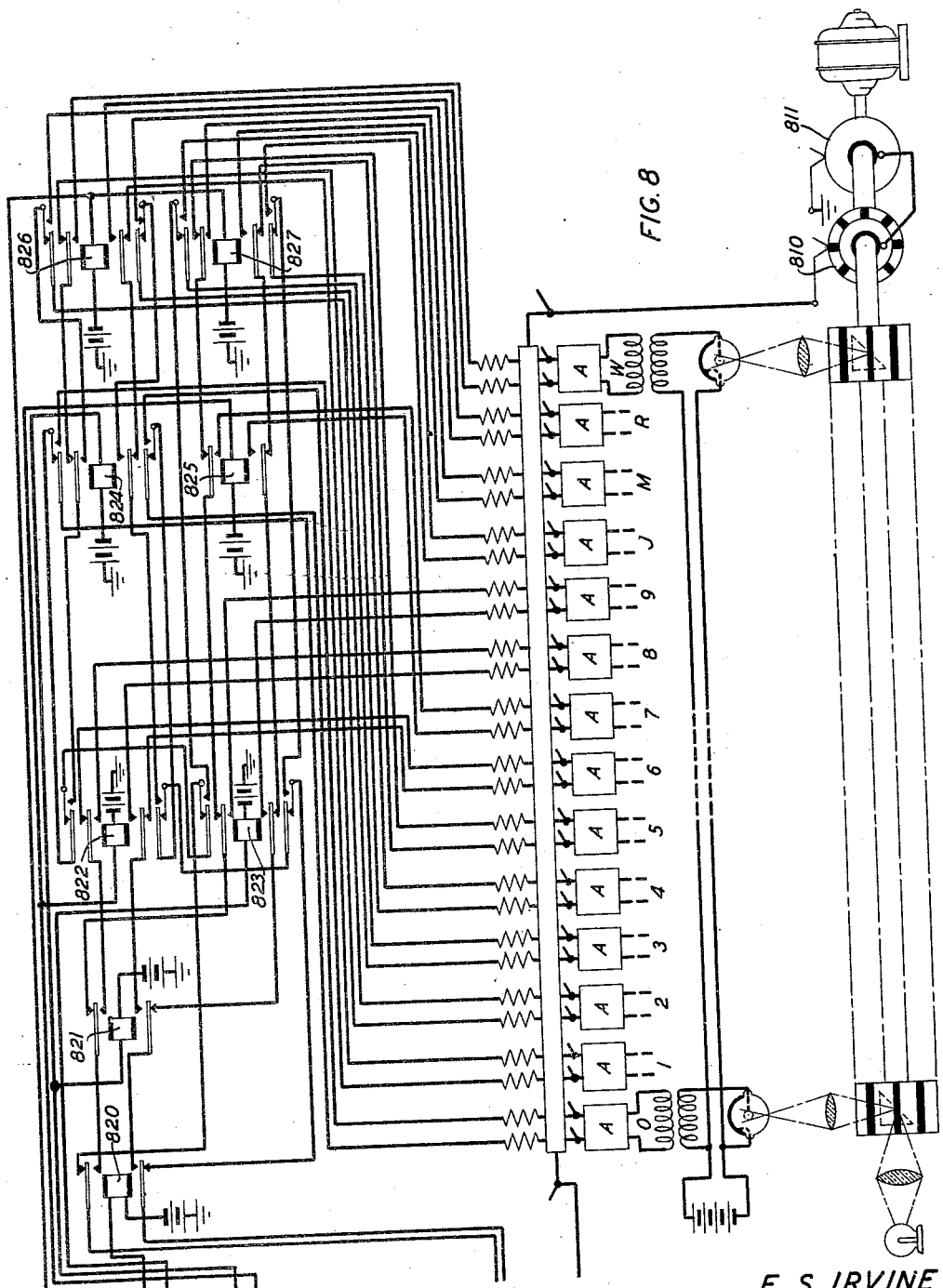

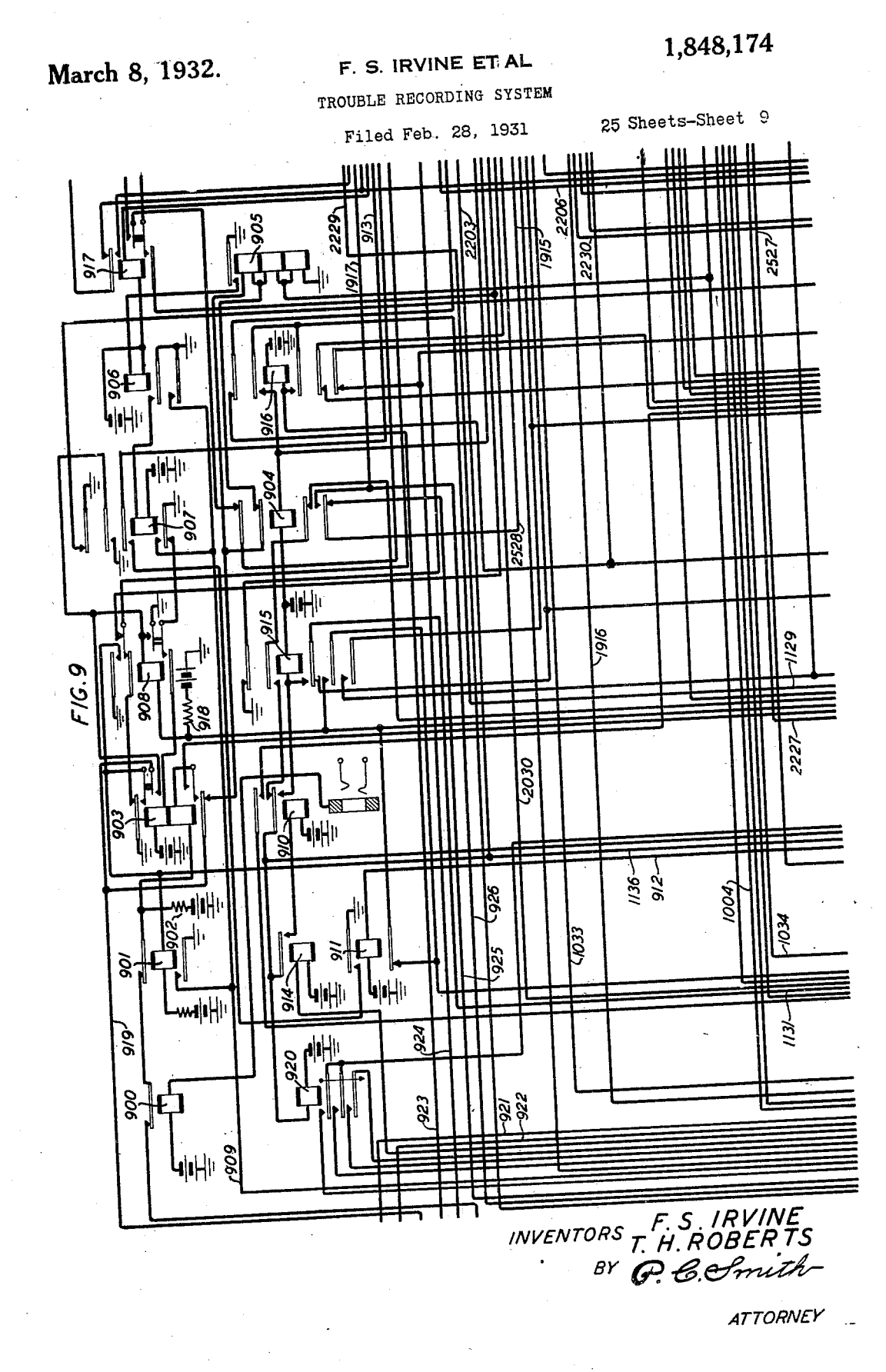

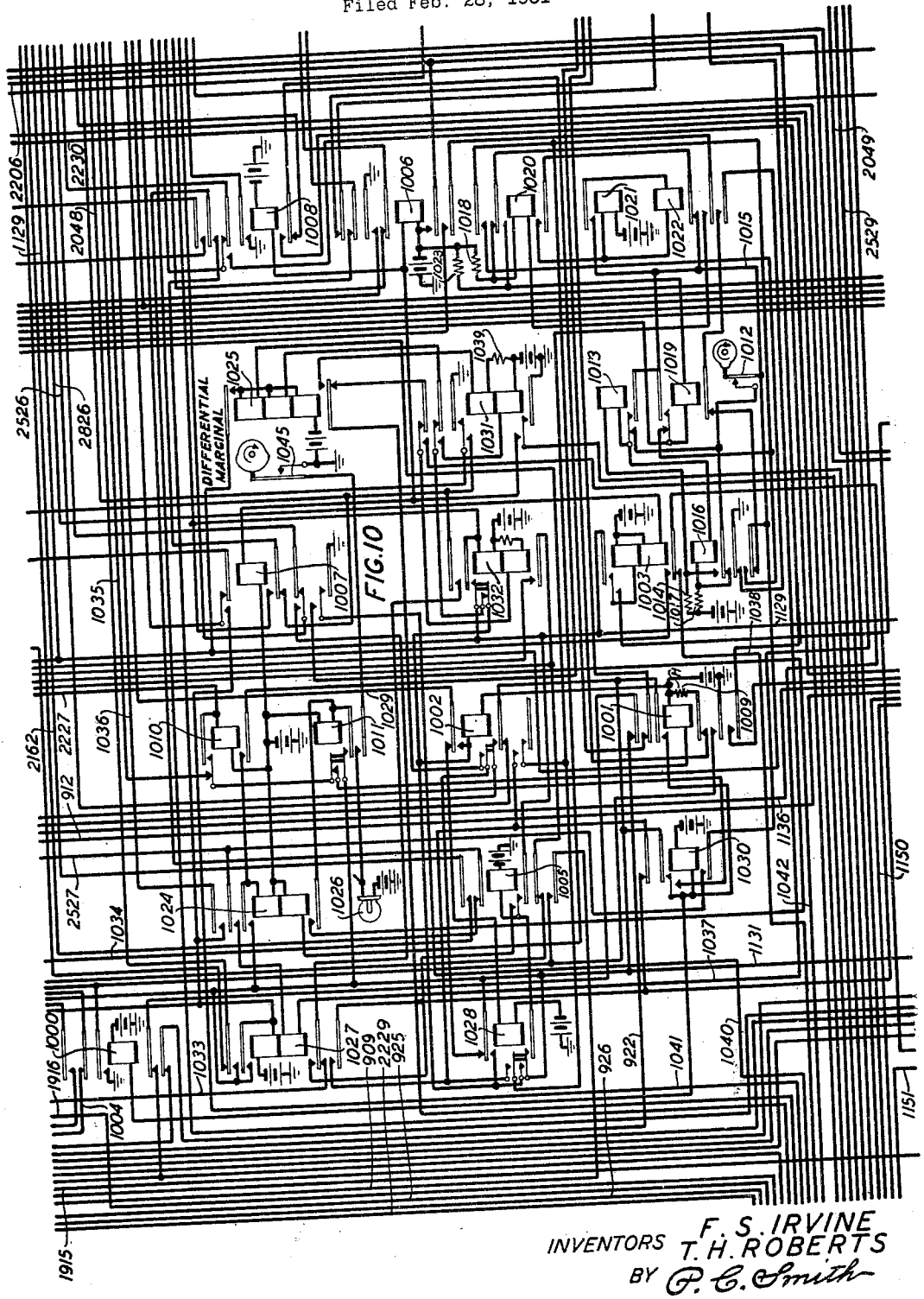

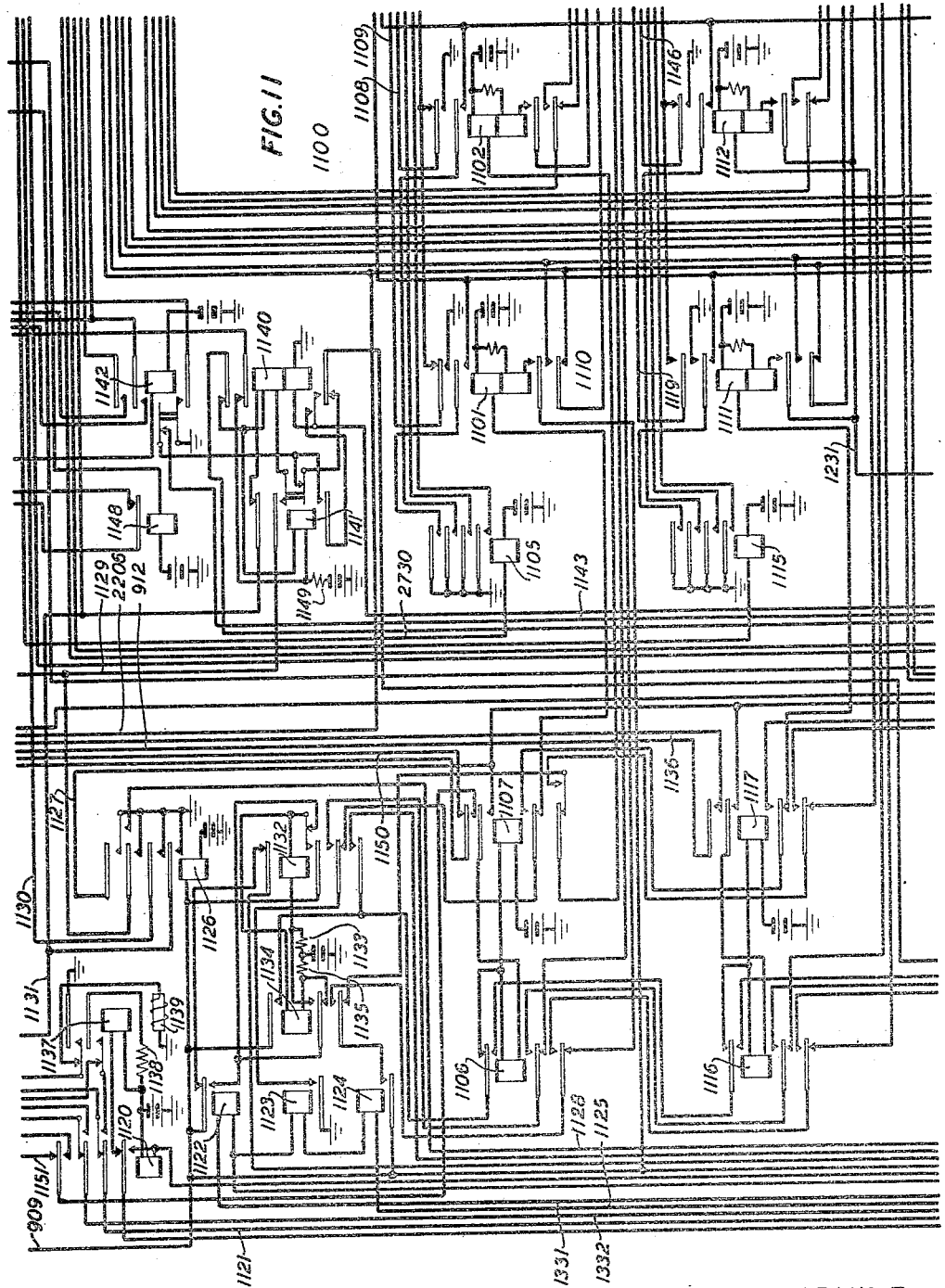

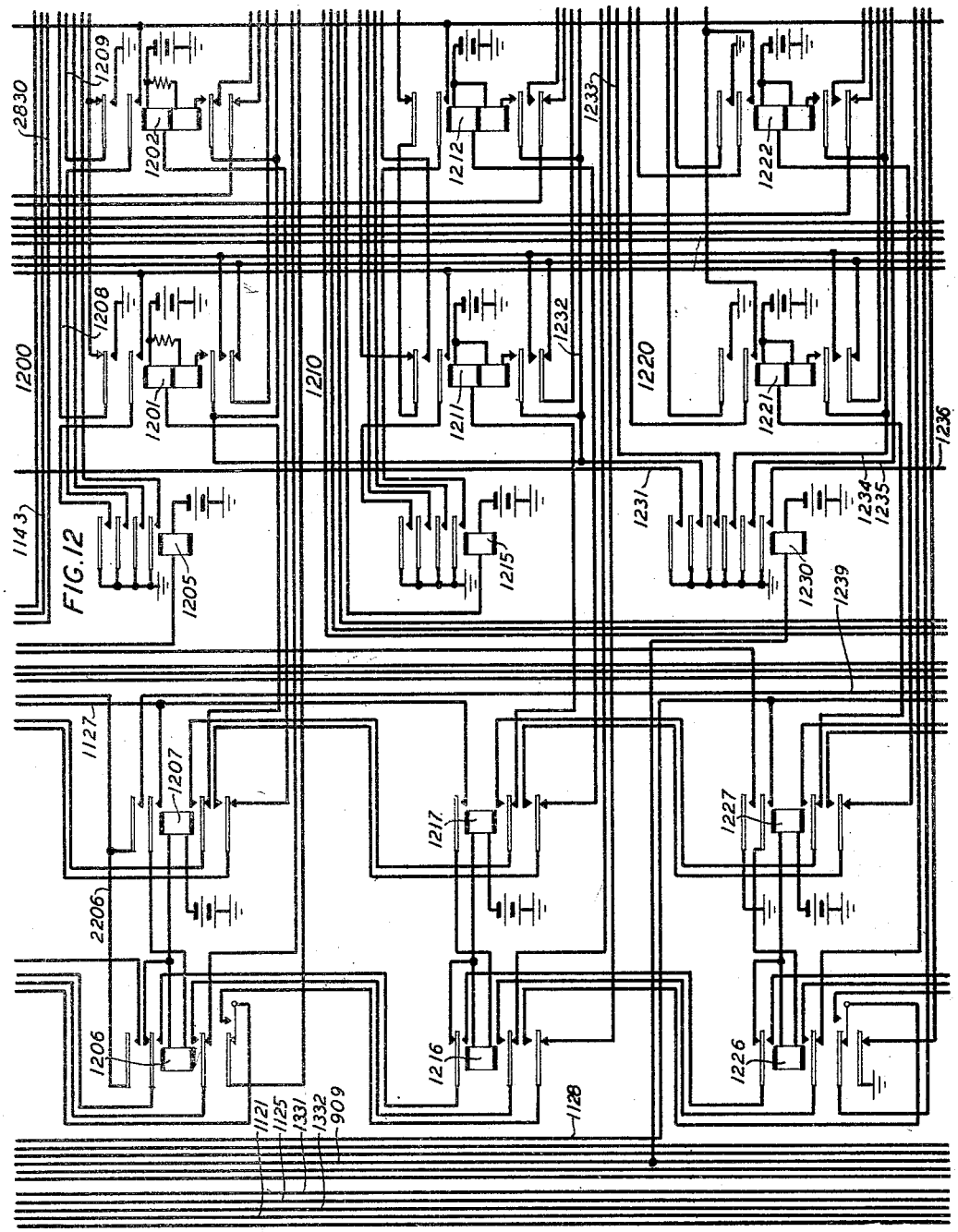

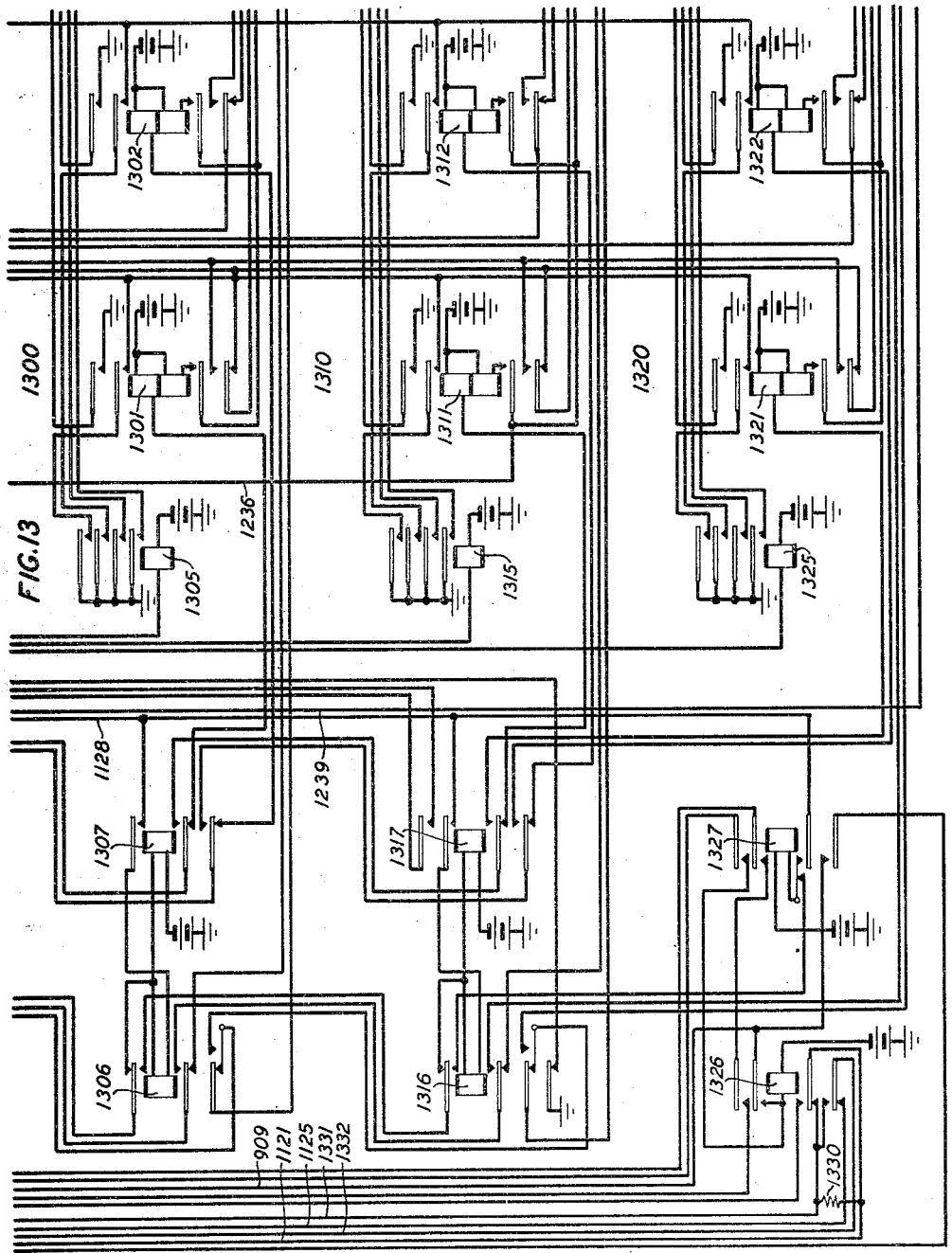

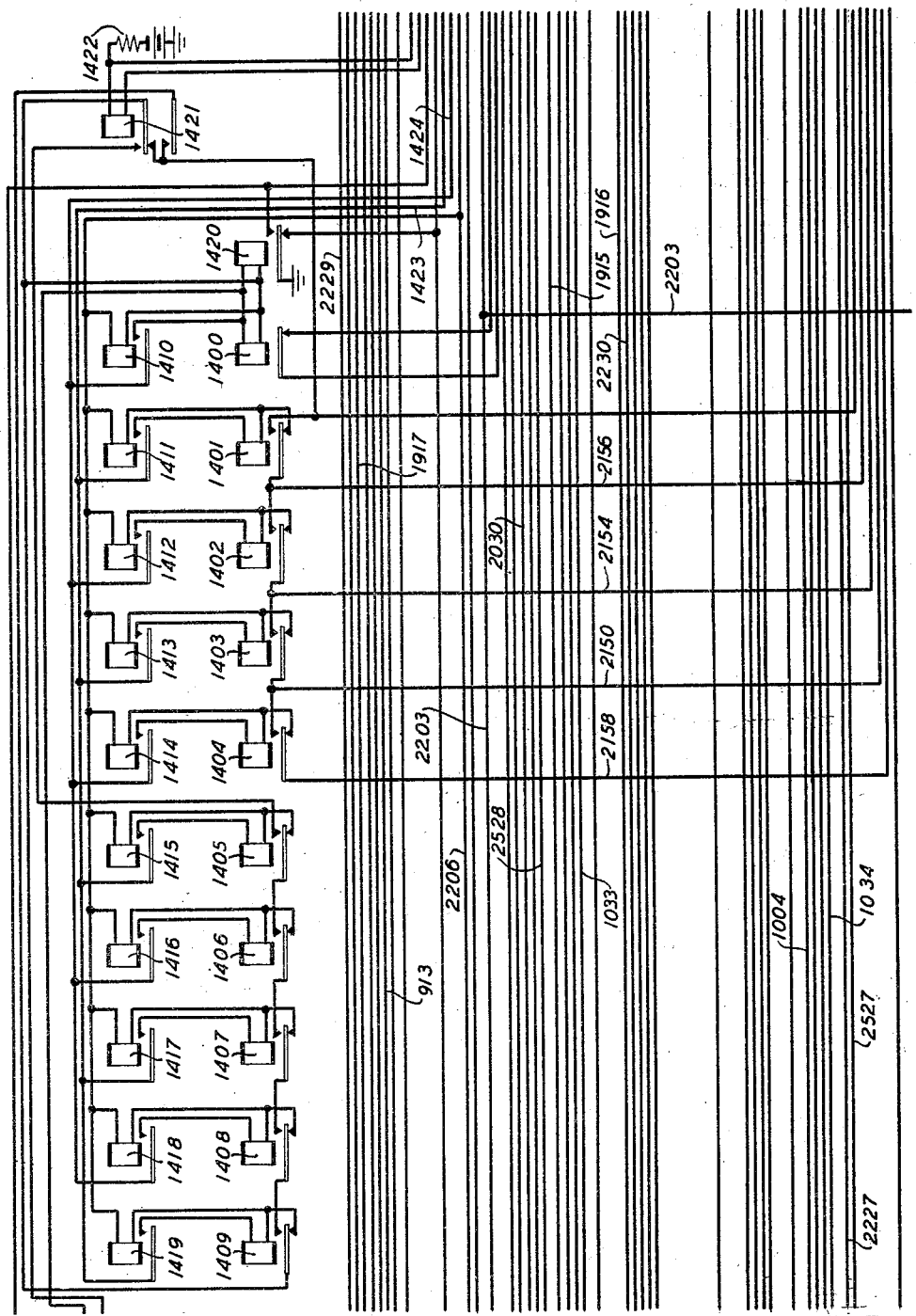

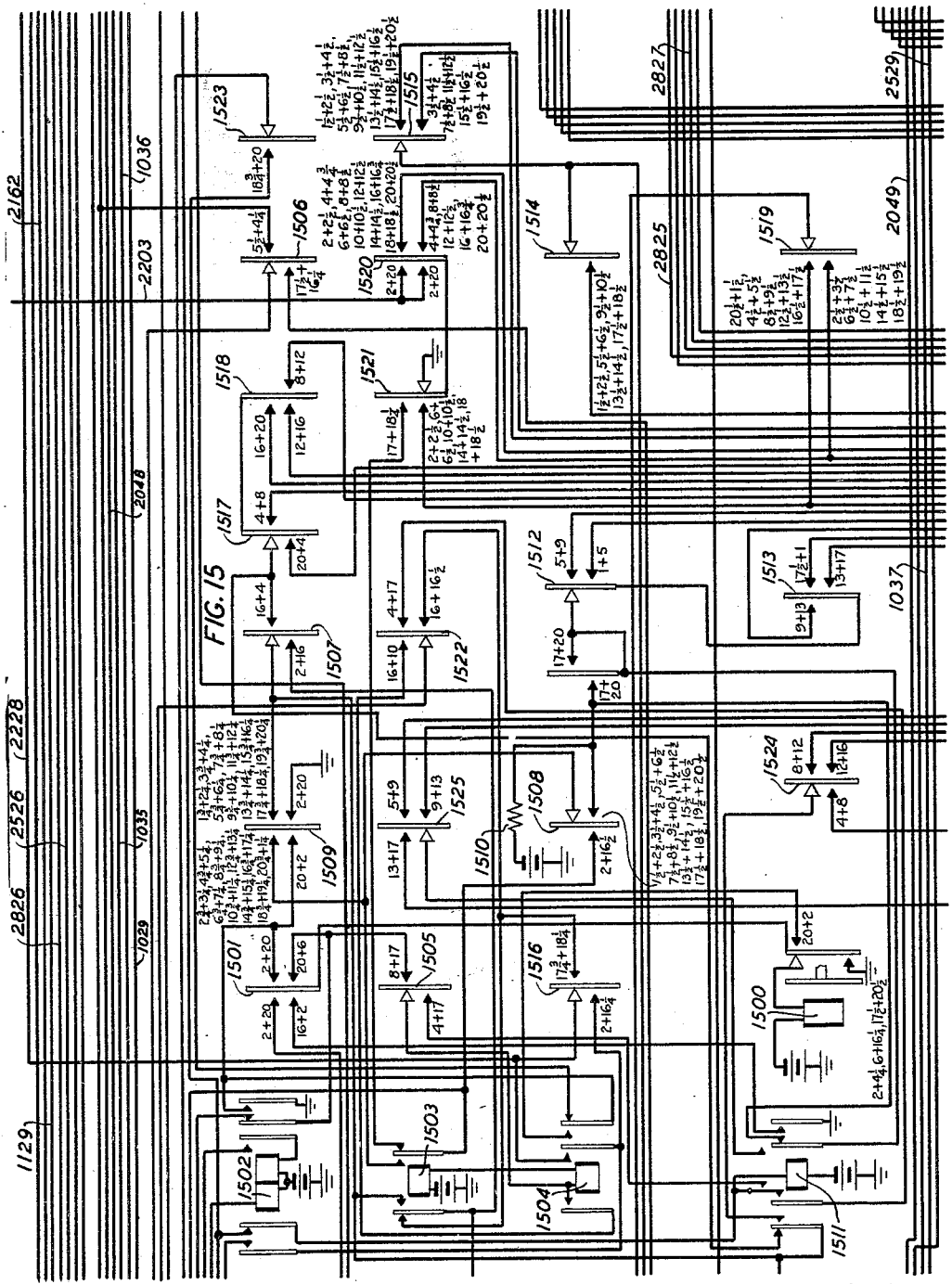

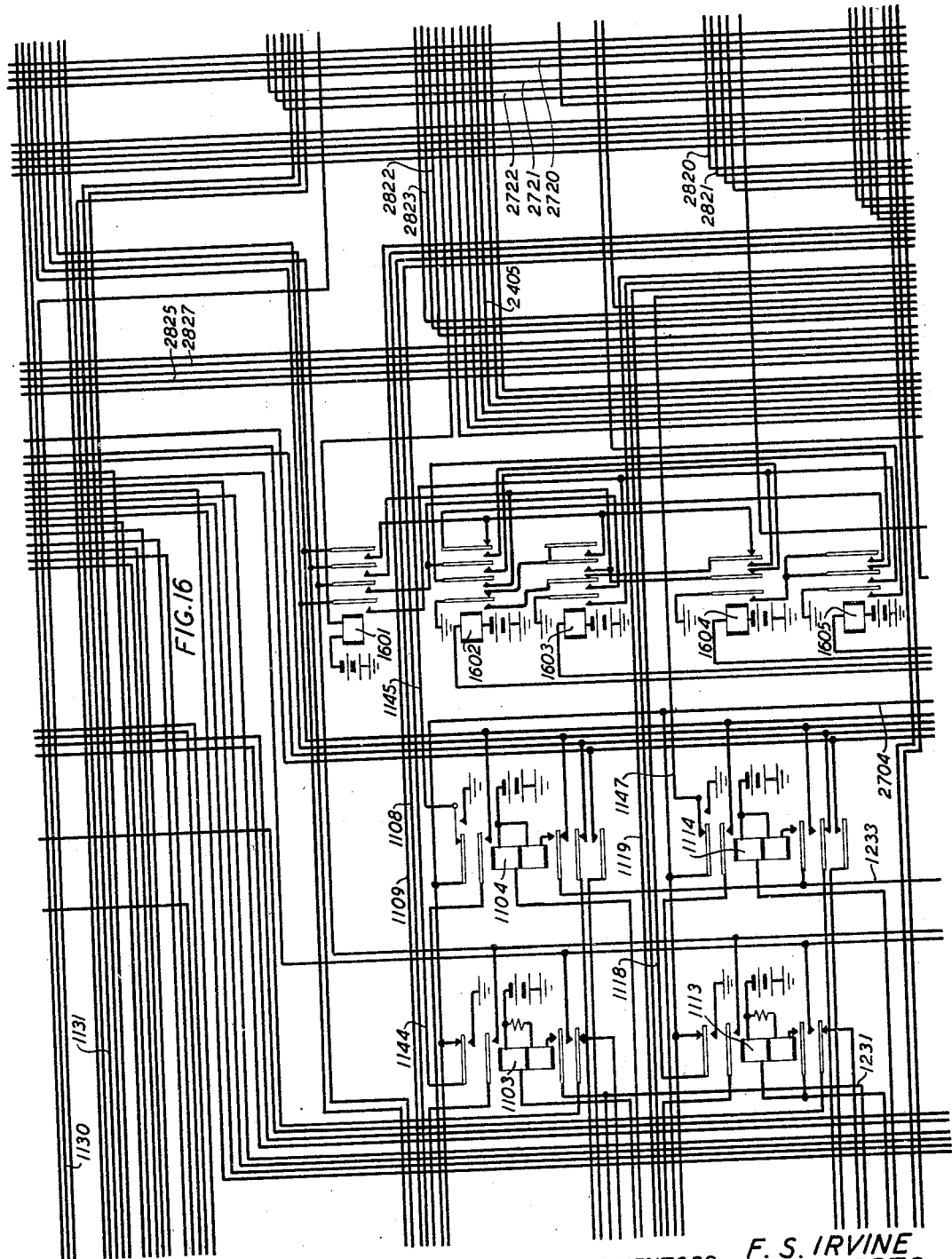

March 8, 1932.  F. S. IRVINE ET AL  1,848,174
TROUBLE RECORDING SYSTEM
Filed Feb. 28, 1931   25 Sheets-Sheet 24

INVENTORS F. S. IRVINE
T. H. ROBERTS
BY P. C. Smith
ATTORNEY

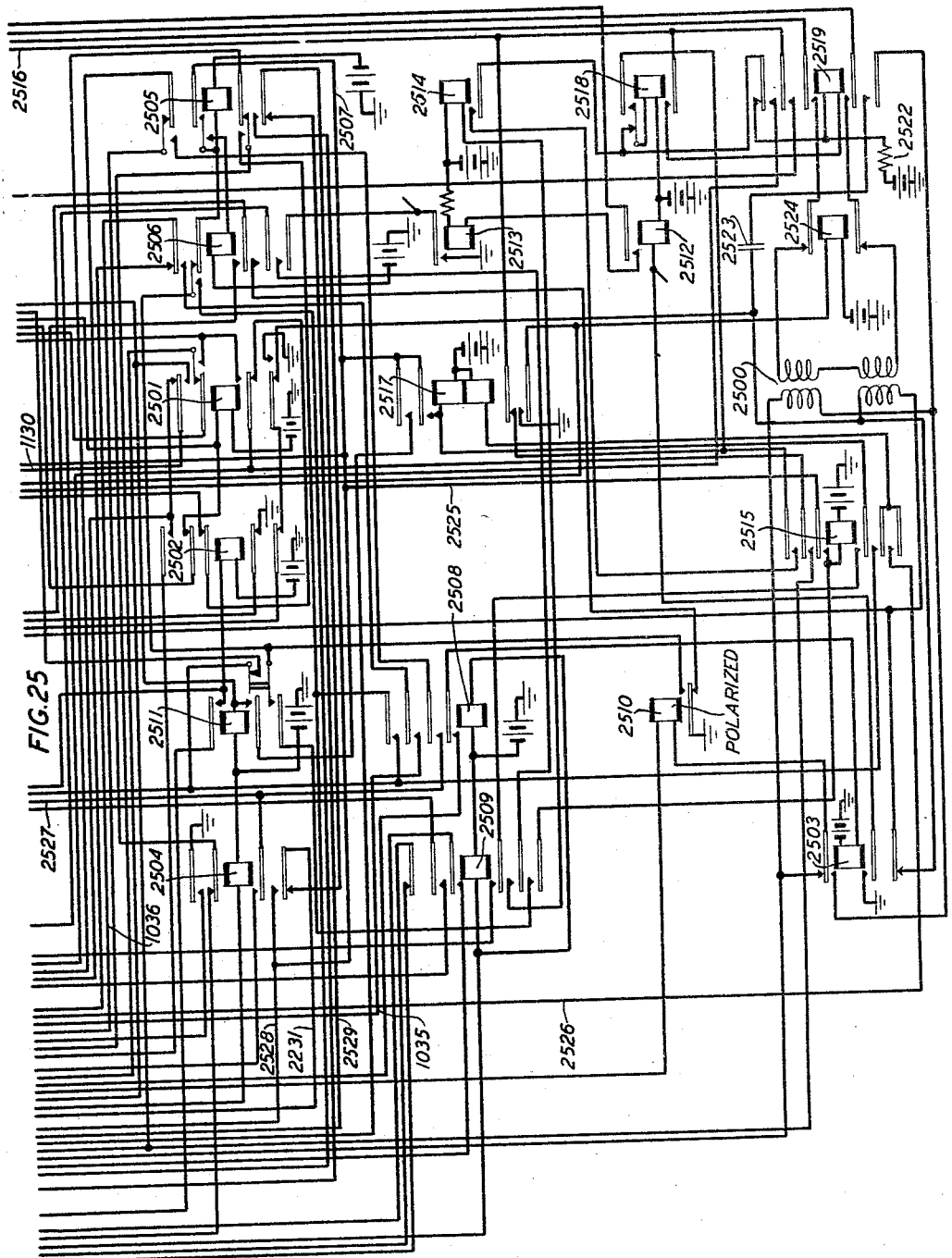

Patented Mar. 8, 1932

1,848,174

UNITED STATES PATENT OFFICE

FRANK S. IRVINE, OF GREENLAWN, AND THOMAS H. ROBERTS, OF NEW YORK, N. Y., ASSIGNORS TO BELL TELEPHONE LABORATORIES, INCORPORATED, OF NEW YORK, N. Y., A CORPORATION OF NEW YORK

TROUBLE RECORDING SYSTEM

Application filed February 28, 1931. Serial No. 518,943.

This invention relates to telephone systems in which connections are established by means of automatically operated equipment and has for its object to increase the accuracy and flexibility with which the operation of such equipment may be recorded.

In such systems it has become customary when calls are not completed within a reasonable time to release as much of the apparatus as possible, signaling an attendant and giving him an indication of which piece of apparatus did not function properly. In the case of complicated structures such as register senders, the mere fact that the particular sender was responsible for the failure to complete a call is of little assistance in actually determining the source of the trouble.

In accordance with the present invention means is provided to make a permanent record of the apparatus involved and the extent of operation before failure occurs. For this purpose a trouble recorder is provided. The operation of the sender in controlling the establishment of the connection is divided into a plurality of stages and timing means is released and reoperated at the beginning of each stage. If the timing means completes its operation before the particular stage is completed, a meter in the recorder individual to that stage is operated and the remaining equipment is released. If the number of such recorded failures in any stage seems excessive, means is provided for making a printed record of the identity of the sender, the identity of the district selector with which it was associated, and the wanted number. The wanted number is transmitted to the recorder by means of code impulses from the impulsing switch of the sender and the association of the printer with the sender prepares the impulsing switch for operation irrespective of the class of call which was being extended and irrespective also of the stage to which the call had progressed.

The invention will be more clearly understood from a consideration of the following detailed description of the operation of the system in connection with the drawings in which Fig. 1 discloses the arrangement of the remaining figures;

Fig. 2 shows a district selector with which the sender may be employed;

Figs. 3 to 7 show the trouble recording equipment of which Fig. 3 shows the printer; Fig. 4 certain recording and controlling relays; Fig. 5 and 6 the register relays and Fig. 7 the keys and meters;

Figs. 8 to 25 inclusive show the register sender of which Fig. 8 shows the call announcer mechanism and relays; Figs. 9 and 10 show control and timing relays of the sender; Figs. 11 to 13 and 16 to 18 show the incoming registers; Fig. 14 shows the counting relays; Fig. 15 shows the call indicator impulser switch; Figs. 19 and 22 show two of the sequence switches for controlling the operation of the sender; Figs. 20 and 21 show the selection control registers; Figs. 23, 24 and 25 show the relays which control the transmission of step-by-step pulses and call announcement.

The sender in connection with which the present invention has been disclosed is a tandem sender of the same kind as that disclosed and claimed in Patent 1,840,132, granted to T. H. Roberts, Jan. 5, 1932, and reference is hereby made to that application for such details of the operation of the system which may be omitted from the present description. This sender is one arranged to receive the designations of wanted lines by means of call indicator code impulses and to complete connections to other offices by means of revertive impulses, directive impulses, call indicator code impulses, or call announcement.

As mentioned above, the operation of the sender is divided into a plurality of stages and each stage is timed to determine whether it is performed in the proper length of time. At the successful completion of each stage of the operation the timing arrangement is restored to normal and reoperated to time the next stage.

Briefly the stages of the operation of the sender in controlling a call to a panel type office as indicated by the timing equipment are as follows:

1. From the seizure of the sender through the registration of the first digit.
2. Registration of the code digits, decoding and district selections.
3. Office selections.
4. Test of outgoing trunk.
5. Incoming selections.
6. Final selections.
7. Advance of the district selector and release of the sender.

In the case of calls to offices of certain other types, stages 5 and 6 are meaningless and the equipment is arranged to substitute a stage known as awaiting assignment.

In general the stages as registered on the trouble recorder coincide with those of the timing mechanism. However two minor periods are recognized under stage 2, namely,
1. Completion of registration and
2. Completion of decoding or translation.

When a call is to be extended under the control of a tandem sender, such as the one disclosed, a trunk outgoing to the tandem office is seized, which trunk terminates in a district selector switch such as district selector 200, Fig. 2. When the trunk is seized, a relay is connected across the tip and ring conductors at the originating office and relay 201 is operated in turn operating relays 204 and 207. The operation of these relays causes a link circuit (not shown) to associate the district selector with an idle sender. When the link circuit connects with the district selector, relay 212 is operated and sequence switch 206 advances to position 3. These operations are described in detail in the above-identified Roberts patent.

An idle sender is characterized by battery through a resistance such as resistance 902, connected to the test terminals of the link circuit sender selector. When the sender is found, this battery causes the link circuit sequence switch to advance to a position in which a circuit is closed from ground through the lower and middle windings of relay 905 inner upper contact of relay 904, lower back contact of relay 903, conductor 919 through the link circuit to conductor 221, and the winding of relay 208 and battery. Relay 208 operates in turn operating relay 212 which advances the district selector sequence switch to position 4.

Relay 905 operates in the circuit of relay 208 in turn operating relay 906 and relay 907. Relay 907 operates relay 908 which locks over its inner lower front contact and closes a circuit for operating relay 901. The operation of relays 906, 907 and 901 connects ground to conductor 909 operating relays 1126 and 1230 to supply off-normal ground to the various parts of the sender. When relay 1126 operates ground is connected to conductor 1131 and over the lower back contact of relay 1002 to the winding of relay 920 and battery. Relay 920 prepares circuits which become effective later.

The operation of relay 908 also closes a circuit from ground over its upper front contact, conductor 2203, left contacts of cam 2221, conductor 2227, to the winding of relay 1010 and battery. Relay 1010 connects ground from conductor 2227 over its upper front contact, normal contact of relay 1011, conductor 1015, and the vibrating contact of interrupter 1012 thereby initiating the operation of the timing relays which will be described in detail hereinafter.

Relay 901 in operating also removes the battery which marks the sender as idle thereby advancing the link sequence switch to a position where conductor 921 is connected to conductor 228; conductor 922 is connected to conductor 227; conductor 923 is connected to conductor 231; conductor 924 is connected with conductor 214; and the connection between conductors 919 and 221 is maintained through a relay which controls the release of the link circuit.

When relay 208 operated it closed a circuit for relay 223 which closes the incoming pulsing circuit from the tip conductor over the left contacts of cam 202, outer upper front contact of relay 223, upper right and lower left contacts of cam 225, upper back contact of relay 226 to conductor 228, through the link to conductor 921 and thence over the outer lower back contact of relay 1000, next to the inner upper back contact of relay 1120, conductor 1121, inner lower back contact of relay 1326 in parallel with resistance 1330, conductor 1331, windings of relays 1122, 1123 and 1124 in series, conductor 1125, outer lower back contact of relay 1326, conductor 1332, next to the outer upper back contact of relay 1120, inner lower back contact of relay 1000, outer upper back contact of relay 1001 to conductor 922, through the link circuit to conductor 227, outer left back contact of relay 229, outer lower back contact of relay 226, upper contacts of cam 224, outer lower front contact of relay 223, left contacts of cam 203 to the ring conductor. Relay 208 also operates relay 212 which advances the sequence switch 206 into position 4 where the tip conductor is extended to conductor 228 and the ring conductor is extended to conductor 227 independently of relay 223.

The operation of relay 223 disconnects battery and ground through the windings of relay 201, from the tip and ring conductors leading to the sender at the originating office thus releasing the relay of that sender which initiates the transmission of relay call indicator impulses. Relay 201 is held operated after relay 223 operates and until the sequence switch leaves position 3½ under the control of relay 223, and in position 3¾ to 12½ under the control of relays 226 and 229.

Relay 1122 is polarized to respond to negative impulses; relay 1123 is polarized to respond to positive impulses; relay 1124 is marginal so that it responds to heavy impulses of either polarity received over the impulsing circuit above traced. Assuming that the called subscriber's number is CHelsea 3—5678 the following code will be transmitted to the tandem sender:

|    | C | 2          |          | Heavy<br>Negative | Light<br>Negative |
|----|---|------------|----------|-------------------|-------------------|
|    | H | 4          |          | Light<br>Negative | Light<br>Negative |
|    |   | 3 Positive | Positive | Heavy<br>Negative | Light<br>Negative |
|    |   | 0          |          | Light<br>Negative | Light<br>Negative |
|    |   | 5          |          | Heavy<br>Negative | Heavy<br>Negative |
|    |   | 6 Positive |          | Light<br>Negative | Heavy<br>Negative |
|    |   | 7          |          | Heavy<br>Negative | Heavy<br>Negative |
|    |   | 8 Positive |          | Heavy<br>Negative | Heavy<br>Negative |

The first code impulse which, as shown above, is a heavy negative causes the operation of relays 1122 and 1124. Relay 1122 in operating connects ground from conductor 909 over its front contact, normal contact and winding of relay 1132, resistance 1133 to battery. Relay 1132 operates and locks to conductor 909 over its lower alternate contact. Relay 1132 closes a circuit from battery through resistance 1135, winding of relay 1134, alternate contact of relay 1132 to conductor 909 to prepare for the operation of relay 1134. Relay 1134 is prevented from operating at this time by ground connected over the contact of relay 1122 and the back contact of relay 1134 to resistance 1135 in shunt of the winding of relay 1134. Relay 1124 in operating connects ground from conductor 909 over its front contact, outer lower back contact of relay 1134, outer lower back contact of relay 1107 to the upper winding of relay 1102 of the tandem hundreds register 1100, and battery. Relay 1102 locks through its lower winding to grounded conductor 1231. When the pulse terminates, relays 1122 and 1124 release. Relay 1122 removes the shunt from around the winding of relay 1134 which now operates. With relay 1134 operated a circuit is closed from battery through the winding of relay 1107, upper back contact of relay 1106, upper front contact of relay 1134 to grounded conductor 909. Relay 1107 locks through the winding of relay 1106, inner upper front contact of relay 1107 to grounded conductor 1127. Relay 1106 is shunted by the operating ground for relay 1107 until relay 1134 releases. The next pulse received is a light negative pulse and therefore relay 1122 operates alone. It closes a circuit from ground over conductor 909, front contact of relay 1122, lower front contact of relay 1134 to resistance 1133 in shunt of the winding of relay 1132 which now releases. The first lower contact of relay 1132 is a make-before-break contact so that relay 1134 is held operated over the normal contact of relay 1132 and the front contact of relay 1122 to conductor 909 until the pulse terminates at which time relay 1134 also releases. When relay 1134 releases relay 1106 operates in the locking circuit of relay 1107. Relays 1107 and 1106 transfer the circuits controlled by relays 1122, 1123 and 1124 to the tandem tens register 1110. It will be apparent that only relay 1102 is operated in the tandem hundreds register 1100.

During the reception of the first pulse of the next digit, relay 1122 is operated alone as above described and in turn operates relay 1132. At the end of the pulse relay 1134 is also operated, closing a circuit from battery through the winding of relay 1117, upper back contact of relay 1116, upper front contact of relay 1106 to grounded conductor 909 over the front contact of relay 1134. The second pulse of this digit is a positive pulse causing the operation of relay 1123. Relay 1123 closes a circuit from ground over its front contact, middle lower front contact of relay 1132, inner lower front contact of relay 1106, inner lower back contact of relay 1116 to the upper winding of relay 1113 and battery. Relay 1113 locks through its lower winding to grounded conductor 1231. The third pulse of the digit causes the operation of relay 1122 which releases relay 1132 and 1134 as previously described and permits the operation of relay 1116 in the locking circuit of relay 1117. Relay 1113 alone of the tandem tens register 1110 is operated.

With relay 1117 operated a circuit is closed from battery through the winding of relay 911, conductor 912, outer upper contact of relay 1117, conductor 1136 to ground at the outer upper front contact of relay 908. Relay 911 in operating connects ground over its front contact, innermost upper contact of relay 907, conductor 913, lower left contact of cam 2204, to the winding of sequence switch magnet 2200 and battery, advancing sequence switch 2200 to position 2. In position 2 a circuit is closed from ground over the upper left contact of cam 2201, upper right contact of cam 2202, to conductor 2203. This circuit provides a holding circuit for relay 911 and also provides off-normal ground for a number of other circuits. The advance of sequence switch 2200 from position 1 opens the circuit of relay 1010 which releases removing ground from conductor 1015 and thereby releasing the timing relays which may have operated under the control of interrupter 1012 and locked to conductor 1015. When sequence switch 2200 reaches position 2, the circuit of relay 1010 is reclosed and the timing function is again started.

The first pulse of the third digit is a positive pulse. A circuit is therefore closed from ground at the front contact of relay 1123, outer lower back contact of relay 1132, which has not been operated as yet, inner lower front contact of relay 1107, inner lower front contact of relay 1117, inner lower back contact of relay 1207 to the winding of relay 1201 and battery. Relay 1201 locks through its lower winding to grounded conductor 1232. The second pulse is a heavy negative pulse causing the operation of both relays 1122 and 1124. Relay 1122 causes the operation of relay 1132 while relay 1124 closes a circuit from grounded conductor 909 over the lower back contact of relay 1134, outer lower front contacts of relays 1107 and 1117, outer lower back contact of relay 1207 to the upper winding of relay 1202 and battery. Following this pulse, relay 1134 operates in turn operating relay 1207. The third pulse which is a light negative pulse releases relays 1132 and 1134 and permits relay 1206 to operate. Relays 1201 and 1202 are operated in the tandem units register.

Assuming that the called subscriber's number includes no stations digit, the next digit received consists of two light pulses which are the equivalent of the digit zero. No register relays of stations register 1210 will be operated but relays 1216 and 1217 will be operated under the control of relay 1122 to advance the circuit to the next register.

The remaining digits are recorded in a manner similar to that above described on registers 1220, 1300, 1310 and 1320 resulting in the operation and locking of relays 1222 and 1224 of thousands register 1220, relays 1301 and 1304 of hundreds register 1300, relays 1312 and 1314 of tens register 1310 and relays 1321, 1322 and 1324 of units register 1320.

Relays 1326 and 1327 operate in a slightly different manner from the other transfer relays. The operation of relay 1134 during the transmission of the units digit closes a circuit from battery through the winding of relay 1327 and its normal contact, upper front contacts of relays 1316, 1306, 1226, 1216, 1206, 1116 and 1106 upper contact of relay 1134 to grounded conductor 909. Relay 1327 locks over its lower alternate contact to grounded conductor 1128. It also prepares a circuit from battery through the winding of relay 1326, outer upper contact of relay 1327 to the upper back contact of relay 1132, back contact of relay 1122 and grounded conductor 909. This circuit is not completed until relay 1122 releases the second time at the completion of the digit. Relay 1326 in operating locks to grounded conductor 909. With relays 1326 and 1327 operated the connection of the tip and ring conductors to relay 1122 is altered to render that relay responsive to a final heavy positive pulse. This altered circuit may be traced from conductor 921, to conductor 1121, as before, and thence over the inner lower front contact of relay 1326, to the winding of relay 1122 in parallel with resistance 1330, over the outer lower front contact of relay 1326 to conductor 1332 and back to conductor 922 as previously traced. Relay 1122 operates in response to the heavy final positive pulse causing the operation of relay 1132 which prepares the circuit for relay 1134 as before. When relay 1122 releases relay 1134 operates. At this time the operation of relay 1134 closes a circuit from grounded conductor 909, upper front contact of relay 1134, outer lower front contact of relay 1132, inner upper front contact of relay 1327, outer upper front contact of relay 1327, outer upper front contact of relay 1326 to the winding of relay 1120 and battery.

When relay 1327 operated a circuit was closed from battery through the winding of relay 1137, inner back contact of relay 1120, outer lower front contact of relay 1327 to grounded conductor 909. Relay 1137 is released when relay 1120 operates but two circuits are momentarily closed, one from battery through resistance 1138, inner upper front contact of relay 1137, next to the inner upper front contact of relay 1120 to the tip conductor 921 and from ground over the upper front contact of relay 1137, outer lower contact of relay 920, next to the outer upper front contact of relay 1120 to the ring conductor 922 charging the interoffice trunk, to prevent the false operation of relay 914 due to capacity of the trunk if the trunk is opened at this time. When relay 1137 completely releases the ring conductor is extended over its upper normal contact to resistance 1139 and ground and the tip conductor is extended over next to the inner upper front contact of relay 1120, inner upper back contact of relay 1137 to the winding of relay 914 and battery.

Following the transmission of the final heavy pulse, a relay is connected across the tip and ring conductors at the originating office which completes the circuit of relay 914. Relay 914 closes a circuit from battery through the winding of relay 910, front contact of relay 914, lower back contact of relay 1002 to grounded conductor 1131. Relay 910 in turn closes an operating circuit for relay 915 to grounded conductor 1131 and relay 915 locks directly to conductor 1131. These relays prepare circuits to care for the dismissal of the sender if the call is abandoned.

When relay 1207 operated during the reception of the third code digit, a circuit was closed from battery, over the contacts of cam 2205, conductor 2206, upper front contact of relay 1207 to conductor 1239 to prepare certain relays of the decoder connector for operation. When relay 1206 operated after the complete registration of the tandem units digit, a circuit was closed from battery over conductor 2206, outer upper front contact of relay 1206, lower back contact of relay 1140, lower back contact of relay 1141, back contact of relay 1142 to conductor 1143 and thence to the decoder connector to cause the association of an idle decoder with the sender.

The decoder comprises a set of incoming registers which are positioned to correspond to the setting of the tandem hundreds, tandem tens and tandem units registers, respectively. These settings are translated to identify the routing indicated, by operating a corresponding relay. This relay in turn sets a group of outgoing registers which control the settings of the selection control registers 2100, 2110, 2120, 2130 etc. in the sender. As soon as the decoder and the sender are connected together circuits are closed over the front contacts of the operated register relays to the windings of the corresponding relays of the incoming registers of the decoder. For example ground is connected at the outer upper front contact of relay 1102 to conductor 1108 and thence through the decoder connector to the winding of a relay corresponding to relay 1102 in the decoder. Similarly relays 1113, 1201 and 1202 cause the operation of corresponding relays in the decoder. The operation of the decoder is completely described in the Roberts patent.

Having completed its operation the decoder connects ground to the windings of the proper selection control register relays. For the purpose of tracing the operation of the sender in completing a call to a panel type office it may be assumed that the following relays are operated: none of the class relays 2001 to 2005; relay 2014 to control the use of the proper trunk testing relay; relay 2023 of the compensating resistance register; relay 2101 of the district brush register; relay 2113 of the office brush register; relays 2131 and 2132 of the district group register; and relay 2142 of the office group register.

When all of the registers have been set the decoder connects ground to conductor 2836 and thence to the lower winding of relay 1003 and battery. Relay 1003 locks to grounded conductor 1129 and closes a circuit over its inner upper front contact to the winding of relay 1142 and battery. Relay 1142 supplies locking ground for relays 2012, 2013 and 2015 directly. It also provides locking ground over the right contacts of cam 2207 for relays 2101 to 2103 and 2131 to 2134 in positions 1 to 4 of sequence switch 2200, over the left contacts of cam 2208 for relays 2011, 2111 to 2113 and 2141 to 2144 in positions 1 to 9 of sequence switch 2200 and over the lower contacts of cam 2208 for relays 2001 to 2005, 2014, and 2021 to 2024 in positions 1 to 18 of sequence switch 2200. It is therefore apparent that the selection control register relays are now locked under the control of relay 1142.

With relays 1142 and 1003 operated, the start conductor 1143 is opened releasing the decoder. The sender is now ready to control selections. Relay 1142 in operating closes the fundamental circuit to control district brush selection. This circuit may be traced from battery through the right winding of relay 212, left contacts of cam 215, conductor 214, through the link circuit to conductor 924, outer lower contact of relay 916, inner upper front contact of relay 1142, right contacts of cam 2209, winding of stepping relay 2000, upper winding of relay 2161, back contact of relay 1400, resistance 2211, left contacts of cam 2210, upper back contact of relay 916, conductor 923, through the link circuit to conductor 231, left contact of cam 232, lower left contact of cam 213 to ground. Relays 212 and 2000 operate in this circuit but relay 2161 is so polarized as not to operate at this time. Relay 212 locks to the fundamental circuit and advances sequence switch 206 to position 5. When sequence switch 206 leaves position 4 relay 223 releases. In position 5 the operating circuit of relay 212 is opened and the relay is dependent on its locking circuit. A circuit is prepared at this time from battery through the right winding and the inner right contact of relay 212, left contacts of cam 233, commutator strip 234, brush 235, upper right and lower left contacts of cam 217, to ground.

In position 5, relay 212 also closes a circuit through the winding of updrive magnet 236, and the district selector is moved upward in its brush selecting operation. As it moves upward the circuit above traced over commutator strip 234, is intermittently closed, holding relay 212 operated and shunting the winding of the stepping relay 2000 in the sender.

When relay 2000 operated it closed a circuit from ground at the inner lower back contact of relay 2031, contact of relay 2000, outer lower back contact of relay 2031, conductor 2030, upper back contact of relay 1000, conductor 1004, lower contacts of cam 2214, middle upper front contact of relay 2101, inner upper back contact of relay 2102, conductor 2156, back contact of counting relay 1401, winding of relay 1411, conductor 2206 to battery over the contacts of cam 2205. Relay 1411 operates in this circuit closing a locking circuit for itself through the winding of relay 1401, contact of relay 1411, to ground over conductor 1423 and the lower left contact of cam 2202 and the upper left contact of cam 2201. Relay 1401 cannot operate at this time since its winding is shunted by the operating ground for relay 1411. Each time that the intermittent circuit is closed over the commutator strip 234, relay 2000 releases opening the circuit above traced. At the first release of relay 2000, relay 1401 operates in the locking circuit of relay 1411 and transfers the circuit closed over conductor 2156 to the back contact of relay 1421 and the winding of relay 1410. In a similar manner relay 1410 is operated in response to the reoperation of relay 2000 when brush 235 encounters an insulating segment of strip 234 and relays 1400 and 1420 operate in the locking circuit of relay 1410 when relay 2000 is released by the brush 235 encountering a conducting segment of the strip 234. Relays 1400, 1410 and 1420 lock over conductor 1424 to ground by way of the upper left contacts of cams 2202 and 2201. Relay 1400 opens the fundamental circuit and causes the release of relay 212.

Relay 212 in releasing opens the circuit of the updrive magnet 236 and brings the district selector to rest. The circuit of relay 212 is opened at the commutator strip 234 as soon as the brush moves off the conducting segment which released relay 2000 for the last time. With relay 212 released a circuit is closed for advancing the sequence switch 206 to position 6. In this position the trip magnet 237 is operated, preparing to trip the brushes on the next upward movement of the district selector.

The operation of relay 1420 closes a circuit from ground over its front contact, upper back contact of relay 917, upper left contact of cam 2204 to the winding of sequence switch magnet 2200 and battery advancing the sequence switch out of position 2. As soon as the sequence switch leaves position 2 the locking circuit for the odd numbered counting relays is opened and when it leaves position 2¼ the locking circuit for the even numbered counting relays is opened so that relay 1420 releases, opening the circuit for magnet 2200 and bringing the sequence switch to rest in position 4, since it is advanced from position 3 over its local cam.

With sequence switch 206 in position 6 and sequence switch 2200 in position 4 the fundamental circuit is again closed as above traced and relays 212 and 2000 operate as before. Relay 212 locks over a similar circuit to that above traced but the intermittent circuit controlled by the commutator may now be traced over the right contacts of cam 215, commutator strip 238, brush 239 to ground over cam 217. Relay 212 in operating advances the sequence switch to position 7. The counting relay circuit now extends from ground over the contact of relay 2000, to conductor 2030 as previously traced, left contacts of cam 2213, upper front contact of relay 2131, inner upper front contact of relay 2132, to conductor 2150, back contact of relay 1403, winding of relay 1413, to battery over conductor 2206 and cam 2205 as above described. Following four intermittent pulses from commutator 238, relays 1400 and 1420 are operated as before, opening the fundamental circuit and causing the release of relay 212 as soon as the conducting section of the commutator is passed. The release of relay 212 at this time advances the sequence switch 206 to position 8.

Relay 212 is now operated in a local circuit and advances sequence switch 206 to position 9. In this position the updrive magnet 236 is again operated and the district selector 200 is advanced to hunt for an idle trunk outgoing to an office selector. When an idle office selector has been found, relay 212 releases advancing sequence switch 206 to position 10. In position 10 relay 212 is reoperated and advances sequence switch 206 to position 11 in which position it remains operated under the control of relay 208. In position 11 the fundamental circuit is extended through to the relay of the office selector.

Returning now to the sender, the operation of relay 1420 causes the advance of sequence switch 2200 to position 6 in the manner above described for advancing it from position 2 to position 4. The advance of sequence switch 2200 from position 4 opens the circuit of relay 1010 and also releases the counting relays. When sequence switch 2200 reaches position 5¾ relay 1010 is reoperated provided relay 1212 is not operated, indicating that no two-wire office selector is to be included in the connection over a circuit from battery, conductor 2227, inner upper back contact of relay 1212, conductor 2047, lower right and upper left contacts of cam 2221, to ground over the upper right contact of cam 2202 and the upper left contact of cam 2201.

In position 6 a circuit is provided for testing the condition of the trunk leading to the office selector and the condition of the office selector itself. This circuit extends through the district selector and the link to conductor 924, over the outer lower back contact of relay 916, inner upper front contact of relay 1142, lower contacts of cam 2209, through resistance 2040, lower front contact of relay 2014, winding of relay 2153, left contacts of cam 2215, upper winding of relay 2161, back contact of relay 1400, inner upper back contact of relay 2501, lower back contact of relay 2301, lower contact of relay 2401, outer lower back contact of relay 2502, outer lower back contact of relay 2501, lower back contact of relay 2503, upper contacts of cam 2216, back contact of relay 2021, through resistances 2043 and 2042, back contact of relay 2022, lower right and upper left contacts of cam 2217, upper back contact of relay 916 to conductor 923 and back to the office selector. When the office selector is found and is connected through to the sender, this circuit is completed and if the trunk is in proper condition and the battery supplied from the office selector is in the right direction, relay 2153 operates but relay 2161 does not. Relay 2153 in operating closes an obvious circuit for relay 2157, which locks over its lower front contact, and the lower right contact of cam 2202, to ground as long as sequence switch 2200 remains in position 6. A circuit is closed from battery through the winding of relay 2504, front contact of relay 2157, upper back contact of relay 2031, to grounded conductor 1129. Relay 2504 operates and closes a circuit for relay 2041. Relay 2041 in operating closes a circuit from ground over its inner lower front contact, upper right contact of cam 2204 to the winding of sequence switch magnet 2200 and battery, advancing the sequence switch to position 7.

In position 7 the fundamental circuit is established for making office brush selection. The circuit extends at this time as previously traced through the windings of relays 2000 and 2161 and over the back contact of relay 1400. From there it extends as traced for the test of the office trunk over the inner upper back contact of relay 2501, lower back contact of relay 2301, lower contact of relay 2401, outer lower back contacts of relays 2502 and 2501, lower back contact of relay 2503, over the upper contacts of cam 2216, back contact of relay 2021, through compensating resistances 2043 and 2042, back contact of relay 2022, lower right and upper left contacts of cam 2217, to the fundamental ring conductor. The counting relay circuit extends at this time as above traced over the contacts of relays 2031 and 2000 to conductor 2030, and over the upper back contact of relay 1000, conductor 1004, lower right and upper left contacts of cam 2214, upper back contact of relay 2111, outer upper back contact of relay 2112, upper front contact of relay 2113 to conductor 2158, back contact of relay 1404, winding of relay 1414, to battery over conductor 2206. Relays 1404, 1403, 1402, 1401, 1400, 1420, 1414, 1413, 1412, 1411 and 1410 operate as before described. Relay 1400 opens the fundamental circuit as before and relay 1420 advances sequence switch 2200 into position 8, whence it is advanced by its local cam to position 9, releasing the counting relays as previously described.

In position 9 the fundamental circuit is reclosed for the purpose of making office group selection. The counting relay circuit extends from ground over the contacts of relays 2031 and 2000 to conductor 2030, upper contacts of cam 2213, upper back contact of relay 2141, outer upper front contact of relay 2142, to conductor 2154, back contact of relay 1402, winding of relay 1412 to battery over conductor 2206. Relays 1402 and 1412, 1401, and 1411, 1400, 1410 and 1420 operate as above described. As before the operation of relay 1400 opens the fundamental circuit and permits the release of relay 2000 and the operating relay of the office selector causing the office selector to hunt for an idle trunk outgoing to an incoming selector at the distant office. Relay 1420 closes a circuit for advancing sequence switch 2200 out of position 9. Sequence switch 2200 is advanced immediately from position 9 to position 16, since the locking conductor 1424 for relay 1420 is held closed over the lower left contact of cam 2222, until the sequence switch leaves position 15. The positions between 11 and 15 are reserved for controlling a second office selector where it is required. In the present disclosure this second office selector has been omitted and the equipment necessary for making such selections has also been omitted from the sender.

When sequence switch 2200 leaves position 9 the circuit of relay 1010 is opened and that relay releases in turn releasing the timing relays. In positions 10 to 14¼ a circuit is provided for operating relay 1010 to time the selections by the second office selector, if required, but since under the assumed condition sequence switch 2200 passes directly through these positions, the circuit is normally not closed long enough to render the timing circuit effective.

The selection of an outgoing trunk to a distant office takes place in the manner above described, irrespective of the nature of that distant office. It is, of course, to be understood that different offices are identified by different office designations and are reached over different groups of trunk circuits. The incoming registers of the sender are therefore given different settings and the decoder operates different route relays which set the selection control registers to control the selection of the proper group of trunks. The operations within the tandem office therefore differ for different offices only in the number of counting relays operated and the extent of movement of the district and office selectors. If the group of trunks outgoing to a particular office appears in the terminal bank of the district selector, the office selections are omitted. In that case relay 2011 is operated by the decoder and holds the locking circuit of relay 1420 closed through positions 4 to 10 inclusive so that the sequence switch 2200 is advanced rapidly through the positions for testing the trunk to the office selector and the positions for making office selections. In that case also the circuit of relay 1010 closed in positions 5¾ to 9 is effective only in case the sequence switch fails to advance properly.

The operation in controlling the completion of the connection at the distant office differs with the nature of the office, and the decoder route relays prepare the sender for such different operations by operating the class relays 2001 to 2005 in accordance with the type of the wanted office.

For convenience the completion of a call to a panel office will be described first. On the assumption that the call being traced is one to a panel office, none of the class relays 2001 to 2005 is operated and relay 2151 is also non-operated. A circuit is therefore closed, as soon as sequence switch 2200 reaches position 5, which may be traced from battery through the winding of sequence switch magnet 1900, right contact of cam 1901, inner upper back contact of relay 2151, outer upper front contact of relay 1142, to ground over the lower right and upper left contacts of cam 2201. Sequence switch 1900 is advanced to position 6 in this circuit.

When sequence switch 2200 left position 4 the locking circuit for the relays of register 2100 and register 2130 was opened and those relays released. When sequence switch 2200 left position 9, the relays of register 2110 and register 2140 were also released. When sequence switch 2200 reaches position 15 a circuit is closed from ground over the upper left contact of cam 2201, upper right contact of cam 2218, inner upper back contact of relay 2155, through the windings of relays 1701, 1801, 1802 and 1803 in parallel to battery. The operation of these relays connects the numerical registers 1220, 1300, 1310 and 1320 with the registers 2100, 2110, 2140 and 2130 respectively. These registers are now reoperated in accordance with the setting of the numerical registers to control selections at the district office. It will be remembered that the relays 1222 and 1224 of register 1220 were operated. A circuit is therefore now closed from battery through the winding of relay 2102, conductor 2722, third contact of relay 1701 to ground at the outer upper contact of relay 1222. The operation of relay 1224 closes a circuit from ground at its outer upper front contact over the first contact of relay 1701 to the winding of relay 2121 and battery. This relay constitutes a part of the register 2120 which controls group selection by the incoming selector. In a similar manner relay 1301 closes a circuit for relay 2111 while relay 1304 closes a circuit for relay 2122. Relay 1312 operates relay 2142, and relay 1314 operates relay 2144, while relays 1321, 1322 and 1324 cause the operation of relays 2131, 2132 and 2134. The selection control registers are now ready to control selections at the distant office. Sequence switch 2200 in position 15 also closes a circuit from ground over the upper contacts of cam 2201, conductor 2507, lower winding of relay 2031 to battery. Relay 2031 locks over its upper front contact to grounded conductor 1129, opening the circuit by which the office selector was tested and preparing the circuit for testing the interoffice trunk. Relay 2031 also reverses the direction of current flow over the contact of relay 2000 to save wear on that contact.

When sequence switch 2200 reaches position 16, a circuit is closed for testing the interoffice trunk. In position 16 of sequence switch 2200 the circuit of relay 1010 extends over conductor 2227, inner upper back contact of relay 2012, conductor 2047, outer lower back contact of relay 2155 to ground over the upper contacts of cam 2221, upper right contact of cam 2202, and the upper left contact of cam 2201.

The trunk testing circuit may be traced from the fundamental tip to the lower right contact of cam 2209 and thence over the upper left contact of cam 2209, back contact of relay 2152, outer upper back contact of relay 2151, resistance 2040, front contact of relay 2014, winding of relay 2153, middle lower front contact of relay 2031, inner lower back contact of relay 2155, back contact of relay 1400, and thence as previously traced over the contact of relay 2501 etc. to the upper right and lower left contacts of cam 2216, back contact of relay 2302, front contact of relay 2023, resistance 2043, back contact of relay 2024, upper contacts of cam 2217, to the fundamental ring. The testing circuit thus traced cannot be closed before the registers have been positioned since a circuit is closed from ground over the back contact of relay 1701, left contacts of cam 2207, inner lower back contact of relay 2151, to conductor 1424 holding relay 1400 operated. This circuit prevents the closure of the testing circuit until relay 1701 is operated to cause the setting of the registers. When the outgoing trunk has been found and the incoming selector is ready to make selections battery and ground are connected to the fundamental circuit and relay 2153 operates, in turn operating relays 2157, 2504 and 2041. Relay 2041 closes a circuit from battery through the winding of sequence magnet 2200, right contact of cam 2204 to ground at the inner lower front contact of relay 2041, advancing sequence switch 2200 to position 17. In this position a circuit is closed from battery through the winding of sequence switch magnet 1900, upper left and lower right contacts of cam 1902, to ground over the left contacts of cam 2201, advancing sequence switch 1900 to position 7. Sequence switch 2200 is immediately advanced from position 17 to position 18 over the left contact of cam 2220, and the lower right contacts of cams 1903 and 1904. When sequence switch 2200 leaves position 16 relay 1010 releases again cancelling the operations of the counting relays. With sequence switch 2200 in position 17 a circuit is closed for relay 1010 over conductor 2227, inner upper back contact of relay 2012, conductor 2047, outer lower back contact of relay 2155, contacts of cam 1913, upper right contact of cam 2222, to ground at the upper left contact of cam 2201. When sequence switch 1900 leaves position 6 this circuit is opened to release the timing relays but is reclosed in positions 7 to 11 to time the operation of the incoming selector.

The incoming and final selectors are under the control of sequence switch 1900. With sequence switch 1900 in position 7 the fundamental circuit extends from the fundamental tip over the lower back contact of relay 916, inner upper front contact of relay 1142, lower back contact of relay 2151, right contacts of cam 2215, lower right and upper left contacts of cam 1905, winding of relay 2000 and thence as traced for the test of the interoffice trunk back to the fundamental ring. Since relay 2031 is now operated the counting relay circuit may be traced from ground at the outer lower front contact of relay 2031, front contact of relay 2000, inner lower front contact of relay 2031, conductor 2030, inner upper back contact of relay 1000, conductor 1004, right contacts of cam 1906, outer upper back contact of relay 2103, outer upper front contact of relay 2102, inner upper back contact of relay 2101, conductor 2154, back contact of relay 1402, winding of relay 1412 to battery. After the winding of relay 2000 has been shunted three times to cause the selection of the third brush of the incoming selector, relays 1400 and 1420 operate opening the fundamental circuit and closing a circuit from ground over the front contact of relay 1420, upper back contact of relay 917, back contact of relay 1148, lower left contact of cam 1901 to the winding of sequence switch magnet 1900 and battery, advancing it out of position 7. Conductors 1423 and 1424, carrying the locking circuits, for the counting relays extend to ground at this time over the lower contacts of cam 1904 and over the right contacts of cam 1904 respectively and are held closed until the sequence switch leaves positions 7 and 7¼. Sequence switch 1900 is advanced from position 8 to position 9 over its local cam. It is to be noted that the circuit for advancing the sequence switch extends over the back contact of relay 1148. Circuits are prepared for this relay over the contacts of cam 1907. In positions 7 to 9 the circuit is extended over the right contact of cam 1907 to ground at the lower back contact of relay 1316, and in positions 11 to 13 the circuit extends to ground over the lower back contact of relay 915. Therefore if the hundreds register 1300 has not been positioned at the time the incoming brush selection is completed, sequence switch 1900 cannot be advanced for the next selection and if the incoming registers have not been completely set, sequence switch 1900 cannot be advanced into position to make final selections.

We have assumed that the registration has taken place in the proper length of time. Therefore sequence switch 1900 has now been advanced to position 9. In position 9 the fundamental circuit is the same as was traced in position 7 of sequence switch 1900. The counting relay circuit at this time, however, extends over the contacts of relays 2000 and 2031, left contacts of cam 1906, upper front contact of relay 2121, inner upper front contact of relay 2022, conductor 2150, lower back contact of relay 1403, winding of relay 1413 to battery. Four pulses of current will bring about the operation of relays 1400 and 1420 causing the selection of the fourth group of trunks outgoing from the incoming selector. The incoming selector will hunt for a trunk leading to an idle final selector in substantially the manner described for the district selector. Relay 1400 opens the fundamental circuit and relay 1420 advances sequence switch 1900 to position 11 in the manner previously described.

As sequence switch 1900 passes through position 10, a circuit is closed from the fundamental tip to the lower right contact of cam 1905 as previously described and from thence over the upper right contact of cam 1905, through resistances 1908 and 2040, upper right and lower left contacts of cam 1902, to the fundamental ring. The connection of these resistances across the circuit carries off any charge which may have accumulated on the trunk due to its capacity without operating the control relay of the final selector, in preparation for making final selections.

Final brush, final tens and final units selections take place in positions 11, 13, and 15 of sequence switch 1900 respectively. Relay 1010 is released and reoperated as sequence switch 1900 passes from position 11 to position 12 to reset the timing operation at the beginning of final tens selection. The fundamental circuit for final selections extends as traced for incoming selections. The counting relay circuits may be traced as follows: In position 11 for final brush selection from ground over the contacts of relays 2031 and 2000, conductor 2030, inner upper back contact of relay 1000, conductor 1004, upper right and lower left contacts of cam 1909, upper front contact of relay 2111, inner upper back contact of relay 2112, to conductor 2156, lower back contact of relay 1401, winding of relay 1411 to battery. Therefore, two pulses are required to satisfy the counting relays and the final selector uses the second brush in making selections. The counting relay circuit for final tens selection extends as just traced to the upper right contact of cam 1909 and thence over the lower right contact of that cam, upper back contact of relay 2141, outer upper front contact of relay 2142, to conductor 2154. Two pulses of current serve to operate relays 1402 and 1412, 1401 and 1411. It will be noted that the circuit normally extends from the front contact of relay 1401, over the back contact of relay 1421 to the winding of relay 1410. Since relay 2144 is also operated a circuit is closed for relay 1421 over the lower contacts of cam 1910 to ground at the front contact of relay 2144. Therefore the operation of relay 1401 extends the counting relay circuit over the outer front contact of relay 1421, to the back contact of relay 1409 and the winding of relay 1419. Five additional pulses result in the operation of relays 1405 to 1409 and 1415 to 1419. From the front contact of relay 1405 the counting relay circuit extends over the inner front contact of relay 1421 to the winding of relay 1410, causing it to operate and operate relays 1400 and 1420 which open the fundamental circuit and advance the switch 1900 following the reception of eight pulses. The counting relay circuit for final units selection extends from cam 1909 over the upper left contact of that cam, upper front contact of relay 2131, inner upper front contact of relay 2132, conductor 2150, and the winding of relay 1413. Relay 2134 being operated closes a circuit over its upper contact, and the upper right contact of cam 1910 for relay 1421, so that nine pulses are required to satisfy the counting relay condition.

Following the completion of final units of selection sequence switch 1900 is advanced to position 16, in which position a circuit is prepared to respond to the reversal of battery produced by the incoming selector. This circuit is the same as traced for the making of final selections. However, due to the reversed polarity of the battery, relay 2161 is operated in addition to relay 2000. With relay 2161 operated a circuit is closed from grounded conductor 1129, front contact of relay 2161, inner lower back contact of relay 2505, upper contacts of cam 1911, winding of relay 917 to battery. Relay 2000 also operates closing a circuit from ground to conductor 2030, outer lower front contact of relay 917, winding of relay 1410 to battery. Relay 917 closes a circuit through relays 1410 and 1400 and 1420 in series, inner lower contact of relay 917, outer upper contact of relay 904 to ground at the upper left and lower right contacts of cam 1904. Relays 1400 and 1420 cannot operate as long as relay 2000 holds the circuit of relay 1410 closed. Following the completion of the test circuit in the sender, the incoming selector removes the reversed battery and relay 2000 releases. Relay 2161 locks in a circuit from battery through its lower winding, lower contacts of cam 2212, inner lower back contact of relay 2505, lower front contact of relay 2161 to grounded conductor 1129. The release of relay 2000 permits relays 1400 and 1420 to operate in circuit with relay 1410. Relay 1400 as usual opens the fundamental circuit and relay 1420 connects ground over its front contact, upper front contact of relay 917, lower contacts of cam 1912, winding of relay 916 to battery. Relay 916 locks over its lower front contact to grounded conductor 1129. Relay 916 opens the fundamental tip and the fundamental ring and closes a circuit from battery through the winding of relay 904, upper front contact of relay 916 to grounded conductor 1129. Relay 904 in operating opens the shunt around the upper winding of relay 905 which is of high resistance, thus introducing this resistance into the circuit of relay 208. When relay 904 operates the holding circuit for relays 1400, 1410 and 1420 is opened and they release.

The increase in resistance included in the circuit of relay 208 causes that relay to release in turn releasing relay 212. The release of relay 212 advances sequence switch 206 to position 13. As soon as sequence switch 206 reaches position 12 ground is connected over the lower right contact of cam 220 to conductor 221 and through the link to conductor 919. The connection of ground to conductor 919 releases relay 905 which is also connected to ground. The release of relay 905 in turn releases relay 906 and relay 907. The release of relay 907 closes a circuit from battery through the upper winding of relay 903, lower front contact of relay 908 to ground at the lower back contact of relay 907. Relay 903 in operating connects ground from conductor 919 over its lower front contacts, lower back contact of relay 1005, middle lower front contact of relay 915, through resistance 918 to battery in shunt of the winding 908 thus causing relay 908 to release. Relay 903 also locks through its lower winding to ground on conductor 919 and connects ground to conductor 1136 in place of that supplied by relay 908. It will be noted that battery through resistance 902 and the lower winding of relay 903 is now connected to winding of relay 919 in parallel with battery through resistance 918. This produces a low resistance circuit over conductors 919 and 221 to ground. This circuit extends through the relay in the link circuit which operates causing the advance of the link circuit sequence switch to disconnect the sender from the district selector. It also causes the restoration of the link circuit to normal.

When the link circuit disconnects conductor 221 from conductor 919, relay 903 releases. Relay 903 in releasing provides circuits for advancing sequence switches 1900 and 2200 to position 1. The circuit for advancing sequence switch 1900 may be traced from battery through the winding of that magnet, upper left contact of cam 1901, inner upper back contact of relay 908 to ground at the outer upper contact of relay 903. The circuit for magnet 2200 may be traced from battery through that magnet, right contact of cam 2220, outer upper back contact of relay 908, to ground at the upper back contact of relay 903. When these sequence switches reach position 1, relay 901 which has been held operated from off-normal ground connected to conductor 2203 by these sequence switches, releases. The release of relay 901 opens the circuit of off-normal relays 1126 and 1230. The release of these relays unlocks all the relays which have not already been released. The release of relay 901 also connects battery through resistance 902, over the back contacts of relays 901 and 900 to the terminal accessible to the test brush of the link circuit, marking the sender as available for another call.

As sequence switch 206 reaches position 11¾ the tip brush of the district selector is connected through the repeating coil 242 and the winding of relay 243, to the ring brush. The tip and ring brushes are connected to battery and ground at the incoming selector but the direction is such that relay 243 which is polarized does not operate. When sequence switch 206 reaches position 11¾, relay 226 is operated and locks, connecting the incoming tip conductor through upper left winding of repeating coil 242 to the right winding of relay 201 and battery, and the incoming ring conductor through the lower left winding of repeating coil 242 and the left winding of relay 201 to ground. Relay 201 is now held operated over the incoming trunk and in turn holds relays 204 and 207 operated. When the called subscriber answers, battery and ground are reversed to the circuit of relay 243 and that relay operates in turn operating relay 244. Relay 244 locks under the control of relay 243 and reverses the connection of battery and ground through the windings of relay 201 to the incoming trunk for supervisory purposes.

When the called subscriber disconnects, relay 243 releases in turn releasing relay 244 which restores the connection of battery and ground to the incoming trunk as an indication that the call has been terminated. When the calling subscriber restores his receiver to the switchhook the apparatus at the local office is restored and the loop circuit at the distant office is opened, in turn releasing relay 201. Relay 201 releases relays 204 and 207. The release of relay 207 opens the circuit through the right winding of relay 201 to prevent the reoperation of that relay, should the trunk be reselected before the district selector restores to normal. With relay 207 released, relay 229 is operated and locks, advancing sequence switch 206 to position 16. Sequence switch 206 is then advanced under the control of relay 207 to position 18. Relay 204 in releasing opens the locking circuit of relay 226, which also releases, opening the tip and ring conductors to prevent the completion of an incoming circuit for trunk test should the district selector be seized before the selector reaches normal. In position 18, down drive magnet 247 is operated and the district selector is restored to normal where a circuit is closed to the winding of sequence switch magnet 206 restoring the sequence switch to position 1. The district selector is now ready for another call.

In the establishment of a connection to a subscriber located in a manual office equipped with a relay call indicator the designation is to be transmitted to the distant office by means of code impulses similar to those employed in setting the incoming registers. Sequence switch 1500 is employed in generating and transmitting the code pulses. The connection progresses in the manner above described until the trunk is reached leading to the distant office with the exception that the route relay operated by the decoder causes relays 2001 and 2002 to be operated to indicate the class of the call. With relay 2002 operated a circuit is closed for relay 2155, which in turn closes a circuit for relay 2151. When sequence switch 2200 reaches position 5, sequence switch 1500 is advanced to position 17, which is the starting position for direct relay call indicator calls, in which only the numerical designation is transmitted. Relay 2002 in operating also operates relay 2152. When sequence switch 1500 passes through positions 8 to 17, relays 1503 and 1504 are operated.

The trunk test circuit is closed in position 16 of sequence switch 2200 from the fundamental tip, conductor 924, over the back contact of relay 916, upper front contact of relay 1142, lower right and upper left contacts of cam 2209 middle upper front contact of relay 2152, winding of relay 2159, left contacts of cam 2215, upper winding of relay 2161, back contact of relay 1400 and thence as previously traced over contacts of relays 2501, etc., to the upper right and left contacts of cam 2216, lower back contact of relay 2302, upper front contact of relay 2023 resistance 2043, back contact of relay 2024, upper contacts of cam 2217, upper back contact of relay 916 to conductor 923 and the fundamental ring. When connection is made to the trunk outgoing to the manual office, battery and ground are connected at that office to the interoffice trunk and thence to the test circuit. Relay 2159 operates in this circuit but the battery is so polarized that relay 2161 does not. The operation of relay 2159 closes an obvious circuit for relay 2157, which locks over the lower right contact of cam 2202 until sequence switch 2200 has left position 16¼. Relay 2157 causes the operation of relay 2504 as previously described and relay 2504 operates relay 2041. Relay 2041 in turn operates relay 2160 which locks. Relay 2041 also advances sequence switch 2200 to position 17. In position 17 the fundamental circuit is held closed and may be traced from the front contact of relay 1142 over the upper front contact of relay 2041, upper contacts of cam 2219, middle upper front contact of relay 2152, winding of relay 2159, and thence as previously traced back to the fundamental ring. The locking circuit of relay 2157 is opened as soon as sequence switch 2200 leaves position 16¼ but that relay is held operated as long as relay 2159 remains operated.

When the operator at the distant office is ready to receive the designation the fundamental circuit is opened, either automatically or by the manual operation of a key by the operator and relay 2159 releases in turn releasing relay 2157, if the sequence switch has left position 16¼ as well as relays 2504 and 2041. At the manual office a bridge is connected across the tip and ring conductors containing relays similar to relays 1122, 1123, and 1124 for the reception of the pulses. With relay 2041 released and relay 2160 operated and locked, the fundamental tip is extended to the left armature of relay 1503 and the lower left contact of cam 1507, while the fundamental ring is extended to the right armature of relay 1503, and the left contact of cam 1508. The release of relay 2041 also operates relay 1502, which starts the rotation of sequence switch 1500.

As the impulser sequence switch 1500 rotates one pulse is generated in passing each position, and each pulse lasts one full position or a half position each side of the center. The pulses generated in the even numbered positions are either light negative or heavy negative and those of the odd numbered positions are either light positive or blank according to the settings of the incoming register relays. As the switch passes an even numbered position, ground is connected over the right contacts of cam 1509 to the fundamental tip and as it passes odd numbered positions, ground is connected over the lower right and upper left contacts of cam 1509 to the fundamental ring. Light negative impulses are generated by the connection of battery through high resistance 1510, over the lower right contact of cam 1508, to the fundamental ring, while heavy negative pulses are generated over a circuit which may be traced from the lower right contact of cam 1508, which right back contact of relay 1511, contacts of cam 1512 or 1513, through contacts of the register relays, to contacts of cams 1514 and 1515 and thence over the inner upper back contact of relay 1001, left front of relay 1502, contacts of cam 1516 or relay 1504, conductor 2228, resistance 2225, to battery over the contacts of cam 2205. Positive pulses are generated over a circuit which may be traced from the tip conductor over either the front contact of relay 1503, contacts of cam 1507 or left back contact of relay 1511, contacts of cam 1517 or 1518, through the contacts of the register relays to contacts of cam 1519, lower back contact of relay 1001, through high resistance 1009 to battery. When no pulse is to be sent the fundamental tip is connected over the back contacts of the register relays to ground over cam 1520 for a quarter of a position. The result is that both fundamental tip and fundamental ring are grounded for a quarter position to discharge the cable and then the fundamental is opened for the remaining three-quarters of a position to create a blank pulse. In the position just ahead of the starting positions 5 and 17 this ground is continued for a slightly longer time to guard against the switches starting from a little past the center of the position.

For a detailed description of the transfer of the designation, reference may be made to the above-identified Roberts patent. Sequence switch 1500 completes the revolution from position 17 to position 20 and then passes through a complete second revolution being driven out of position 1 in a local circuit under the control of relays 1504 and 1502. When sequence switch 1500 reaches position 17¾ the tip conductor is connected through resistance 2225 to battery over cam 2205 while the ring conductor is connected to ground, thus transmitting a heavy pulse in the direction opposite to that formerly transmitted, that is a heavy positive pulse. Since relay 1504 is released at the time sequence switch 1500 completes the second revolution, the sequence switch comes to rest having completed that revolution. In positions 19 and 20 the fundamental circuit is opened since relay 1503 is now released.

When sequence switch 1500 reaches position 18¾ a circuit is closed for operating relay 916 which functions in the manner described for panel calls to bring about the advance of the district and the release of the sender.

In the calls to be completed through a manual tandem office relay 2002 is operated alone to indicate that the whole designation is to be transmitted. With relay 2002 operated a circuit is closed through the winding of relay 1511 when sequence switch 2200 reaches position 5. Relay 1511 prepares a locking circuit for itself which is completed when sequence switch 1500 has been advanced to its starting position and the sequence switch 2200 is ready to make a test of the outgoing trunk. With relay 1511 operated, sequence switch 1500 is advanced to its starting position 5 for the transmission of tandem call indicator impulses. When sequence switch 1500 reaches position 4, relays 1503 and 1504 are operated and locked. Otherwise the completion of the call is substantially as for a direct call indicator call.

If the call is to be completed at a manual office equipped for receiving call announcements from the sender, the route relay operated by the decoder indicates this fact to the sender by operating relay 2004. The call announcer mechanism is shown in Fig. 8 which comprises fourteen units for generating voice currents, each unit corresponding to a different digit or letter. Each unit comprises a drum on which is mounted a plurality of photographic vocal records of a particular digit, a light source, a lens system, a photoelectric cell, a repeating coil and an amplifier. The drums are constantly rotated by a common shaft which also carries certain synchronizing cams. As the drums rotate the records are translated by the photoelectric cell back into voice currents which take the place of an operator's voice. With relay 2004 operated relay 2155 also operates in turn operating relay 2151. In addition, relay 2004 operates relays 2508 and 2509 in parallel. With relay 2508 operated a circuit is closed for operating relay 2503 when sequence switch 2200 reaches position 15 following the selection of the distant office. As soon as a trunk is found outgoing to the manual office, battery is connected to the fundamental ring whence it extends, with sequence switch 2200 in position 16, through repeating coil 2500, and the windings of relays 2161 and 2510 back to the fundamental tip which extends to ground in the trunk circuit. If the fundamental circuit is complete through the sender, a relay operates in the trunk causing a lamp to light as a signal to the operator. Depending on the nature of the disant office, the operator may respond manually to the signal lamp or automatic equipment at her position may function to connect her telephone to the trunk. The connection of the battery and ground through the windings of the trunk relays to the tip and ring conductors leading to the sender at first causes the operation of relay 2510. When the operator is ready to receive the call at the wanted designation, the direction of battery and ground through the windings of the trunk relay to the interoffice trunk is reversed. The operation of relay 2510 closes the circuit for relay 2505 which locks and connects its locking ground to the winding of relay 2506 which also operates. When battery is reversed over the fundamental circuit, relay 2161 operates and relay 2510 releases. The operation of relay 2161 under these conditions closes a circuit from grounded conductor 1129 over the front contact of relay 2161, inner lower front contact of relay 2505, uppermost front contact of relay 2508, lower normal contact of relay 2511, inner lower back contact of relay 2303 to the winding of relay 2501 and battery. Relay 2501 in operating connects reversed battery to the fundamental circuit to meet the reversed battery on the trunk circuit for the purpose of operating a relay in a two-wire office selector circuit, if such an office selector is included in the circuit. Relay 2501 therefore connects ground over its outer lower front contact to the fundamental ring and battery over the contact of cam 2205 through low resistance 2225 and the inner upper front contact of relay 2501 to the fundamental tip. Relay 2501 also operates relay 2511. Relay 2511 locks and opens the circuit of relay 2501 which releases. Relay 2501 will remain operated long enough, however, to perform the desired function.

When the connection of battery over the trunk is restored just as the operator's telephone is connected with the interoffice trunk, relay 2161 releases and relay 2510 again operates. When relay 2503 operated it closed an obvious circuit for relay 2512 and this relay in turn connected the winding of relay 2513 over its front contact to the interrupter contacts carried by the shaft of the call announcer machine. Each time that this interrupter contact closes, the circuit of relay 2513 is closed to ground over interrupters 810 and 811 and relay 2513 is intermittently operated. After relay 2506 operates a circuit is closed through the winding of relay 2514 and battery so that relay 2514 also operates intermittently. Relays 2512, 2513, and 2514 are common to a group of five senders, each sender having a separate make contact on relay 2514.

When direct battery is restored to the fundamental circuit and relay 2510 reoperates, relay 2515 is operated to initiate the operation of the call announcement. Relays 2403 and 2418 operate in accordance with the stations registration to control the order of the transmission of the digits. These relays also supply ground to conductor 2516, so that the operation of relay 2515 causes the successive operation of relays 2518 and 2519 under the control of relay 2514.

The operation of relay 2519 connects condenser 2523 between the left windings of repeating coil 2500 to care for the transmission of the announcement. It also connects the right windings of the repeating coil over the back contacts of relay 2524, inner upper and lower front contacts of relay 2519 to the armatures of relay 820 and thence over contacts of relays 821 to 827 to the announcing units according to the setting of the sender registers. Relays 2408, 2411, 2407, 2414, 2406 and 2413 are operated in a manner similar to the timing relays 1016, 1013, 1019, 1020, 1021 and 1022 which will be described hereinafter, to successively connect the registers with the relays. These relays are operated under the control of interrupter cams 810 and 811 and are operated during the silent intervals.

When the announcement is finished a circuit is closed through the upper winding of relay 2517. The operation of relay 2517 opens the locking circuit of relay 2518 which releases in turn releasing relay 2519. It also closes an obvious circuit for relay 2524 which opens the connection between repeating coil 2500 and the call announcer machine. Relay 2517 operates relay 904 which performs the same functions as described heretofore. However, since relay 916 is not operated, the fundamental circuit is held closed until the advance of the district closes a substitute circuit for the trunk relay. The advance of the district and the release of the link and sender takes place in the manner above described.

If the automatic connection of the operator to the trunk is not followed by the announcement, or the operator does not understand the pronouncement as transmitted from the sender, she can obtain the correct number from the calling subscriber by the use of an emergency listening jack. The insertion of the trunk plug in such jack brings about the reoperation of relay 2161 if the sender has not been released. With relay 2161 operated a circuit is closed from grounded conductor 1129, front contact of relay 2161, inner lower front contact of relay 2505, uppermost front contact of relay 2508, middle lower front contact of relay 2515, lower winding of relay 2517 and battery, thus causing the series of operations previously described to take place resulting in the advance of the district and the release of the sender and link. The operator may now ask the calling subscriber for the wanted number.

If the call is to be completed by step-by-step switches the decoder causes the operation of class relay 2005 alone if only the numerical designation is to be transmitted, and relays 2004 and 2005 together if the complete designation is to be transmitted. In the establishment of such a call, direct impulses are generated by means of interrupter 2307. Interrupter 2313 which is carried on by the same shaft, but is opened when relay 2307 is closed and vice versa, controls the counting relays to determine the number of pulses to be transmitted. The same transfer relays are used for rendering the registers successively effective as in the call announcement type of call.

With relays 2004 and 2005 operated, a circuit is closed from battery through the windings of relays 2417, 2304 and 2409 in parallel. Relay 2155 is also operated and in turn operates relay 2151. Under these conditions when sequence switch 2200 reaches position 16, for making the test of the outgoing trunk, the fundamental circuit extends from the fundamental tip at conductor 924, over the lower back contact of relay 916, inner upper front contact of relay 1142, lower right and upper left contacts of cam 2209, back contact of relay 2152, upper front contact of relay 2151, upper back contact of relay 2503, winding of relay 2510, upper winding of relay 2161, back contact of relay 1400, inner upper back contact of relay 2501, lower back contact of relay 2301, lower back contact of relay 2401, outer lower back contacts of relays 2502 and 2501, lower back contacts of relay 2503, upper right and lower left contacts of cam 2216, through the compensating resistance 2043 or 2042 depending on the setting of this register, upper contacts of cam 2217, outer upper back contact of relay 916 to the fundamental ring. When the out-going trunk has been selected and is ready to function, direct battery is received over the fundamental circuit by relay 2510 which operates, in turn operating relays 2505 and 2506.

The step-by-step office is arranged when receiving calls from a panel office to remove direct ground and connect a bridge across the trunk. When this occurs relay 2510 releases, but relays 2505 and 2506 are locked up. The release of relay 2510 closes a circuit for relay 2301, which closes an obvious circuit for relay 2305 and 2302. The operation of these relays indicates that the step-by-step trunk is ready for receiving pulses. These relays in operating short-circuit the windings of relays 2510 and 2161 so that the fundamental circuit extends from conductor 924 as above traced over the fundamental tip to the upper front contact of relay 2151 and thence over the outer lower front contact of relay 2301, inner upper back contact of relay 2501, outer upper front contact of relay 2302, inner lower back contact of relay 2501, inner upper back contact of relay 2502, outer lower front contact of relay 2302, outer upper back contact of relay 2501 to grounded conductor 1130, and from conductor 923 to the upper right contact of cam 2216 as previously traced, outer lower back contact of relay 2503, outer lower back contacts of relays 2501 and 2502, back contact of relay 2401, middle lower front contact of relay 2301, back contact of relay 2308 in parallel with interrupter 2307, conductor 2228, resistance 2225, to battery over the contacts of cam 2205.

With relay 2301 operated, a circuit is closed for relay 2421, which closes a circuit for relay 2420. Relay 2302 also closes a circuit through resistance 2309 and the winding of relay 2310. Relay 2310 operates only if the contact of interrupter 2313 is open. If not, a circuit is closed from battery through resistance 2309, over the lower back contact of relay 2310, and over the interrupter 2313 to ground in shunt of the winding of relay 2310 for the purpose of preventing a mutilated first pulse. When interrupter 2313 opens relay 2310 operates, preparing a circuit for relay 2315, to interrupter 2313 so that when the interrupter again closes relay 2315 operates. Relay 2315 closes a locking circuit for itself through the winding of relay 2308, but relay 2308 cannot operate until the interrupter 2313 opens the shunt around its winding to the operating circuit of relay 2315. With relay 2308 operated the connection of battery to the fundamental circuit is under the control of interrupter 2307.

Following the operation of relays 2304 and 1227, either relay 2402 or relay 2404 or neither is operated according to the stations digit recorded on register 1210. When sequence switch 2200 reaches position 15 following the operation of relay 1317, a circuit is closed for either relay 2418 or relay 2403 according as relay 2404 is or is not operated.

As soon as relay 2403 or relay 2418 operates, a circuit is closed for relay 1105 which supplies ground to the armatures of relays 1101 to 1104 from which it is extended over the front contact of the operated tandem hundreds register relays to the windings of relays 2316, 2317, 2314 and 2419. These relays determine the number of pulses to be transmitted to the step-by-step office. The first opening of the contact of interrupter 2307 following the operation of relay 2308 transmits a pulse to the step-by-step office. At this time interrupter 2313 has its contact closed completing a circuit from ground through the winding of the counting relay indicated by relays 2316, 2317, 2314 and 2419. When relay 2307 closes its contact at the termination of the first impulse, interrupter 2313 opens its contact allowing the second relay of the pair to operate in the locking circuit of the first in the usual manner. Therefore as each pulse is sent out to the step-by-step office one of the pairs of counting relays is operated and locked. The locking circuit for the counting relays extends over conductors 1424 and 1423, the upper front contacts of relay 2310, inner upper normal contact of relay 2311 to grounded conductor 1130.

Relay 1400 has no function during step-by-step calls, but relay 1420 in operating opens the locking circuit of relays 2315 and 2308 and closes a circuit through the winding of relay 2312. Relay 2312 further opens the locking circuit of relays 2315 and 2308, closes a circuit through resistance 2318 and the winding of relay 2319, but relay 2319 is prevented from operating by ground from the front contact of relay 1420, connected over the lower back contact of relay 2319 to resistance 2318 in shunt of the winding of relay 2319. The release of relay 2308 connects the shunt over its upper contact around interrupter 2307 to prevent the transmission of further pulses to the step-by-step office. Relay 2312 also opens the operating circuit of relay 2315 to prevent its premature reoperation. Relay 2312 closes a locking circuit for itself and opens the operating circuit for relay 2310 which in releasing recloses the shunt around its winding. Relay 2310 also opens the locking circuits for the counting relays permitting them to release. As soon as relay 2310 releases, the circuit for relay 2319 is closed but relay 2319 does not operate until relay 1420 has released opening the shunt around its winding.

In order to allow time for the step-by-step selector to hunt and seize an idle outgoing trunk, a period of time is counted off between digits. For this purpose the operation of relay 2319 closes a circuit through the winding of counting relay 1414 and relays 1414, 1413, 1412, 1411 and 1410 as well as 1404, 1403, 1402, 1401 and 1400 and 1420 are operated under the control of interrupter 2313. When relay 1420 operates it operates relay 2311 which disconnects interrupter 2313 from the counting relay circuit, opens the locking circuit for the counting relays and the locking circuit of relay 2312 and locks to ground at the front contact of relay 1420 to insure the release of that relay before relay 2311 also releases. The release of relay 2312 also releases relay 2319 and relay 2311 releases as soon as relay 1420 releases so that the circuit is now ready to transmit another set of impulses.

The remaining pulses are controlled in a similar manner by the interrupters, the counting relays and the register relays.

Following the last digit relay 2320 operates and locks and relays 2312 and 2319 operate and relay 2310 releases to count off an interval measured by five pulses similar to that included between digits. This is for the purpose of allowing the step-by-step office sufficient time to recognize that pulsing is completed. When relay 1420 operates a circuit is closed for relay 2501 which opens the shunt extending over its inner upper back contact and the outer lower front contact of relay 2301 around the windings of relays 2161 and 2510. It also connects battery from cam 2205 through resistance 2225, to the fundamental tip in place of the ground supplied over its outer upper back contact, and connects ground to the fundamental ring over its lower front contact, in place of the battery formerly supplied over the middle lower contact of relay 2301.

The reverse battery on the fundamental circuit causes relay 2161 to operate in turn operating relay 2401. Relay 2401 releases relays 2421 and 2420. With relays 2320 and 2501 operated and relay 2420 released, a circuit is closed through the winding of relay 2502. Relay 2502 in operating releases relay 2501, closing a circuit through the winding of relay 916. Relay 916 functions in the manner previously described to cause the advance of the district selector and the release of the link and the sender.

If the outgoing call is to a step-by-step office using five digits, the call will be made essentially the same as the seven digit call just described, except that relay 2005 alone is operated and the first operation of relay 2315 causes the operation of relay 2428 instead of operating relay 2424. The first digit transmitted is therefore controlled by the tandem units register 1200.

If the call is to be completed to a step-by-step office employing only four digits, class relay 2005 is operated alone as in the case of a five digit class. However, the tandem units digit set up in such a case will be zero or one, and as soon as relay 2403 operates, a circuit is closed through the windings of relays 2428 and 2427 in series over the outer upper back contacts of relays 2314, 2316 and 2317 and thence to ground at the outer lower front contact of relay 2403. The immediate operation of relays 2428 and 2427 transfers the conductors controlled by relay 2427 directly to the armatures of relay 2408 causing the transmission of the thousands digit first.

The foregoing description covers the completion of a call which progresses in a normal manner. The progress of a call may be interrupted either because the call is abandoned at the originating office, because one of the selector switches fails to find an idle trunk, or because the sender itself fails to operate correctly.

*Abandoned call*

If the call is abandoned before the connection is completed, the sender is arranged to release the apparatus involved, without waiting to complete its operation. At the originating office the abandonment of the call following the selection of the district selector 200 and the association of the tandem sender therewith, is not effective to release the apparatus at the originating office until the designation has been transmitted to the tandem sender although the number to be transmitted may be translated in whole or in part to zeros in a manner similar to that described hereinafter.

It will be remembered that, following the reception of the last digit, relay 914 was operated, in turn operating relay 910 and relay 915, relay 915 locking to grounded conductor 1131. Since the call has been abandoned, the circuit of relay 914 will be opened, after an interval, at the originating office and that relay releases in turn releasing relay 910. With relay 910 released and relay 915 operated, a circuit is closed from battery through the winding of relay 1001, inner lower back contact of relay 904, upper front contact of relay 915, upper back contact of relay 910, lower back contact of relay 1002 to grounded conductor 1131. Since this circuit is carried over a back contact of relay 904 it is apparent that relay 1001 cannot be operated after the time that the incoming selector has advanced to apply reverse battery to the sender. Relay 1002 also serves to cancel this early release of the sender if the timing operation, to be described hereinafter, has functioned to operate that relay.

Relay 1001 disconnects ground through a resistance coil 1139, from the ring conductor, and closes a circuit from battery through the windings of relays 1000 and 1030 in parallel, inner upper front contact of relay 1001 to grounded conductor 1131. The operation of relay 1000 further opens the incoming tip and ring conductors and connects ground in shunt of the lower winding of relay 905. The upper winding of this relay is shunted over the back contact of relay 904 so that the resistance connected to conductor 919 is reduced to such a point that relay 229 in the district selector circuit operates, in turn operating relay 226. The above operations do not interfere with the decoding of the office code and the establishment of the fundamental circuit for district brush selections.

If the abandonment occurs while district brush selection is in progress, which takes place with sequence switch 2200 in position 2, the operation of relay 1000 opens the counting relay circuit, so that the revertive pulses from the district selector are ineffective and the selector continues to move upward until the top of the bank is reached. This operation causes reversed battery to be connected to the fundamental circuit, operating relay 2161. Relay 2161 in operating closes a circuit from grounded conductor 1129, front contact of relay 2161, inner lower back contact of relay 2505, lower right and upper left contacts of cam 2212, outer lower front contact of relay 915, upper back contact of relay 1027 to conductor 2048, back contact of relay 2015, upper back contact of relay 2025, conductor 1029 upper back contact of relay 1002, winding of relay 1028 to battery.

Relay 1028 closes a circuit from battery through the winding of relay 1005, outer lower front contact of relay 1028 to grounded conductor 1131. Relay 1005 locks to grounded conductor 1129. Relay 1028 also closes a circuit from battery through the winding of relay 1002, upper front contact of relay 1028 to grounded conductor 1131. Relay 1002 locks over grounded conductor 1029 opening the circuit of relay 1028 which now releases closing a circuit from grounded conductor 1131, back contact of relay 1028, inner lower front contact of relay 1002, back contact of relay 1025, back contact of relay 1031, lower winding of relay 1032 to battery. Relay 1032 locks to grounded conductor 1129 and closes a circuit from battery through the winding of relay 916, front contact of relay 1032, back contact of relay 1027, conductor 1033, lower right contact of cam 2218, upper left contact of cam 2201 to ground. Relay 916 locks to conductor 1129 and operates relay 904 restoring the sender to normal in the manner above described.

The sender functions in a similar manner if the call is abandoned during either office brush selection, incoming brush selection or any of the final selections, since the counting relay circuit extends over a back contact of relay 1000 during these selections. If the abandonment occurs during district group selection, office group selection or incoming group selection, the counting relay circuit is not opened and the call progresses normally to the next brush selection where the operation of relay 1000 is effective to drive the selector to tell-tale.

In the case of a call to a manual office equipped with a relay call indicator or for receiving calls by call announcement, if the call is abandoned while the trunk outgoing to the manual office is being tested and before the operator at that office responds, sequence switch 2200 will be in position 16. Relays 1001, 1030 and 1004 will be operated as above described. Ground is connected to the winding of relay 905 by relay 1000 signaling the district selector that the call has been abandoned. As described in the normal operation of the circuit, relay 2002 will be operated in turn operating relay 2160 in the case of a call to a call indicator office, and relay 2004 in the case of a call to a call announcer office, in turn operating relays 2508 and 2509. For a call indicator call, when the outgoing trunk is found, relay 2159 is operated in the testing circuit in turn operating relays 2157, 2504 and 2041. As soon as relay 2504 operates, a circuit is closed from battery through the winding of relay 2025, lower front contact of relay 1030, conductor 2527, inner lower front contact of relay 2504, second upper front contact of relay 2160 to grounded conductor 2203. In the case of the call announcer call, relay 2503 is operated when sequence switch 2200 reaches position 15. Therefore the trunk test circuit extends through the winding of relay 2510, which relay operates as soon as the outgoing trunk is found. Relay 2510 in turn operates relay 2505. If the call is abandoned at this time, relay 2025 is operated in a circuit extending over the lower front contact of relay 1030, conductor 2527, second upper front contact of relay 2508, outer upper front contact of relay 2505, upper back contact of relay 2160 to grounded conductor 1131. Relay 2025 locks directly to conductor 1131.

Relay 2025 in either case closes a circuit for relay 916 which may be traced from battery through the winding of relay 916, outer upper back contact of relay 2012 to ground at the inner upper front contact of relay 2025. Relay 916 performs its usual function for releasing the sender. Relay 2012 is arranged to be operated whenever the route relay of the decoder indicates that connection is to be extended through a two-wire office which requires a heavy positive pulse for its release. Therefore with relay 2012 operated, the circuit for relay 916 closed by relay 2025 is opened at the contact of relay 2012 so that the connection is not immediately released but the transmission of the code pulses or the call announcement progresses as for a normal call, after which relay 904 or relay 916 is operated in the usual manner, to release the sender and link.

It will be remembered that in the case of the call indicator call the pulses which cause the operation of the register relays, that is, the heavy negative pulses and the positive pulses, are generated over circuits which extend over back contacts of relay 1001. The operation of relay 1001 opens these circuits so that a series of light negative pulses are sent, which will be recorded as zeros at the distant office. These zeros start with the first digit to be transmitted following the abandonment of the call. Relay 1001 when operated also connects the fundamental tip conductor over its outer lower front contact to the upper right contact of cam 1520 which is connected to ground over the right contact of cam 1521. This circuit is similar to that closed over the back contacts of the first and third register relays for the purpose of discharging the interoffice trunk by ground connected to both sides of the fundamental circuit before an open or blank pulse is to be sent.

In the case of the abandonment of a call announcer call during pronouncement, the operation of relay 1030 closes a circuit from battery through the lower winding of relay 2517, outer lower front contact of relay 2515, conductor 2526, inner upper front contact of relay 1030 to grounded conductor 1131. Relay 2517 performs its regular functions to stop the announcement and to release the sender, link circuit and district selector.

If a call is abandoned in the case of a call to a step-by-step office during the test of the outgoing trunk or during pulsing to the step-by-step office, the operation of relay 1000 connects ground to the middle winding of relay 905 as a signal to the district selector. Relays 2155, 2417, 2409 and 2304 are operated in response to the operation of class relay 2005. When the test circuit is established, relay 2510 is operated in turn operating relays 2505 and 2506. When the apparatus at the step-by-step office has functioned, relay 2510 releases, operating relay 2301 which in turn operates relay 2421 and 2420. At this stage of the operation, with the call abandoned a circuit is closed from battery through the winding of relay 2303 and its inner upper back contact, lower normal contact of relay 2320, inner lower front contact of relay 2506, middle upper front contact of relay 2420, uppermost front contact of relay 1000, right contacts of cam 2210, innermost upper contact of relay 2304 to ground at the outer upper front contact of relay 1227. Relay 2303 locks over its inner upper front contact to grounded conductor 2507 until sequence switch 2200 returns to normal. It also closes a circuit from battery through the winding of relay 2320, inner lower front contact of relay 2303 to the operating circuit of relay 2303. Relay 2320 also locks to conductor 2507. Relay 2301 also operates relay 2302. With relay 2320 operated, a circuit is closed from battery through the winding of relay 2501, outer upper back contact of relay 2502, outer upper front contact of relay 2320, middle upper front contact of relay 2302, conductor 2526, inner upper front contact of relay 1030 to grounded conductor 1131. Relay 2501 reverses the connection of battery and ground to the fundamental circuit, after which the release of the connection is the same as for a regular call.

Selector to overflow or tell-tale

If any of the panel type selector switches is not brought to rest properly while making selections, it will be driven to the top of its bank or tell-tale, and if it fails to find an idle trunk, it will be driven to a set of terminals between the trunk groups or overflow terminals. In either event the selector is operated to return reverse battery to the sender. Relays 2000 and 2161 are both operated by this reverse battery, but relay 2000 is ineffective during district and office selections. Relay 2161 locks and if all of the incoming pulses have been received so that relay 915 is also operated and locked, it closes a circuit from battery through the winding of relay 1028, upper back contact of relay 1002, conductor 1029, upper back contact of relay 2025, lower back contact of relay 2015, conductor 2048, upper back contact of relay 1027, outer lower front contact of relay 915, upper left and lower right contacts of cam 2212, or the left contacts of cam 1911, inner lower back contact of relay 2505, front contact of relay 2161, to grounded conductor 1129.

Relay 1028 in turn operates relays 1005 and 1002. Relay 1005 locks and together with relay 1002 connects ground from conductor 1131 over the second lower front contact of relay 1002, inner front contact of relay 920, lowermost front contact of relay 1005, to the lower winding of relay 905 as a signal to the district that the connection cannot be completed. It also opens the circuit of relay 2160 and a circuit over which battery through resistance 918 is connected to the armature of relay 903 during normal release.

Relay 1002 opens the circuit of relay 1028 which now releases. Relay 1002 locks to conductor 1029 and opens the operating circuit of relay 915. Relay 1002 connects grounded conductor 1131 over the second front contact of relay 1002, middle front contact of relay 920, inner lower back contact of relay 1000, outer upper back contact of relay 1001 to conductor 922 and through the link to conductor 227. The connection of low resistance ground to conductor 221 causes the operation of relay 229 and the connection of ground to conductor 227 thereupon operates relay 226 which functions to give a tone to the calling subscriber indicating that the call could not be completed. Relay 1002 also opens the operating circuit of relay 920 but that relay is slow to release thus insuring that relay 226 has time to operate before the ground is removed by the release of relay 920.

When relay 1028 releases, a circuit is closed for relay 1032, which locks and closes a circuit for relay 916. Relay 1032 also closes a circuit over which battery is connected to the contact of relay 903. With relays 229 and 226 operated the district selector is advanced to return a tone to the calling subscriber instead of to talking position. The advance of the district selector releases the sender and the link.

It will be apparent from a consideration of the drawings, that the operations above described are effective in positions 2 and 4 of sequence switch 2200 in which district selections are made, in positions 7 and 9 in which first office selections are made and in positions 12 and 14 in which second office selections might be made.

If the district selector fails to find an idle trunk so that it goes to overflow, sequence switch 2200 will be in position 6 and the high resistance relay 2159 and polarized relay 2161 are included in the testing circuit as well as resistance 2040. Therefore when the district selector advances to return reverse battery to the sender, relay 2159 operates, but the resistance in the circuit is too great to permit relay 2161 to operate. Relay 2159 causes the advance of the sender to position 7 in the usual manner. In position 7 the resistance in the fundamental circuit is decreased so that relay 2161 may operate, in turn operating relay 1028 and bringing about the release of the sender in the manner above described.

Since the circuits for making second office selections have been omitted, the test of the trunk outgoing from the office selector takes place in position 16. If the office selector goes to overflow, returning reverse battery to the sender, relay 2159 operates alone and sequence switch 2200 is advanced to position 18 and sequence switch 1900 to position 7. In this position relay 2161 can operate and in turn operates relay 1028 to release the connection as above described.

In the case of a call to a call indicator office, the fundamental circuit during trunk test does not include resistance 2040 and therefore the relay 2161 is operated at the same time as relay 2159. Relay 2159 advances sequence switch 2200 to position 17 and relay 2161 operates relay 1028. Relay 1028 performs the functions above described to release the connection. In this class of call relay 1005 connects relay 2000 in parallel with relay 2159, for the purpose of allowing sufficient current to flow to operate any two-wire office selector which may be included in the connection. The parallel circuit may be traced from the right terminal of relay 2159, middle and outer upper front contacts of relay 2152 which is operated during call indicator calls, conductor 2162, outer upper front contact of relay 1005, conductor 1034, winding of relay 2000, left contacts of cam 2215, to the left terminal of relay 2159.

In the case of calls to call announcer offices or step-by-step offices, the test circuit extends through the windings of relays 2161 and 2510 and reverse current operates relay 2161 alone which in turn operates relay 1028.

During incoming brush selection, sequence switch 1900 is in position 7 and the reverse battery from the incoming selector due to the selector going to tell-tale causes the operation of relay 2161 and the remaining functions controlled by that relay in the manner described. During the subsequent selections the operation of relay 2161 causes the operation of relay 1028 as before and also closes a circuit from battery through the winding of relay 917, upper contacts of cam 1911, inner lower back contact of relay 2505, front contact of relay 2161 to grounded conductor 1129. With relay 917 operated, the operation of relay 2000 closes a circuit from ground over the contacts of relay 2031 and the contact of relay 2000 to conductor 2030, lower front contact of relay 917, to the winding of relay 1410 and battery over conductor 2206. After an interval the reverse battery is removed releasing relay 2000 and permitting relays 1400 and 1420 to operate in the circuit of relay 1410. The operation of relay 1420 connects ground over its front contact, upper front contact of relay 917, lower right and upper left contact of cam 1912, conductor 1033, lower contact of relay 1027 to the inner upper front contact of relay 1032 for operating relay 916. With these exceptions the operation is the same as previously described for releasing the sender and advancing the district selector. The operation in case the incoming selector goes to overflow, or the final selector goes to tell-tale during any of its selections is the same as far as the sender is concerned.

*Time out of sender*

The operation of relay 1010 from time to time throughout the establishment of the connection as above described to mark various stages of the operation of the sender, connects ground from conductor 2227, over its upper front contact, back contact of relay 1011 to conductor 1015 and the vibrating contact of interrupter 1012.

When interrupter 1012 closes its contact, a circuit is completed from battery through resistance 1014, winding and normal contact of relay 1013, contact of interrupter 1012, to grounded conductor 1015. Relay 1013 locks over its alternate contact to conductor 1015 and prepares a circuit from battery through resistance 1017, winding of relay 1016, alternate contact of relay 1013 to grounded conductor 1015. Relay 1016 cannot operate since its winding is shunted by ground from conductor 1015 over interrupter 1012, inner lower back contact of relay 1016 to resistance 1017 as long as the interrupter contact remains closed. When interrupter 1012 opens its contact, relay 1016 operates. When relay 1016 operates it closes a circuit from battery through resistance 1023, winding and normal contact of relay 1019, outer lower front contact of relay 1016 to grounded conductor 1015. Relay 1019 locks over its alternate contact to conductor 1015 and prepares a circuit from battery through resistance 1018, winding of relay 1020, alternate contact of relay 1019 to grounded conductor 1015. Relay 1020 cannot operate until relay 1016 releases being shunted by ground over its own back contact and the front contact of relay 1016.

The next closure of the contact of interrupter 1012 connects ground over the inner lower front contact of relay 1016 to resistance 1014 in shunt of the winding of relay 1013 which releases opening the operating circuit of relay 1016. However, relay 1016 is held operated over the normal contact of relay 1013, and the contact of interrupter 1012, until the interrupter opens its contact. When this occurs relay 1016 also releases opening the shunt around relay 1020 which now operates. With relay 1020 operated a circuit is closed from battery through the winding of relay 1021, lower front contact of relay 1020, inner back contact of relay 1022 to grounded conductor 1015. Relay 1021 locks through the winding of relay 1022 and its own front contact to conductor 1015. However, relay 1022 cannot operate as long as relay 1020 holds the operating circuit for relay 1021 closed.

With relay 1021 operated, and relay 1016 released, a circuit is closed from battery through the upper winding of relay 1024, lower front contact of relay 1010, outer upper front contact of relay 1020, middle back contact of relay 1016 to ground. Relay 1024 in operating prior to the extension of the connection to the distant office closes a circuit from battery through the upper winding of relay 1027, outer upper front contact of relay 1024, and thence over conductor 1036, upper back contact of relay 2002, and the upper back contact of relay 2509, or over the upper back contact of relay 2505, and the back contact of relay 2160, to grounded conductor 1131. Relay 1027 closes a circuit from battery through the winding of relay 1028, upper back contact of relay 1002, conductor 1029, over the upper back contact of relay 2025, lower contact of relay 2015, conductor 2048, outer upper front contact of relay 1027, to grounded conductor 1131. Relay 1028 initiates the release of the sender and the advance of the district in the manner previously described.

The next operation of interrupter 1012 operates relay 1013 which prepares the circuit of relay 1016. At the opening of the interrupter contact, relay 1016 operates closing a circuit from conductor 1015 over the lower front contact of relay 1016, inner upper front contact of relay 1020, to resistance 1023 in shunt of the winding of relay 1019 which releases. Relay 1020 is held operated over the normal contact of relay 1019 and the lower front contact of relay 1016. The next closure and opening of the interrupter 1012 releases relays 1013 and 1016 in turn as before. When relay 1016 opens the holding circuit for relay 1020, it releases, permitting relay 1022 to operate.

If the sender has failed to release at this time, the operation of relay 1022 closes a circuit from battery through the winding of relay 1011, lower front contact of relay 1024, outer lower front contact of relay 1022, lower back contact of relay 1019, outer lower back contact of relay 1016 to grounded conductor 1015. Relay 1011 disconnects ground from conductor 1015 thus stopping the operation of the timing relays. Relay 1011 locks to grounded conductor 1131 and closes a circuit from ground through interrupter 1045, lower front contact of relay 1011, lamp 1026, to battery, flashing lamp 1026 to indicate that the sender has failed to restore to normal properly. It also operates an audible alarm circuit (not shown). The contact of interrupter 1012 is closed for approximately one second and opened for six seconds so that the interval from the operation of relay 1010 to the operation of relay 1024 is anywhere from 7 to 14 seconds depending upon the relationship of the operation of relay 1010 and the cycle of operation of the interrupter. The operation of relay 1011 occurs fourteen seconds after the operation of relay 1024.

Under certain conditions ground is attached to conductor 1015 with relay 1010 unoperated. In that case the circuit above traced for relay 1024 is open at the lower front contact of relay 1010 and the release of the connection is not initiated at the end of the seven to fourteen second period. Interrupter 1012 continues to function operating relays 1013 and 1016 and relays 1019 and 1020 over the cycle above described. Relays 1021 and 1022 remain operated and locked. When relay 1016 releases to permit the operation of relay 1020, a circuit is closed, since relay 1022 is now also operated, from battery through the lower winding of relay 1024, inner lower front contact of relay 1022, outer upper front contact of relay 1020 to ground at the middle lower back contact of relay 1016. At this time a period of from 35 to 42 seconds has elapsed. After an additional period of fourteen seconds relay 1011 is operated over the circuit previously traced.

It will be remembered that relay 1010 is operated as soon as relay 908 operates following the seizure of the sender in position 1 of sequence switch 2200. It is released and reoperated as sequence switch 2200 passes from position 1 to position 2 at the beginning of the registration of the second digit. It is released when sequence switch 2200 leaves position 4 following the completion of the district selections and is reoperated if no two-wire office selector is included in the connection when sequence switch 2200 reaches position 5¾ for the testing of the trunk outgoing to the first office selector. It is released following the office selections and reoperated in position 10 prior to the establishment of the circuit for testing the trunk outgoing to a possible second office selector. It will be remembered that the second office selections were omitted from this disclosure and that sequence switch 2200 was advanced immediately through the positions for making these selections. Relay 1010 is released when sequence switch 2200 leaves position 14¼. The later operation of relay 1010 depends upon the class of office at which the call is to be completed. If the call is to be completed at a panel type office, relay 2155 is not operated and relay 1010 is reoperated in position 16 over cams 2221, 2202 and 2201. When sequence switch 2200 leaves position 16 following the test of the trunk outgoing to the distant office, relay 1010 is released but is reoperated in positions 17 and 18 over cam 1913 until sequence switch 1900 leaves position 6. It is reoperated in position 7 of sequence switch 1900 at the beginning of incoming selections and is released and reoperated between final brush and final tens selections. If the call to be completed is directed to a call indicator office, an office equipped for receiving call announcements or a step-by-step office, relay 1010 is operated in position 16 of sequence switch 2200 over a back contact of relay 2506, back contact of relay 2504, and cam 2226. In the case of a call announcer call or a step-by-step call, the operation of relay 2506 due to the closure of the outgoing trunk releases relay 1010 while in the case of a call indicator call the operation of relay 2504 opens the circuit of relay 1010.

It is therefore apparent that, generally speaking, the period of from seven to fourteen seconds is allowed for the completion of selections by any selector and the establishment of the interoffice trunk provided no two-wire office is to be included in the connection. If a two-wire office is to be included in the connection, the circuit of relay 1010 is open at the contact of relay 2012, but ground is connected to conductor 1015 over the back contact of relay 1010, conductor 1035, inner upper front contact of relay 2012 and thence to ground over cams 2221, 2202, and 2201 in positions 5¾ to 9 and 10 to 14¼ of sequence switch 2200; over the back contact of relay 2155 and cams 2221, 2202, and 2201 in position 16 of sequence switch 2200 and over cams 1913, 2222, and 2201 in positions 17 and 18 of sequence switch 2200 and positions 1 to 6, 7 to 11 and 12 to 18 of sequence switch 1900; or over the back contact of relays 2506 and 2504 and cam 2226 to the back contact of relay 1420 in position 16 of sequence switch 2200. In other words, with relay 2012 operated, the stages of operation are the same, but the time allowed is 35 to 42 seconds instead of 7 to 14 seconds.

In addition to these circuits which depend upon the operation of relay 2012, conductor 1015 is grounded over conductor 1035, next to the outer upper front contact of relay 2508, outer upper front contact of relay 2506, back contact of relay 2504, cam 2226 and thence to ground at the back contact of relay 1420. Relay 2506 is operated in connection with call announcer and step-by-step calls as soon as the interoffice trunk is found and is released when the operator or the step-by-step equipment responds. The period of waiting for response at the distant office is always the longer period. In the case of the call indicator call, relay 2160 is operated when the outgoing trunk is found and ground is connected to conductor 1035 over the inner upper front contact of relay 2160 and cam 2218 in positions 16 to 18 of sequence switch 2200. When the operator responds, relay 2160 is released and sequence switch 2200 advances to position 17. In this position ground is connected to conductor 1035 over the inner lower front contact of relay 2152, and cam 2201 in positions 17 and 18 of sequence switch 2200. Thus the longer period is allowed for the response of the operator and for the transmission of pulses to that operator. In the case of a step-by-step call ground is connected to conductor 1035 over the front contact of relay 2005 and cam 2218 in positions 16 to 18 of sequence switch 2200, thus allowing the maximum period from the response of the step-by-step office, which releases relay 1010, to the release of the sender.

Relay 1024 when operated as above described locks over its inner upper front contact to grounded conductor 1131. It will be remembered that the circuit through the upper winding of relay 1027, closed by relay 1024, extends over either a back contact of relay 2505, and a back contact of relay 2160, or over a back contact of relay 2002, and a back contact of relay 2509. Relay 2002 is operated during all call indicator calls and relay 2160 is operated when sequence switch 2200 reaches position 16 for the establishment of the circuit over the interoffice trunk. Therefore this circuit for relay 1027 is ineffective during the period that the call is awaiting response of the operator at the call indicator office. Likewise relay 2509 is operated when the call is to be extended to the call announcer office and relay 2505 is operated when the trunk is closed to the distant office so that the circuit is also ineffective for the period during which call announcer calls are waiting assignment. It is effective for calls to panel offices and for calls to step-by-step offices. A second circuit is provided for relay 1027 which extends from conductor 1131 over the upper back contact of relay 2160, upper front contact of relay 2505, next to the inner upper contact of relay 2508, to conductor 2527 or from grounded conductor 2203, over next to the inner front contact of relay 2160, inner lower front contact of relay 2504 to conductor 2527 and thence over the middle upper front contact of relay 1024 through the lower winding of relay 1027, conductor 1037, lower back contact of relay 2025, conductor 2049 to the armature of relay 736. If key 706 in the trouble recorder control circuit is operated, relay 736 is operated and the above traced circuit of relay 1027 extends to battery over the contact of relay 736. From an examination of the circuit it will be apparent that the first branch traced is effective as soon as the test circuit is established to the distant office in the case of a call announcer call and the second branch is effective at a similar point in a call indicator call and both are effective only if the waiting assignment key 707 is operated in the recorder circuit. If the call has been abandoned so that relay 2025 is operated, the above traced circuit through the lower winding of relay 1027 is extended over the outer lower front contact of relay 2025, middle upper front contact of relay 2012 to battery.

With relay 1027 operated over any of the above traced circuits, the circuit through the winding of relay 1028, over the back contacts of relays 1002, 2025 and 2015, and the front contact of relay 1027 is closed as previously described. It will be apparent that this circuit for relay 1028 is not closed if relay 2025 is operated to indicate that the call has been abandoned. Relay 2015 is also operated from the decoder whenever a call is to be extended to a test line, thus preventing the operation of relay 1028 for such a call. In case relay 1028 is not operated, the operation of the timing relays causes the operation of relay 1011 which lights the stuck sender lamp 1026, sounds an alarm and stops the timing operation. With relay 1028 operated, relay 1005 is operated and locked, relay 1002 operated and locked, and relay 1028 released as above described.

Whenever relay 1028 operates, because a selector has failed or the sender has timed out, a circuit is closed for recording on the trouble register the stage at which the call failed. This circuit may be traced from grounded conductor 1131, upper front and middle lower front contacts of relay 1028, normal contact of relay 1032, inner upper normal contact of relay 1031, middle and upper windings of relay 1025, inner lower front contact of relay 1028 and thence over the upper back contact of relay 1030 (indicating that the call has not been abandoned) or over the lower front contact of relay 1027 (indicating that a call has timed out) to the upper armature of relay 1107. If no digits have been registered at the time relay 1028 operates, the circuit extends over the upper back contact of relay 1107, conductor 1150, outer right normal contact of key 700, right winding of relay 710 to battery. Relay 710 closes a circuit from battery, through the winding of trouble register 720, left winding of relay 710, front contact of relay 710, to ground through jack 750. When register 720 operates, it closes a shunt around the winding of relay 710 so that relay 710 will release when ground is removed by the sender. Relay 1025 cannot operate in series with relay 710.

When relay 1002 operates, relay 1028 is released and relay 1002 connects ground from conductor 1029, over which relay 1028 was operated, over its upper front contact to the circuit of relay 1025 in place of the ground supplied by relay 1028 and closes at its lower front contact a substitute for the outer lower front contact of relay 1028. The operation of relay 1002 and the release of relay 1028 close a circuit for relay 1032 which operates and locks to grounded conductor 1129. Relay 1032 opens the circuit of relays 1025 and 710 so that relay 710 releases.

Relay 1032 closes a circuit from battery through the winding of relay 916, upper front contact of relay 1032, inner lower front contact of relay 1027, inner lower front contact of relay 1005 to grounded conductor 1129. Relay 916 performs the function previously described to bring about the release of the sender and the advance of the district selector. The connection of ground to conductor 922 in combination with the connection of ground through the low resistance winding of relay 905 to conductor 919 causes the operation of marginal relay 229 followed by the operation of relay 226.

If relay 1028 is operated after the first negative impulse of the first digit has been received, as indicated by the operation of relay 1107, and before the designation has been completely registered as indicated by the operation of relay 1120, the register circuit extends as above traced to the armature of relay 1107 over its outer upper front contact, outer upper back contact of relay 1120, conductor 1151, outer right contact of key 701, winding of relay 711 to battery. Relay 711 causes the operation of meter 721.

If relay 1028 operates after the operation of relay 1120 and before the operation of relay 1003, as an indication that translation has been completed, the circuit traced extends over the outer upper front contact of relay 1120, lower back contact of relay 1003, conductor 1033 to key 702 and relay 712 operating meter 722. With registrations completed and relay 1003 operated, the circuit extends over the front contact of relay 1003 to cam 2233 and thence in positions 1 to 5 of sequence switch 2200 over conductor 2229 to key 703 and relay 713, operating meter 723. In positions 6 to 15 of switch 2200 the circuit extends over conductor 2230 to key 704 causing the operation of register 724. With sequence switch 2200 in position 16 the circuit extends over the upper right contact of cam 2228, conductor 2231, back contact of relay 70 2504, back contact of relay 2505, conductor 2529 to key 705 operating register 725. This circuit exists until the trunk outgoing to the distant office has been closed through, which results in the case of a panel call or a call indicator call in the operation of relay 2504 and in the case of a call announcer or step-by-step call in the operation of relay 2505. With either relay 2505 or relay 2504 operated the circuit is extended over the front contact of the relay to conductor 2528 and the armature of relay 904. In the case of a call indicator call and a panel call, sequence switch 2200 is advanced out of position 16 into position 17 for the transmission of call indicator impulses, and into position 18 for controlling incoming and final selections. In the case of a call indicator call relay 2155 is operated and the register circuit is extended from the front contact of relay 1003, over a branch of the circuit above traced to cam 2228 which extends over the right contacts of cam 2223 to conductor 2232 and the armature of relay 2155, over the front contact of that relay to the conductor 2528 and the armature of relay 904. In the case of a panel call relay 2155 is not operated and the circuit extends over the back contact of that relay, conductor 2163, to cam 1914, whence it extends in positions 2 to 9 of sequence switch 1900, during which incoming selections occur to conductor 1915 and key 707 operating register 727. In positions 10 to 15 of sequence switch 1900, during which final selections occur, the circuit extends over conductor 1916 to key 708 operating register 728. In positions 16 to 18 the circuit extends over conductor 1917 to conductor 926. From the establishment of the trunk circuit to the operation of relay 904 to bring about the release of the sender, the circuits above traced over conductor 2528 are extended from the back contact of relay 904 to conductor 925 and key 706 causing the operation of register 726. When final selections are completed or relay 904 has been operated to release the sender, the register circuit extends to conductor 926 over the front contact of relay 904 or as traced over cam 1914 and then to key 709 operating register 729.

It is apparent that the several registers divide the operation of the sender into a series of stages which may be generally outlined as follows: (1) From seizure to the registration of the first digit. (2) Registration. (3) Translation. (4) District selection. (5) Office selection. (6) Trunk test, Panel or relay call indicator, Call announcer or step-by-step. (7) Awaiting assignment—

Relay call indicator, Call announcer or step-by-step. (8) Incoming selection. (9) Final selection. (10) Advance for release.

The failure of the sender in any of the above enumerated stages is recorded on the registers of the trouble recorder which are common to all of the senders of the office. If the failures as thus recorded seem excessive in any one period the trouble recorder printer of Fig. 3 may be brought into operation to make a record of the identity of the sender and the identity of the district selector involved, the designation of the wanted line and the stage at which the call failed. With this record it is possible to determine much more quickly and accurately the location of the cause of the trouble.

*Printing trouble record*

Assume for example that register 724 indicates that an excessive number of failures have occurred during office selections. Key 704 will be operated for the purpose of obtaining a printed record of these failures. Therefore, when relay 1028 connects ground through the middle and upper windings of relay 1025, over the front contacts of relays 1107, 1120 and 1003 and cam 2228 to conductor 2230 the circuit extends over the inner right operated contact of key 704, inner right normal contacts of keys 703, 702, 701 and 700, lower back contact of relay 401, upper back contact of relay 301, outer upper back contact of relay 402, through resistance 403 to battery.

Relay 1025 operates in this circuit closing a locking circuit for itself from battery through resistance 403, through the middle winding of relay 1025 alone, over the upper front contact of relay 1025 to grounded conductor 1129. The ground connected to the middle winding of relay 1025 completes a circuit through the middle and lower windings of relay 1025 to battery. These circuits through the windings of relay 1025 prevent its operation in series with one of the meter control relays and also prevent its operation if a sender has already connected with the trouble recorder. If two senders attempt to connect with the recorder at practically the same time the first relay, such as relay 1025, to connect ground through its middle winding to conductor 2230 reduces the potential on that conductor so that the remaining relay cannot operate.

With relay 1025 operated the release of relay 1028 closes a circuit from grounded conductor 1131, upper back contact of relay 1028, inner lower front contact of relay 1002, front contact of relay 1025, upper winding of relay 1031 through resistance 1039 to battery. Relay 1031 locks over its next to the outer upper front contact, back contact of relay 1032 (which is not operated since relay 1025 is operated) inner upper front contact of relay 1002 to ground over conductor 1029. Relay 1031 opens the energizing circuit of relay 1025. While relays 1028 and 1002 are not specifically slow-to-release and slow-to-operate relays their combined operating and releasing time is sufficient to permit the operation and locking of relay 1025 even though two or more senders require the trouble recorder simultaneously. Relay 1031 operates relays 1008, 1007 and 1006 in parallel over its inner lower front contact.

Relay 1031 also closes a circuit from ground over its inner upper front contact to the winding of relay 916, in preparation for the release of the sender. Relay 916 in turn operates relay 904 which opens the shunt around the middle winding of relay 905, introducing its high resistance in the circuit of relay 208. Relay 208 releases, causing the district selector to advance to position 12 where it connects ground to the winding of relay 905 and that relay releases in turn releasing relays 906 and 907. With relay 907 released, relay 903 is operated and locks to conductor 919. Since relay 1005 is operated and relay 1032 is not, the circuit from battery through resistance 918 in parallel with the locking circuit of relay 903 cannot be closed and the release relay of the link remains unoperated. With relay 907 released and relay 1008 operated, ground is connected over the upper back contact of relay 907, outer upper front contact of relay 1008 to conductor 924 and thence through the link to conductor 214. In addition relay 1031 closes a circuit from ground over its outer lower front contact through the winding of relay 404 to battery and over the lower back contact of relay 405, inner left normal contacts of keys 700, 701, 702 and 703, inner left and outer right operated contacts of key 704, through the right winding of relay 714 to battery for registering the failure on register 721 as well as making a printed record.

Relay 404 operates, in turn closing a circuit from battery through the winding of relay 401, upper front contact of relay 404 to ground at the lower back contact of relay 402. It also connects ground over its inner lower front contact to conductor 406 and battery over its outer lower front contact to the winding of relay 502. Relay 401 locks to ground at the lower back contact of relay 301. It also operates relays 405 and 501 and opens the circuit of relay 1025 permitting that relay to release. Relay 405 supplies ground to conductors 407, 408, 409 and 410. Relay 501 supplies ground to conductors 512, 513 and 508 and operates relay 511, which in turn grounds conductors 514, 515, 516, 517 and 406 and prepares the circuit of relay 502. Relays 401 and 405 together connect conductor 2230 to the winding of relay 714 to mark the trouble recorder busy to other senders, and to permit the registration of other failures.

Relay 1031 in operating connects ground over its second upper front contact, upper contacts of cam 1506, upper front contact of relay 1007, conductor 1041, lower back contact of relay 502 in shunt of the winding of relay 502 to prevent its operation until the sender is ready to transmit the designation to the recorder.

Relay 1008 in operating closes a circuit over its inner upper front contact, over the left back contact of relay 1502 to the winding of relay 1511. Relay 1511 locks over its inner left front contact, upper right and lower left contacts of cam 1522 to ground at the upper front contact of relay 1006. Relay 1511 closes a circuit from ground over its outer right front contact, lower left contact of cam 1501 to the winding of sequence switch magnet 1500, advancing the call indicator impulser sequence switch to position 5 in which position it is ready to transmit the complete designation. With relay 1511 operated, relays 1503 and 1504 operate over the left contacts of cam 1505 and the locking circuit of relay 1511 and also lock over cam 1522 to ground at the upper front contact of relay 1006.

Relay 1008 also transfers the pulsing leads from the fundamental circuit to the trouble recorder. That is, the tip pulsing lead now extends from the left armature of relay 1503 over the lower front contact of relay 1008 to the outer upper armature of relay 502 and the ring pulsing lead extends from the right armature of relay 1503 to the inner upper front contact of relay 1008 and the inner upper contact of relay 502. Relay 1007 in operating connects relay 1502 over the middle lower front contact of relay 1007 to the lower front contact of relay 502. In addition relay 1006 connects battery over its inner lower front contact to conductor 2206 to supply battery for the heavy pulses in case sequence switch 2200 has not been advanced to position 2. Relay 1006 also opens the circuit controlled by sequence switch 2200 in position 1 for restoring sequence switch 1500 to normal. The operation of relay 1005 opens the circuit of relay 2160 to prevent its operation and also opens the circuit controlled by relay 2152 by which the closure of the fundamental circuit is delayed until the impulsing sequence switch is in position to start pulsing.

When sequence switch 1500 reaches position 5 in response to the operation of relay 1031, the shunt around the winding of relay 502 is opened and that relay operates. In so doing it completes the pulsing circuit over its outer upper front contact to resistance 745, inner lower back contact of relay 746, windings of relays 503, 504 and 505, outer lower back contact of relay 746 to the inner upper front contact of relay 502. Relay 502 also connects ground at its lower front contact to the circuit of relay 1502 which operates initiating the operation of the call indicator impulser sequence switch 1500. If only a part of the digits have been recorded the remaining digits will be transmitted as zeros since the circuits for creating the heavy negative pulses and the positive pulses are opened where the register relays are unoperated. Those digits which have been registered will be transmitted in the manner previously described.

Relay 503 responds to negative pulses whether light or heavy to control the operation of relays 506 and 510 in the same manner that relay 1122 controls the operation of relays 1132 and 1134. Relays 506 and 510 control the circuits for operating the relays of registers 520, 530, 540, 600, 610, 620, 630 and 740 and cause the successive operation of the transfer relays 526 and 527, 536 and 537 etc. Relay 504 responds to the positive pulses operating the first or the third relay of the registers and relay 505 responds to the heavy negative pulses operating either the second or the fourth relay according to the code registered. Assuming that the number to be recorded was the same as that for the call traced above except for a stations digit W, relays 522, 533, 541, 542, 602, 612, 614, 621, 624, 632, 634, 741, 742 and 744 will be operated. Relay 746 in operating following the reception of the units digit opens the pulsing circuit so that the final heavy positive pulse is ineffective. With relays 746 and 747 operated, ground is connected to conductor 406 at an additional point.

The connection of ground to conductor 406 first by relay 404 and later by relays 511, 746 and 747, supplies ground over the lower normal contact of relay 415 to the vibrating armature of interrupter 416 for the purpose of timing the operation of the recorder.

As sequence switch 1500 passes through positions 18¾ to 20 in returning to normal a circuit is closed from ground at the outer right front contact of relay 1502, outer right back contact of relay 1504, cam 1523, inner lower front contact of relay 1007, upper winding of relay 1032 to battery. Relay 1032 operates, locking to conductor 1129, opening the circuit of relay 1031 and connecting battery through resistance 918 to the contact of relay 903 permitting the link relay to operate releasing the sender and the district selector.

The release of relay 1031 also opens the circuit of relay 404. Relay 404 opens the operating circuit of relay 401 but that relay remains locked over the back contact of relay 301. It also disconnects ground from conductor 406 at its contact but ground is still connected thereto over the front contacts of relay 746 and 747 or over a contact of relay 511, which relays are held operated under the control of relay 401. Relay 404 also opens the circuit of relay 502 which releases and opens the operating circuit for relay 1502 and disconnects the pulsing leads from the pulsing relays 503, 504 and 505. In addition it connects ground over its lower back contact, upper back contact of relay 404, outer upper front contact of relay 401 to conductor 433 and the winding of relay 302 to initiate the operation of the printer. The printer is of the type disclosed and claimed in Patent 1,623,809 granted April 5, 1927 to H. Pfannenstiehl and a detailed description will be found in that patent.

The operation of relay 302 closes a circuit from grounded conductor 433 over the back contact of relay 303, upper front contact of relay 302 through the winding of the solenoid type control relay 304 to battery. When relay 304 closes its contacts it connects the source of power 305 directly to the motor 306. Relay 302 also connects the start solenoid 307 over the back contact of relay 308 through resistance 309 in parallel with the motor 306. The solenoid 307 in operating releases pawl 311 permitting the printer shaft 312 to revolve under the control of the motor 306. Cam 313 closes contact 314 but this contact is ineffective at this time. Cam 315 in making a rotation is effective to advance the printer carriage 316, which carries commutator brush 317, one step.

The record as printed by the trouble recorder includes the following information: (1) The class of trouble. (2) The identity of the district selector, which includes the number of the frame on which the district selector is located and its position on the frame. (3) The identity of the sender involved which includes the number of the frame on which the sender is located and the position of the sender on that frame. (4) The designation of the wanted line; and (5) whether or not the overflow relay 2161 was operated.

Under the assumed condition the failure occurred during office selections. It may be further assumed that the sender timed out; that the overflow relay 2161 was not operated; that the district selector involved was the first district on the first frame and the sender involved was the A sender on the first frame. Under this condition the following printed record will be obtained:

```
       4 0101 01A 243 W5678 R
   4 = Trouble class, office selections;
  01 = District frame number;
  01 = District selector number;
  01 = Sender frame number;
   A = Sender number:
 243 W5678 = Called line number; and
   R = Overflow relay of the sender not operated.
```

As indicated hereinbefore there are ten trouble classes and these classes are represented in the record printed by number rather than by an abbreviated designation.

The class name, class number and the corresponding key of the recorder circuit are as follows:

| Key number | Class number | Class name |
|---|---|---|
| 700 | 0 | Permanent signal |
| 701 | 1 | Partial registration |
| 702 | 2 | Translation completed |
| 703 | 3 | District selections |
| 704 | 4 | Office selections |
| 705 | 5 | Trunk test |
| 706 | 6 | Awaiting assignment |
| 707 | 7 | Incoming selections |
| 708 | 8 | Final selections |
| 709 | 9 | Advance district |

When the commutator brush 317 has been advanced to the second segment of the commutator, a circuit is closed from grounded conductor 433, commutator strip 318, top and bottom brushes of the brush carriage 317, first segment of commutator 320, conductor 373, outer left normal contacts of keys 700, 701, 702 and 703, outer left operated contact of key 704 through selecting relay 324 to battery. Relay 324 prepares circuits from conductor 370 over its second armature to the winding of printer bar magnet 363 and over its first armature for magnet 364.

During the second revolution of the shaft 312, contact 314 is closed, extending conductor 370 to ground. Magnets 363 and 364 therefore operate. This combination of operated printer bar magnets causes the number 4 to be printed. At the end of a revolution the brush carriage is advanced to its third position in contact with the second segment of commutator strip 319. In the third position of the commutator brushes relay 371 is operated. This relay connects conductor 370 with magnet 363 alone. Each operation of the printer requires the actuation of one or more of the printer bar magnets and the operation of magnet 363 alone is necessary to permit the printer to advance without printing any character.

The identity of the district is next printed. The district selector sequence switch is held in position 17 in response to the association of the sender with the trouble recorder and ground is connected over the left front contact of relay 212, left contacts of cam 252 to conductor 257 and over the lower left and upper right contacts of cam 213, outer right front contact of relay 212, lower left and upper right contacts of cam 219 to conductor 258 to identify the district selector to the recorder. Ground connected to conductor 257 operates relay 411 which is individual to the position of the district on the frame and common to all districts occupying a similar position on all frames, while ground connected to conductor 258 operates relay 412 and identifies the frame on which the district is located and is common to all districts on the same frame. Relays 411 and 412 lock to grounded conductors 409 and 408 respectively so that the subsequent release of the district selector does not destroy the record. When relay 411 operates and locks, it closes a circuit from ground at its outer upper contact through the winding of relay 426 to battery. Relay 426 is common to the first ten district selectors on all frames and controls the printing of the tens digit of the district selector number. Since the first selector was involved, the tens digit is zero and relay 426 represents that digit. Similar relays are provided for each ten district selectors on a frame, relay 427 for example being common to the sixth group of ten districts so that it corresponds to a tens digit of five, while relay 428 is individual to the sixtieth district selector on the frame. Similarly relay 412 in operating closes a circuit for relay 429 which is common to the first ten selector frames and corresponds to a tens digit of zero while relay 430 corresponds to a tens digit of nine.

Therefore, when the brush carriage is advanced to its fourth position, in which contact is made with the second segment of commutator strip 320, a circuit is closed from ground over the commutator strips 318 and 320 and the lower front contact of relay 429 through the winding of relay 380 to battery. When the printer control contact 314 closes, ground is connected to conductor 370 and over the front contacts of relay 380 to the windings of printer bar magnets 365 and 364 which prepare the printer to print the digit zero. When the brush carriage advances to its fifth position making contact with the third segment of strip 319 a circuit is closed over the inner lower front contact of relay 429 and the inner lower front contact of relay 412 to the winding of relay 321. Relay 321 prepares for the operation of magnets 361, 362, 363 and 365 so that at the end of the stroke the digit 1 is printed.

In the next position of the commutator, a circuit is closed over the outer lower front contact of relay 426 to the winding of relay 380 and zero is printed while in the following position the circuit extends over the inner lower front contact of relay 426, lower front contact of relay 411 to the winding of relay 321 and the digit 1 is printed. In the next position the circuit of the spacing relay 371 is again closed and a space is provided.

The identity of the sender is next printed. Relay 1007 in operating connects ground over its lowermost armature to conductors 1040 and 1042 to identify the sender to the trouble recorder. The grounding of conductor 1042 causes the operation of relay 432 to identify the position of the sender on the particular frame, while the grounding of conductor 1040 operates relay 434 to identify the frame on which the sender is located. Relay 434 is common to all senders on the particular frame, while relay 432 is common to all senders occupying the same relative position on different frames. When relay 434 operated it locked and operated relay 431 which is common to the first ten frames. Therefore in the next printing position a circuit is closed over the fifth segment of strip 319, lower front contact of relay 431, to the winding of relay 380 causing the printing of the digit zero and in the next position a circuit is closed over the inner lower front contact of relay 431, lower front contact of relay 434 to the winding of relay 321 causing the printing of the digit 1. In the next position a circuit is closed over the upper front contact of relay 432, through the winding of relay 331 to battery. Relay 331 closes the circuits of magnets 361 and 362 and causes the letter A to be printed. The printer again spaces after the sender letter due to the operation of relay 371 over the sixth segment of the strip 320.

In the next three positions of the printer the office code of the wanted number is printed. The circuits for this purpose may be traced as follows: Over the seventh segment of strip 319, the upper front contact of relay 522, outer upper back contact of relay 521, middle upper back contact of relay 524, winding of relay 322 to battery; over the seventh segment of strip 320, upper back contact of relay 532, inner upper back contact of relay 534, outer upper front contact of relay 533 through the winding of relay 324 to battery; over the eighth segment of strip 319, upper front contact of relay 542, outer upper front contact of relay 541, outer upper back contact of relay 544 through the winding of relay 323 to battery. Relay 322 prepares magnets 361, 362, 363 and 364 for operation to print the digit 2. Relay 324 prepares magnets 363 and 364 for operation to cause the printing of the digit 4. Relay 323 prepares magnets 362 and 365 for operation to cause the printing of the digit 3. Over the eighth segment of strip 320 relay 371 is operated and a space recorded.

In the seventeenth position a circuit extends over the upper back contacts of relays 604 and 603, upper front contact of relay 602, upper back contact of relay 601, through the winding of relay 351 to battery. Relay 351 prepares magnets 361, 362 and 365 for operation to cause the printing of the station's letter W. In the eighteenth position a circuit extends over the upper front contact of relay 612, outer upper back contact of relay 611, inner upper front contact of relay 614, winding of relay 325 to battery. Relay 325 prepares the magnet 365 for operation to print the digit 5. In the nineteenth position the circuit extends to the upper back contact of relay 622, inner upper front contact of relay 624, inner upper back contact of relay 623, lower front contact of relay 621 to the winding of relay 326 and battery causing the printing of the digit 6. A circuit is closed in the twentieth position over the upper front contact of relay 632, outer upper back contact of relay 631, middle upper front contact of relay 634, to the winding of relay 327 causing the digit 7 to be printed for the tenth digit. In the twenty-first position the circuit extends in a similar manner to the upper armature of relay 742 and over the front contacts of relays 742, 741 and 744 to relay 328. In the next or twenty-second position relay 371 is reoperated and a space provided.

In the twenty-third position either the letter F or the letter R is printed to indicate whether the overflow relay 2161 has or has not operated. It will be remembered that if a selector goes to tell-tale or overflow, reverse battery over the fundamental circuit causes the operation of relay 2161. With this relay operated a circuit is closed from grounded conductor 1129 over the front contact of relay 2161, inner lower back contact of relay 2505, over contacts of cam 2212 or cam 1911, to the outer lower front contact of relay 1006 and the winding of relay 413 and battery. On the other hand if the trouble recorder is summoned because of delay in the operation, relay 2161 is normally not operated but relay 1027 is operated under the control of the timing relays. Therefore, a circuit is closed from grounded conductor 1131, inner upper front contact of relay 1027, middle upper front contact of relay 1008, back contact of relay 413, winding of relay 414 to battery. Either relay 413 or relay 414 locks to ground over the middle upper front contact of relay 401. It is to be noted that the circuit of relay 414 is carried over the back contact of relay 413 so that, if the sender times out with relay 2161 operated relay 414 cannot operate. Since it was assumed that relay 2161 was not operated, in the twenty-third position a circuit extends over the twelfth segment of strip 319, lower front contact of relay 414 to the winding of relay 345. This relay prepares circuits for magnets 362 and 364 to cause the printing of the letter R.

A circuit is closed in the twenty-fourth and twenty-fifth positions through the winding of relay 354 to battery. Relay 354 prepares a circuit for relay 362 alone. When the printer control contacts 314 close, magnet 362 operates. This magnet operated alone causes the printer mechanism to rotate the paper carriage, not shown, and advance the paper the space of one line. It also advances the brush carriage one space. In passing from position 24 to position 25 relay 354 releases and then is reoperated to cause a second advance of the paper. A space of two lines is thus provided between the printed records in order that they may be easily read.

The commutator brush is then advanced to position 26 where a circuit is closed for relay 353. This relay prepares the circuit of magnet 364 alone and also closes a circuit from ground at the lower contact of relay 372 over the front contact of relay 353 through the winding of relay 308 to battery. Relay 308 locks through the winding of relay 372 to ground but relay 372 cannot operate until the operating circuit of relay 308 is opened. The operation of magnet 364 alone causes the return of the printer carriage to its normal position. Relay 308 in operating opens the circuit of solenoid 307 which permits the toggle to engage pawl 311 and hold the shaft 312 from rotating. Contact 310 is also controlled from shaft 312 and closes at the same time as contacts 314. With this contact closed solenoid 307 is held operated in series with resistance 310, until after the printer control contact has opened. Relay 308 also disconnects the printer control contacts 314 from the selection control relays. The segments occupying positions 27, 28 and 29 are connected in multiple with that in position 26 to insure that the printer carriage return, should failure occur in position 26.

When the brush carriage starts to return the circuit of relay 353 is opened and relay 372 is permitted to operate. With relay 372 operated an obvious circuit is closed for relay 303 which opens the circuit of magnet 304 stopping the motor. When the brush carriage returns to its normal position, a circuit is closed from ground over the commutator strip 318 and the first segment of strip 319, outer lower front contact of relay 308, outer lower front contact of relay 303, winding of relay 301 to battery. Relay 301 opens the locking circuit of relay 401 and also opens the circuit over which battery through resistance 403 is connected to the keys to mark the trouble indicator idle. Relay 401 in releasing removes ground from conductor 433 thus releasing relays 302, 308 and 372, 303 and 301 in succession. Relay 401 also releases relay 501 which in turn releases relay 511. Relays 501 and 511 remove the locking ground from the register and transfer relays permitting them to release. Relay 511 and relays 746 and 747 in releasing remove ground from conductor 406 to release the timing relays and stop the timing operation. Relay 303 in operating connects ground over its inner lower front contact, outer upper front contact of relay 1031, to the lower winding of relay 1032 to advance the district and permit the release of the link and sender in case the sender failed to do so. It is to be noted that the record of only one class of failure can be made at a time, that it, the one corresponding to the operated key. If two or more keys should be operated inadvertently one class will have the preference. For example if keys 707 and 704 are operated at the same time the circuit for operating relay 1025 extends over a chain circuit including the normal contacts of the keys 700, 701, 702 and 703 and the operated contact of the key 704 corresponding to the lower numbered of the two operated keys. Likewise, when the commutator brush carriage 317 makes contact with the second segment of the commutator, ground is connected to conductor 373 for the purpose of operating one of the control relays 321 to 329 and 389 to cause the printing of the code number of the class of the failure. This circuit extends over the outer left normal contacts of keys 700, 701, 702 and 703 and the outer operated contact of key 704 to the winding of relay 324. The circuit of relay 327 which would be closed over the outer left operated contact of key 707 extends over the outer left normal contacts of keys 706, and 705 but is open at key 704 since that key is operated. If a key should be restored after the association of the sender with the trouble recorder the connection of ground to conductor 373 closes a circuit over the normal contacts of all of the keys in series to the winding of relay 352 which causes the operation of magnets 365, 364, 363 and 361 to cause the letter X to be printed. Similarly if, due to some difficulty, any one of the relays which identify the sender or the district or the frames on which they are located is not operated, a chain circuit over the back contacts of all of the relays for that particular identification is closed to relay 352.

As mentioned above the automatic release of the sender is prevented in connection with call indicator or call announcer calls during the time that they are awaiting assignment unless the key 706 is operated. With key 706 operated, ground is connected to the winding of relay 736 which operates, connecting battery through its contacts to conductor 2049 to operate relay 1027 in response to the operation of the timing relays. Otherwise the effect of key 706 is similar to that of the other trouble class keys.

It will be remembered that ground was connected to conductor 406 immediately after the seizure of the trouble recorder, thus supplying ground to interrupter 416. Interrupter 416 transmits a series of eighteen impulses of ground to the timing relays 402, 415 and 417 to 422. Relays 417 and 421 are operated by the first two impulses. The third impulse operates relay 418 and releases relays 417 and 421. The fourth impulse operates relay 422. The fifth and sixth impulses reoperate relays 417 and 421, while the seventh pulse operates relay 402, which releases relays 417, 421, 418 and 422 and then operates relay 419. The eighth pulse is ineffective. Relay 402 also connects ground over its inner lower front contact, upper front contact of relay 401 to conductor 433 and the winding of relay 302 to start the operation of the printed 300, in case relay 404 fails to release.

The ninth to fourteenth impulses repeat the cycle of operations of relays 417, 421, 418 and 422 performed during the first to sixth impulses. At the fifteenth impulse relay 420 is operated and relays 417, 421, 418, 422 and 419 are released. The sixteenth impulse is ineffective but the seventeenth and eighteenth impulses operate relays 417 and 421 so that relay 415 is operated. Relay 415 locks directly to conductor 406 opening the locking circuit of relay 420 and the locking circuits of relays 417 and 421. It also closes a circuit from ground over key 423, upper front contact of relay 415 to conductor 424, and the alarm circuit which operates completing a circuit for lamp 425 which lights to indicate that the trouble recorder has taken an abnormal length of time to operate. The removal of ground from conductor 406 at any point of the operation stops the operation of the relays to prevent the sounding of the alarm. After the alarm has sounded key 423 can be operated to silence the audible alarm, but with key 423 operated the removal of the trouble is indicated by the removal of ground from conductor 406, releasing relay 415 and reclosing the alarm circuit over the operated contact of key 423 and the outer upper back contact of relay 415. The operation of relay 415 also connects ground over its inner upper front contact, outer upper front contact of relay 1031 to the lower winding of relay 1032 to cause the release of the sender and the district selector if it has not already occurred.

*Trouble release of the district selector*

It will be remembered that in either of the three classes of trouble above discussed, ground was connected in shunt of the lower winding of relay 905, reducing the resistance in series with conductor 221 so that relay 229 operates in parallel with relay 208. If the call has been abandoned, this is the only information returned to the district selector by the sender. If the call cannot be completed because of trouble, ground is also connected to conductor 227 by the operation of relay 1002. In addition, if the trouble indicator is to be operated, ground is connected to conductor 214 by the release of relay 907 with relay 1008 operated.

The seizure of the district selector and its association with a sender advances sequence switch 206 to position 4. The release of the selector is under the control of the sender in position 4 to 11 inclusive.

Relay 229 when operated, locks over its outer right contact to ground over the lower contacts of cam 205. Relay 229 is effective to advance sequence switch 206 from position 4 to position 5.

If the call has been abandoned or the sender has timed out at this stage, relay 916 is operated, the fundamental circuit is opened and relay 212 is unoperated in position 5 so that sequence switch 206 is advanced to position 6 over the back contact of relay 212. If the failure or abandonment occurs before selection is started, selector 200 will be at the bottom of its bank and sequence switch 206 will be advanced to position 9 over the upper right contact of cam 216, normal commutator segment 248, brush 239, upper right and lower left contacts of cam 217, to ground. If the selector went to tell-tale, sequence switch 206 is advanced to position 8 over the lower contacts of cam 254, commutator segment 255, brush 235, and the contacts of cam 217. Relay 212 is operated in a local circuit over cam 249 in position 8 and advances sequence switch 206 to position 9. In position 9, relay 212 is released advancing sequence switch 206 to position 10. If the selector has gone to overflow during trunk hunting in position 9, relay 212 releases at overflow position advancing the sequence switch to position 10. If the selector has not been operated, sequence switch 206 is advanced from position 10 to position 14 over the normal commutator segment. If the selector is at tell-tale or overflow, relay 212 is reoperated in a local circuit in position 10 advancing the sequence switch 206 to position 11 in which position relay 212 is held operated under the control of relay 208. In position 10 also a circuit is closed from battery through the winding of relay 223, upper contacts of cam 246, commutator strip 234, which is closed at overflow position, brush 235 to ground over cam 217, or if the selector is at tell-tale, over the upper right contact of cam 246, lower right contact of cam 254, commutator strip 255 to brush 235 and ground. With relay 223 operated, ground from commutator strip 234 is extended over the upper contacts of cam 233, outer upper front contact of relay 223, lower left and upper right contacts of cam 202 to the fundamental tip conductor 214, and battery through resistance 256 is connected over the inner upper front contact of relay 223, left contacts of cam 245, outer lower front contact of relay 223, upper left and lower right contacts of cam 203 to the fundamental ring conductor 231, thus reversing the direction of current flow over the fundamental circuit and operating relay 2161. The operation of relay 2161 causes the operation of relays 916 and 904 and the insertion of the high resistance winding of relay 905 in series with relay 208 which releases, in turn releasing relay 212 and advancing sequence switch 206 to position 13. With relay 229 operated, sequence switch 206 is advanced out of position 13 and into position 16 over the circuit by which it was advanced out of position 4.

In position 12 ground is connected to conductor 221 to release the sender. In this position also, relay 226 is normally operated over the back contact of relay 229 to complete the incoming talking circuit. With relay 229 operated this circuit is open, as well as the circuit of relay 201. Relay 207 is therefore also released when the sequence switch reaches position 14 and advances it to position 18 where the selector is restored to normal. The normal commutator segment 248 restores sequence switch 206 to position 1.

If the selector is being released because of trouble, the connection of ground to conductor 227 operates relay 226 following the operation of relay 229. This restores the control of relay 201 to the originating office.

In position 16 a circuit is closed from ground over the right contacts of cam 205, front contact of relay 201, upper back contact of relay 244, contact of interrupter 253, lower left contact of cam 250, upper right contact of cam 222 to the winding of relay 244 and battery and over the upper left contact of cam 222 to the winding of relay 223 and battery. Relays 223 and 244 are intermittently operated under the control of interrupter 253 which is supplied with ground over the outer upper front contact of relay 244 during the operated intervals of that relay. With relays 223 and 244 unoperated ground is supplied to the ring conductor over the left contacts of cam 224, outer lower front contact of relay 226, lower left winding of repeating coil 242 lower back contact of relay 244 to the left winding of relay 201, and battery is connected to the tip conductor over the left contacts of cam 225, upper front contact of relay 226, upper left winding of relay 242, inner upper back contact of relay 244, front contact of relay 207, and the right winding of relay 201. With these relays operated, ground is supplied to the tip conductor over the left contacts of cam 225, upper front contact of relay 226, middle upper front contact of relay 244, and the right contacts of cam 233, and battery is connected to the ring conductor over the left contacts of cam 224, outer lower front contact of relay 226, lower right winding of repeating coil 242, lower front contact of relay 244, front contact of relay 207 and the right winding of relay 201. This intermittent reversal of the current flow over the incoming trunk results in a signal tone to the calling subscriber to indicate to him that the call could not be completed. When the calling subscriber hangs up, the bridge across the trunk is opened and relay 201 releases in turn releasing relay 207. With relay 207 released, sequence switch 206 is advanced to position 18 over the contacts of cam 254, back contact of relay 207, back contact of relay 212. In position 18 the selector is restored to normal and sequence switch 206 advanced to position 1 over the normal commutator segment.

If the trouble recorder has been associated with the sender, ground connected to conductor 214 following the release of relay 907, operates relay 212 as soon as sequence switch 206 reaches position 14. With relay 212 operated, sequence switch 206 is advanced directly to position 17 where ground is connected to conductors 257 and 258 to identify the district to the recorder. When the designation of the wanted line has been recorded, relay 1008 is released and relay 212 also releases. With the sequence switch in position 17 relays 223 and 244 are operated to signal the originating office. Release by the calling subscriber releases relays 201, 204 and 207 permitting the sequence switch to advance to position 18 and as described to position 1.

What is claimed is:

1. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, means effective if said timing arrangement completes its operation to disconnect said sender from said switching apparatus and means to operate a meter individual to the stage of the operation of the sender at which said timing arrangement completed its operation.

2. In a telephone system, automatic switching apparatus, a register sender for controlling the operation of said switching apparatus, means for connecting said sender with said switching apparatus, the operation of said sender passing through a plurality of stages, a timing arrangement, means for releasing and restarting said timing arrangement at the beginning of each of said stages, means effective if said timing arrangement completes its operation to disconnect said sender from said switching apparatus, means to operate a meter individual to the stage of the operation of the sender at which said timing arrangement completed its operation, a trouble recorder, and means to associate said recorder with said sender if said timing arrangement completes its operation during a particular stage of the sender operation.

3. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation and means to predetermine said particular stage of the sender operation.

4. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender responsive to the completion of said timing arrangement during any one of said stages of the sender operation, and means to predetermine the stage of said sender operation at which said associating means shall be responsive to said timing arrangement.

5. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, and means to record the called line number in said recorder by means of code impulses of varying strength and polarity transmitted from the sender.

6. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation and means automatically responsive to the association of the trouble recorder with said sender to prepare said code impulsing device to transmit the said designation.

7. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with the called line number and means automatically responsive to the association of the trouble recorder with said sender to prepare said code impulsing device to transmit the called line designation irrespective of the stage of said sender operation at which said recorder was connected with said sender.

8. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with the called line number, and means automatically responsive to the association of the trouble recorder with said sender to prepare said code impulsing device to transmit the called line designation irrespective of the class of call for which said sender was prepared by the called line designation.

9. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, and means responsive to the complete transmission of said designation to disconnect said sender from said trouble recorder.

10. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, and means responsive to the complete transmission of said designation to cause the disconnection of said sender from said trouble recorder and from said switching apparatus.

11. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, means responsive to the complete transmission of said designation to disconnect said sender from said trouble recorder, a printing mechanism and means responsive to the disconnection of said sender from said trouble recorder to initiate the operation of said printing mechanism.

12. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, means responsive to the complete transmission of said designation to disconnect said sender from said trouble recorder, and a second timing mechanism associated with said trouble recorder, said timing mechanism being effective after a predetermined interval to operate said disconnecting means.

13. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, means responsive to the complete transmission of said designation to disconnect said sender from said trouble recorder, a printing mechanism, means responsive to the disconnection of said sender from said trouble recorder to initiate the operation of said printing mechanism, and a second timing mechanism associated with said trouble recorder, said timing mechanism being effective after a predetermined interval to initiate the operation of said printing mechanism.

14. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, means responsive to the complete transmission of said designation to disconnect said sender from said trouble recorder, a printing mechanism, means responsive to the disconnection of said sender from said trouble recorder to initiate the operation of said printing mechanism and a second timing mechanism associated with said trouble recorder, said timing mechanism being effective after a predetermined interval to operate said disconnecting means and after an additional predetermined interval to initiate the operation of said printing mechanism.

15. In a telephone system, automatic switching apparatus, a register sender for controlling the operation of said switching apparatus, means for connecting said sender with said switching apparatus, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for generating code impulses of varying strength and polarity in accordance with the called line number, means normally effective responsive to the registration of predetermined designations only to prepare said code impulse device to transmit the called line designation and means automatically responsive to the association of the trouble recorder with said sender to prepare said code impulse generating device to transmit the called line number irrespective of the designation recorded.

16. In a telephone system, automatic selector switches, a register sender for controlling the operation of said selector switches, means for connecting said sender with one of said selector switches, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, and means also responsive to the association of the trouble recorder with said sender to cause said one selector switch and said sender to record their identity in said trouble recorder.

17. In a telephone system, automatic selector switches, a register sender for controlling the operation of said selector switches, means for connecting said sender with one of said selector switches, the operation of said sender passing through a plurality of stages, a timing arrangement, means responsive to said connection for starting said timing arrangement, means for releasing and restarting said timing arrangement at the beginning of each of said stages, a trouble recorder, means to associate said recorder with said sender if said timing arrangement completes its operation during a particular stage of the sender operation, means in said sender for transmitting code impulses of varying strength and polarity in accordance with a registered line designation, means automatically responsive to the association of the trouble recorder with said sender to prepare said code impulsing device to transmit the said designation, means also responsive to the association of said trouble recorder with said sender to cause said one selector switch to record its identity in said trouble recorder, means responsive to the complete transmission of said designation to disconnect said trouble recorder from said sender, and means to prevent the restoration of said one selector switch until said sender has been disconnected from said trouble reorder.

18. In a telephone system, automatic selector switches, a register sender for controlling the operation of said selector switches, a timing arrangement associated with said sender, a trouble recorder, means for associating said trouble recorder with said sender and means to operate said associating means in response to failure of one of said selector switches or in response to the operation of said timing arrangement.

In witness whereof, we hereunto subscribe our names this 20th day of February, 1931.

FRANK S. IRVINE.
THOMAS H. ROBERTS.